(12) United States Patent
Hsiao et al.

(10) Patent No.: US 11,544,739 B1
(45) Date of Patent: Jan. 3, 2023

(54) CONVERSION PATH PERFORMANCE MEASURES AND REPORTS

(71) Applicant: Google LLC, Mountain View, CA (US)

(72) Inventors: Sissie Ling-Ie Hsiao, Los Altos, CA (US); Chao Cai, Santa Clara, CA (US); Eric W. Ewald, Gilroy, CA (US); Cameron M. Tangney, Seattle, WA (US); Robert A. Walker, II, San Francisco, CA (US); Japjit Tulsi, Los Altos, CA (US); Ming Lei, San Jose, CA (US); Zhimin He, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 14 days.

(21) Appl. No.: 17/107,562

(22) Filed: Nov. 30, 2020

Related U.S. Application Data

(63) Continuation of application No. 16/436,034, filed on Jun. 10, 2019, now abandoned, which is a
(Continued)

(51) Int. Cl.
  *G06F 16/00* (2019.01)
  *G06Q 30/02* (2012.01)
  *G06F 16/9535* (2019.01)

(52) U.S. Cl.
  CPC ..... *G06Q 30/0246* (2013.01); *G06F 16/9535* (2019.01); *G06Q 30/02* (2013.01);
(Continued)

(58) Field of Classification Search
  CPC ............... G06Q 30/02; G06Q 30/0242; G06Q 30/0243; G06Q 30/0256; G06Q 30/0283; G06Q 30/0246; G06F 16/9535
  See application file for complete search history.

(56) References Cited

U.S. PATENT DOCUMENTS

| | | |
|---|---|---|
| 5,870,746 A | 2/1999 | Knutson et al. |
| 6,334,110 B1 | 12/2001 | Walter et al. |

(Continued)

OTHER PUBLICATIONS

Notification of Transmittal of the International Search Report and the Written Opinion of the International Searching Authority, or the Declaration for PCT/US2010/054923 dated Aug. 2, 2011, 11 pages.
(Continued)

*Primary Examiner* — Shiow-Jy Fan
(74) *Attorney, Agent, or Firm* — Fish & Richardson P.C.

(57) ABSTRACT

Methods, systems, and apparatus, including computer programs encoded on a computer storage medium, for providing conversion path performance measures and reports. In one aspect, user interaction data are obtained, were the user interaction data specify user interactions for a plurality of conversions. User interactions that are associated with each conversion are selected from the user interaction data, where the associated user interactions for each conversion are user interactions with a converting user during the conversion cycle for the conversion. Using the user interaction data for the selected user interactions, a quantity of user interactions that are associated with each conversion and occurred during the conversion cycle for the conversion are determined. In turn, conversion path performance measures are computed and reports specifying the conversion path performance measures are generated.

18 Claims, 23 Drawing Sheets

Related U.S. Application Data continuation of application No. 15/003,224, filed on Jan. 21, 2016, now Pat. No. 10,360,586, which is a continuation of application No. 13/070,022, filed on Mar. 23, 2011, now Pat. No. 9,245,279.

(60) Provisional application No. 61/316,657, filed on Mar. 23, 2010.

(52) U.S. Cl.
CPC ..... *G06Q 30/0242* (2013.01); *G06Q 30/0243* (2013.01); *G06Q 30/0256* (2013.01); *G06Q 30/0283* (2013.01)

(56) References Cited

U.S. PATENT DOCUMENTS

| | | | |
|---|---|---|---|
| 6,430,545 | B1 | 8/2002 | Honarvar et al. |
| 6,615,258 | B1 | 9/2003 | Barry et al. |
| 6,892,179 | B1* | 5/2005 | Zacharia ............ G06Q 10/04 705/4 |
| 7,031,932 | B1 | 4/2006 | Lipskey et al. |
| 7,085,682 | B1 | 8/2006 | Heller et al. |
| 7,136,875 | B2 | 11/2006 | Anderson et al. |
| 7,318,056 | B2 | 1/2008 | Taniguchi et al. |
| 7,895,191 | B2 | 2/2011 | Colossi et al. |
| 8,037,062 | B2 | 10/2011 | Baris et al. |
| 2002/0091707 | A1 | 7/2002 | Keller |
| 2002/0161764 | A1 | 10/2002 | Sharo |
| 2002/0177448 | A1 | 11/2002 | Moran et al. |
| 2003/0023481 | A1 | 1/2003 | Calvert et al. |
| 2003/0120670 | A1 | 6/2003 | Nareddy et al. |
| 2003/0227479 | A1* | 12/2003 | Mizrahi ............ G06Q 99/00 715/753 |
| 2004/0003132 | A1 | 1/2004 | Stanley et al. |
| 2004/0169654 | A1 | 9/2004 | Walker et al. |
| 2004/0193598 | A1 | 9/2004 | Kan et al. |
| 2004/0204990 | A1 | 10/2004 | Lee |
| 2004/0267723 | A1 | 12/2004 | Bharat |
| 2005/0021397 | A1 | 1/2005 | Cui et al. |
| 2005/0033771 | A1 | 2/2005 | Schmitter et al. |
| 2005/0055269 | A1 | 3/2005 | Roetter et al. |
| 2005/0071218 | A1 | 3/2005 | Lin et al. |
| 2005/0071325 | A1 | 3/2005 | Bem |
| 2005/0131762 | A1 | 6/2005 | Bharat et al. |
| 2005/0144067 | A1 | 6/2005 | Farahat et al. |
| 2005/0149390 | A1 | 7/2005 | Scholl et al. |
| 2005/0160002 | A1 | 7/2005 | Roetter et al. |
| 2005/0165889 | A1 | 7/2005 | Muret et al. |
| 2005/0177553 | A1 | 8/2005 | Berger et al. |
| 2005/0216421 | A1 | 9/2005 | Barry et al. |
| 2005/0222901 | A1 | 10/2005 | Agarwal et al. |
| 2005/0228797 | A1 | 10/2005 | Koningstein et al. |
| 2005/0251444 | A1 | 11/2005 | Varian et al. |
| 2006/0111972 | A1* | 5/2006 | Raman ............ G06Q 30/0269 705/14.66 |
| 2006/0149625 | A1 | 7/2006 | Koningstein |
| 2006/0200556 | A1 | 9/2006 | Brave et al. |
| 2006/0206516 | A1 | 9/2006 | Mason |
| 2006/0242013 | A1 | 10/2006 | Agarwal et al. |
| 2007/0027756 | A1 | 2/2007 | Collins et al. |
| 2007/0027760 | A1 | 2/2007 | Collins et al. |
| 2007/0061246 | A1 | 3/2007 | Ramer et al. |
| 2007/0067215 | A1 | 3/2007 | Agarwal et al. |
| 2007/0067297 | A1 | 3/2007 | Kublickis |
| 2007/0078707 | A1 | 4/2007 | Axe et al. |
| 2007/0156514 | A1 | 7/2007 | Wright et al. |
| 2007/0156718 | A1 | 7/2007 | Hossfeld et al. |
| 2007/0174340 | A1 | 7/2007 | Gross |
| 2007/0260512 | A1 | 11/2007 | Sattley et al. |
| 2008/0004947 | A1 | 1/2008 | Mathew et al. |
| 2008/0004955 | A1 | 1/2008 | Mathew et al. |
| 2008/0010144 | A1 | 1/2008 | Chatwin et al. |
| 2008/0103892 | A1 | 5/2008 | Chatwin et al. |
| 2008/0140523 | A1 | 6/2008 | Mahoney et al. |
| 2008/0186276 | A1 | 8/2008 | Mayer-Ullmann |
| 2008/0243592 | A1 | 10/2008 | Song et al. |
| 2008/0268868 | A1 | 10/2008 | Maitland |
| 2008/0300974 | A1 | 12/2008 | Bhandari et al. |
| 2009/0043648 | A1 | 2/2009 | Mahdian et al. |
| 2009/0100360 | A1 | 4/2009 | Janzen et al. |
| 2009/0106103 | A1* | 4/2009 | Milana ............ G06Q 30/0242 705/14.41 |
| 2009/0177644 | A1* | 7/2009 | Martinez ............ G06F 16/951 |
| 2010/0023503 | A1 | 1/2010 | Baris et al. |
| 2010/0082691 | A1 | 4/2010 | Jaster et al. |
| 2010/0198680 | A1 | 8/2010 | Ma et al. |
| 2011/0010243 | A1* | 1/2011 | Wilburn ............ G06Q 30/0255 705/14.53 |
| 2011/0054860 | A1 | 3/2011 | Guild et al. |
| 2011/0055149 | A1 | 3/2011 | Pimpale et al. |
| 2011/0082858 | A1 | 4/2011 | Yu et al. |
| 2011/0231239 | A1 | 9/2011 | Burt et al. |
| 2019/0146974 | A1* | 5/2019 | Chung ............ G06F 16/248 707/723 |

OTHER PUBLICATIONS

Notification Concerning Transmittal of International Preliminary Report on Patentability for PCT/US2010/054923 dated Oct. 4, 2012, 8 pages.

Office Action in Australian Application No. 2010349015, dated Sep. 11, 2014, 3 pages.

Office Action in Canadian Application No. 2749040, dated Nov. 8, 2016, 3 pages.

* cited by examiner

CONVERSION PATH PERFORMANCE MEASURES AND REPORTS

CROSS-REFERENCE TO RELATED APPLICATIONS

This application is a continuation application of, and claims priority to, U.S. patent application Ser. No. 16/436,034, titled "Conversion Path Performance Measures And Reports," filed on Jun. 10, 2019, which is a continuation application of, and claims priority to, U.S. patent application Ser. No. 15/003,224, now U.S. Pat. No. 10,360,586, titled "Conversion Path Performance Measures And Reports," filed on Jan. 21, 2016, which is a continuation application of, and claims priority to, U.S. patent application Ser. No. 13/070,022, now U.S. Pat. No. 9,245,279, titled "Conversion Path Performance Measures And Reports," filed on Mar. 23, 2011, which application claims the benefit under 35 U.S.C. § 119(e) of U.S. Patent Application No. 61/316,657, entitled "Conversion Path Performance Measures And Reports," filed Mar. 23, 2010. The disclosure of each of the foregoing applications is incorporated herein by reference.

BACKGROUND

This specification relates to determining content performance measures and providing performance reports.

The Internet provides access to a wide variety of resources. For example, video and/or audio files, as well as web pages for particular subjects or particular news articles are accessible over the Internet. Access to these resources presents opportunities for advertisements to be provided with the resources. For example, a web page can include advertisement slots in which advertisements can be presented. These advertisements slots can be defined in the web page or defined for presentation with a web page, for example, in a pop-up window.

Advertisement slots can be allocated to advertisers through an auction. For example, advertisers can provide bids specifying amounts that the advertisers are respectively willing to pay for presentation of their advertisements. In turn, an auction can be performed and the advertisement slots can be allocated to advertisers according to their bids. When one advertisement slot is being allocated in the auction, the advertisement slot can be allocated to the advertiser that provided the highest bid or a highest auction score (e.g., a score that is computed as a function of a bid and/or an advertisement quality measure). When multiple advertisement slots are allocated in a single auction, the advertisement slots can be allocated to a set of bidders that provided the highest bids or have the highest auction scores.

Advertisement management accounts can enable advertisers to specify keywords and corresponding bids that are used to control allocation of their advertisements. The advertiser can also track the performance of advertisements that are provided using the keywords and corresponding bids. For example, an advertiser can access the advertisement management account and view performance measures corresponding to the advertiser's advertisements that were distributed using each keyword. In turn, the advertiser can adjust settings that control the allocation of advertisements and compare the performance measures for the advertisements that are allocated using the new settings.

SUMMARY

Content providers (e.g., advertisers) are provided reports that specify user interactions with content that is distributed to users for the content providers. In some implementations, the reports that are provided to a particular content provider specify conversion path performance measures that measure user interactions with content provided by the advertiser and that occurred prior to a conversion. For example, the conversion path performance measures can specify a total quantity of interactions between the advertiser's content and a user prior to the user performing an action that constitutes a conversion.

In general, one innovative aspect of the subject matter described in this specification can be embodied in methods that include the actions of obtaining user interaction data for a plurality of conversions, where the user interaction data specify, for each of the conversions, user interactions with content items that are associated with one or more targeting keywords. The targeting keywords control distribution of the content items and the user interactions for each conversion are one or more presentations of content items during a conversion cycle for the conversion and zero or more user selections of the content items that occurred during the conversion cycle. The conversion cycle for each conversion is a period preceding a user interaction that constitutes a conversion. A first time at which each conversion occurred is determined. A reference user interaction that occurred prior to selection of a last selected content item is selected, where the last selected content item is a content item that was last selected prior to the conversion. A second time at which the reference user interaction occurred is determined. A time lag is computed for a content provider, where the time lag is a measure of time between the reference user interaction and the conversion. Data that cause presentation of the time lag are provided. Other embodiments of this aspect include corresponding systems, apparatus, and computer programs, configured to perform the actions of the methods, encoded on computer storage devices.

These and other embodiments can each optionally include one or more of the following features. The content item can be an advertisement, and a time lag for the content provider can be determined for an advertiser as a measure of time between an initial advertisement impression and the conversion, where the initial advertisement impression is an earliest advertisement impression during the conversion cycle. Other embodiments of this aspect include corresponding systems, apparatus, and computer programs, configured to perform the actions of the methods, encoded on computer storage devices.

In general, another aspect of the subject matter described in this specification can be embodied in methods in which user interaction data are obtained for a plurality of conversions, where the user interaction data specify, for each of the conversions, corresponding user interactions with content items that are associated with one or more targeting keywords. User interactions are selected from the user interaction data for each conversion, where the user interaction data are associated with the conversion. The associated user interactions are user interactions with a converting user during the conversion cycle. Using the user interaction data for the selected user interactions, a quantity of user interactions that are associated with the conversion and occurred during the conversion cycle for the conversion are determined. A path length measure that represents an aggregate quantity of user interactions that occurred during conversion cycles for the conversions is computed and data that cause presentation of the path length measure are provided. Other embodiments of this aspect include corresponding systems, apparatus, and computer programs, configured to perform the actions of the methods, encoded on computer storage devices.

In general, another aspect of the subject matter described in this specification can be embodied in methods in which user interaction data for a plurality of conversions are obtained, where the user interaction data specify, for each of the conversions, corresponding user interactions with content items that are associated with one or more targeting keywords, and where the targeting keywords control distribution of the content items. The corresponding user interactions for each conversion are one or more presentations of content items during a conversion cycle for the conversion and zero or more user selections of the content items that occurred during the conversion cycle, the conversion cycle for each conversion being a period preceding a user interaction that constitutes a conversion and ending with the conversion. A set of user interactions are selected for each conversion, each of the selected user interactions being user interactions that occurred during the conversion cycle for the conversion. A conversion path is generated for each conversion, the conversion path specifying an order in which the user interactions from the set of user interactions occurred. The conversion path further specifies keywords that caused presentation of content items with which the user interactions occurred. Data that cause presentation of at least one conversion path for at least one conversion is provided. Other embodiments of this aspect include corresponding systems, apparatus, and computer programs, configured to perform the actions of the methods, encoded on computer storage devices.

In general, another aspect of the subject matter described in this specification can be embodied in methods in which user interaction data for a plurality of conversions are obtained, where the user interaction data specify, for each of the conversions, corresponding user interactions with content items that are associated with one or more targeting keywords. The targeting keywords control distribution of the content items and the corresponding user interactions for each conversion are one or more presentations of content items during a conversion cycle for the conversion and zero or more user selections of the content items that occurred during the conversion cycle. The conversion cycle for each conversion is a period preceding a user interaction that constitutes a conversion. A quantity of assist user interactions are determined for each conversion, where the quantity of assist user interactions includes at least one of a quantity of assist impressions and a quantity of assist clicks. The quantity of assist impressions is a quantity of content item presentations that occurred during a conversion cycle for the conversion, and the quantity of assist clicks is a quantity of user selections of content items that occurred during a conversion cycle for the conversion and prior to a last click for the conversion, where the last click is a last user selection of a content item preceding the conversion. A measure of assist user interactions is computed, where the measure of assist user interactions is an aggregate measure of assist user interactions for the conversions. Other embodiments of this aspect include corresponding systems, apparatus, and computer programs, configured to perform the actions of the methods, encoded on computer storage devices.

In general, another aspect of the subject matter described in this specification can be embodied in methods in which user interaction data is obtained for a plurality of conversions, where the user interaction data specify, for each of the conversions, corresponding user interactions with content items that are associated with one or more targeting keywords. The targeting keywords control distribution of the content items and the corresponding user interactions for each conversion are one or more presentations of content items during a conversion cycle for the conversion and zero or more user selections of the content items that occurred during the conversion cycle. The conversion cycle for each conversion is a period preceding a user interaction that constitutes a conversion. Assist keywords that caused presentation of each of identified content item for each conversion are identified. Each assist keyword is associated with at least one of an assist user interaction that occurred during a conversion cycle for the conversion and at least one assist keyword being associated with a user interaction that occurred prior to presentation of a last clicked content item for the conversion. An assisted conversion count is determined for each assist keyword, where an assisted conversion count specifies a quantity of conversions with which the assist keyword is associated. An assisted conversion measure is computed using the assisted conversion counts for the assist keywords. An assisted conversion is a conversion for which at least one content item was presented to a converting user and zero or more of the presented content items were selected by the converting user prior to a last click. A converting user is a user that performed the user interaction that constitutes a conversion, where a last click is a last selection of a content item prior to a conversion. Other embodiments of this aspect include corresponding systems, apparatus, and computer programs, configured to perform the actions of the methods, encoded on computer storage devices.

In general, another aspect of the subject matter described in this specification can be embodied in methods in which user interaction data for a plurality of conversions are obtained, where the user interaction data specify, for each of the conversions, a set of corresponding user interactions with content items that are associated with one or more targeting keywords. The targeting keywords control distribution of the content items, and the set of corresponding user interactions for each conversion are one or more presentations of content items during a conversion cycle for the conversion and zero or more user selections of the content items that occurred during the conversion cycle. The conversion cycle for each conversion is a period preceding a user interaction that constitutes a conversion. A request is received for a first measure of user interactions for a targeting keyword. The request specifies that the targeting keyword is a keyword that caused presentation of a candidate content item with which a particular user interaction occurred prior to a last click, where the last click is a last selection of a content item by a converting user prior to a conversion by the converting user. A first set of user interaction data is selected where the first set of user interaction data specify conversions that are associated with the targeting keyword and further specify user interactions that occurred during conversion cycles for the conversions. Using the first set of user interaction data, the first measure of user interactions is computed for the targeting keyword, where the first measure of user interactions is a measure of user interactions for one or more conversions for which the targeting keyword caused presentation of the candidate content item to the converting user. A request is received for a second measure of user interaction, where the second request specifies that the second measure is to be computed with user interaction data for the one or more conversions. The second measure of user interactions is computed for the one or more keywords using the user interaction data for the one or more conversions. Other embodiments of this aspect include corresponding systems, apparatus, and computer programs, configured to perform the actions of the methods, encoded on computer storage devices.

In general, another aspect of the subject matter described in this specification can be embodied in methods in which user interaction data for a plurality of conversions are obtained from each of a plurality of different user interaction data sources. The user interaction data from at least one of the user interaction data sources specify, for each of the conversions, a set of user interactions with content items that are associated with one or more targeting keywords, wherein the targeting keywords control distribution of the content items. The user interaction data from at least one other user interaction data source specify, for each of the conversions, a set of user interactions with a web page that is provided by a content provider for which distribution of the content items is controlled using the targeting keywords. Each set of user interactions for each conversion specify one or more user interactions during a conversion cycle for the conversion, where the conversion cycle for each conversion is a period preceding a user interaction that constitutes a conversion. A request is received for conversion path performance measures, where the request specifies two or more different sources of user interaction data from which user interaction data is to be used to compute the conversion path performance measures. An aggregate set of user interaction data are selected from the user interaction data from the two or more different sources of user interaction data. The conversion path performance measures are computed using the aggregate set of user interaction data. Data that cause presentation of the conversion path performance measures are provided. Other embodiments of this aspect include corresponding systems, apparatus, and computer programs, configured to perform the actions of the methods, encoded on computer storage devices.

In general, another aspect of the subject matter described in this specification can be embodied in methods in which one or more user interaction logs are processed to obtain respective user interaction data for one or more user interactions. A first distributed data table is updated using the respective user interaction data for the user interactions. The first distributed data table includes rows indexed and sorted by strings representing unique pairs of advertiser identifier and user identifier that are associated with stored user interactions in the first distributed data table. Each row includes a plurality of ordered cells, where each cell corresponds to a respective user interaction type and contains the user interaction data for stored user interactions of said user interaction type. The user interaction data for each user interaction is stored with a respective timestamp associated with the user interaction. The first distributed data table is queried to identify conversions that have occurred within a specified time window based on the user interaction types and timestamps of the stored user interactions. In response to the query, the user interaction data is received for each identified conversion, as well as respective user interaction data of all stored user interactions associated with a same advertiser identifier and user identifier pair as the conversion and having occurred within a specified time period prior to the identified conversion. A new row is created for each identified conversion in a second distributed data table, the new row being indexed with a unique conversion identifier and including all of the received user interaction data for the identified conversion. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Content providers are provided new conversion path performance measures that enable the content providers to analyze user interactions with their content prior to a conversion by the user. User interaction data is more efficiently processed by arranging the user interaction data in a conversion centered distributed data table. The conversion centered distribution table enables scalability through convenient data addition and updates of particular portions of the data tables without requiring a full update of the data table. For example, by organizing user interaction data into the distributed data table indexed and sorted by conversions, data of all user interaction events associated with a conversion can be stored in a single row in the distributed data table. This enables generation of conversion related metrics to be performed in a distributed computing environment where processing of individual conversions can be parallelized.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
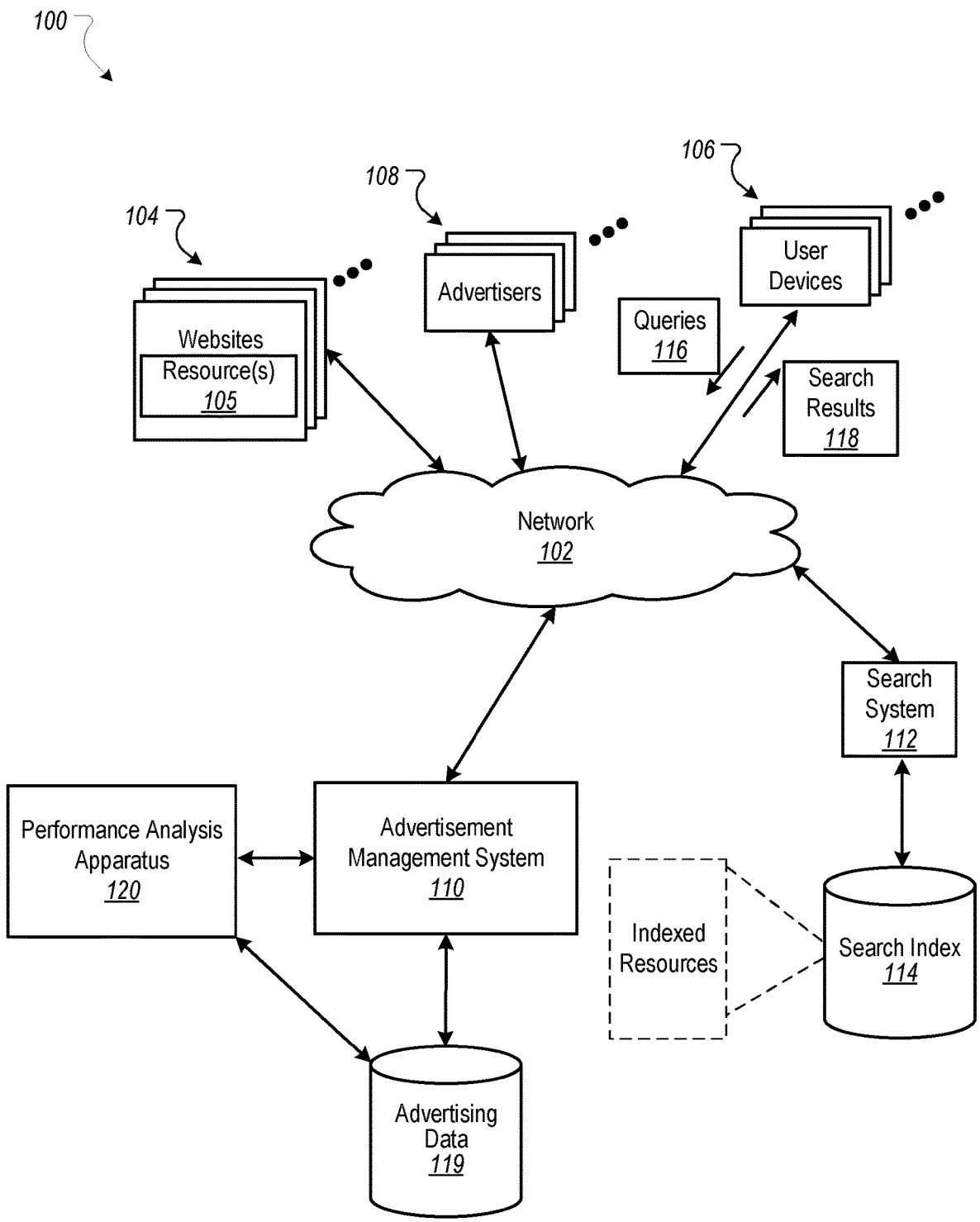
FIG. 1 is a block diagram of an example environment in which an advertisement management system manages advertising services.

Content providers (e.g., advertisers) are provided reports that specify user interactions with content that is distributed to users for the content providers. In some implementations, the reports that are provided to a particular content provider specify conversion path performance measures that measure user interactions with content provided by the advertiser and that occurred prior to a conversion. For example, the conversion path performance measures can specify a total quantity of interactions between the advertiser's content and a user prior to the user performing an action that constitutes a conversion.

A conversion occurs when a user performs a specified action, and a conversion path is a set of user interactions by a user prior to a conversion by the user. What constitutes a conversion may vary from case to case and can be determined in a variety of ways. For example, a conversion may occur when a user clicks on an advertisement, is referred to a web page, and then consummates a purchase before leaving that web page.

Actions that constitute a conversion can be specified by each advertiser on an advertiser by advertiser basis. For example, each advertiser can select, as a conversion, one or more measurable/observable user actions such as, for example, downloading a white paper, navigating to at least a given depth of a web site, viewing at least a certain quantity of web pages, spending at least a predetermined amount of time on a website or web page, or registering on a website. Other actions that constitute a conversion can also be used. As used throughout this document, a conversion occurs upon the occurrence of the final action that is used to define a conversion. For example, if a user visiting 5 web pages defines a conversion, the conversion occurs upon the user's request for the 5th web page, and the 4 page views that occurred prior to the request for the 5th web page are considered to have occurred prior to the conversion.

To track conversions (and other user interactions with the advertiser's website), an advertiser can include, in the advertiser's web pages, a portion of code that monitors user interactions (e.g., page selections, content item selections, and other interactions) with advertiser's website, and can detect a user interaction (or series of user interactions) that constitutes a conversion. In some implementations, when a user accesses a web page, or another resource, from a referring web page (or other resource), the referring web page (or other resource) for that interaction can be identified, for example, by execution of a snippet of code that is associated with the web page that is being accessed and/or based on a uniform resource locator ("URL") that is used to access the web page.

For example, a user can access an advertiser's website by selecting a link presented on a web page, for example, as part of a promotional offer by an affiliate of the advertiser. This link can be associated with a URL that includes data (i.e., text) that uniquely identifies the resource from which the use is navigating. For example, the link http://www.example.com/homepage/%affiliate_identifier%promotion_1 specifies that the user navigated to the example.com web page from a web page of the affiliate that is associated with the affiliate identifier number that is specified in the URL, and that the user was directed to the example.com web page based on a selection of the link that is included in the promotional offer that is associated with promotion_1. The user interaction data for this interaction (i.e., the selection of the link) can be stored in a database and used, as described below, to facilitate performance reporting. When a conversion is detected for an advertiser, conversion data representing the conversion can be transmitted to a data processing apparatus ("analytics apparatus") that receives the conversion data, and in turn, stores the conversion data in a data store. This conversion data can be stored in association with one or more user identifiers (or other tracking mechanisms) for the user device that was used to perform the user interaction, such that user interaction data associated with the user identifier can be associated with the conversion and used to generate a performance report for the conversion.

As used throughout this document, user interactions include any presentation of content to a user and any subsequent affirmative actions or non-actions (collectively referred to as "actions" unless otherwise specified) that a user takes in response to presentation of content to the user (e.g., selections of the content following presentation of the content, or no selections of the content following the presentation of the content). Thus, a user interaction does not necessarily require a selection (i.e., click) of the content (or any other affirmative action) by the user.

User interaction measures can include one or more of time lag measures (i.e., measures of time from one or more specified user interactions to a conversion), path length measures (i.e., quantities of user interactions that occurred prior to conversions), user interaction paths (i.e., sequences of user interactions that occurred prior to the conversion), assist interaction measures (i.e., quantities of particular user interactions that occurred prior to the conversion), assisted conversion measures (i.e., quantities of conversions that were assisted by specified content), and other measures, as described in more detail throughout this document. Content providers can use the user interaction measures to adjust settings of a content distribution account that control allocation of their content, as described in more detail below The description that follows generally describes user interaction measures as being provided to advertisers in the form of a report, where the user interactions measure user interactions with keyword targeted advertisements prior to a sale by the advertiser. User interaction measures (and other performance measures) can also be provided for other content items (e.g., audio items, video items, games, and other multimedia content) that are distributed using other distribution criteria. The reports described below are generally described as online reports that are generated by a performance analysis apparatus that is coupled to an advertisement management system. However, the user interaction measures can be provided in other forms (e.g., distributed in various file formats and/or distributed in printed formats) and the performance analysis apparatus can be implemented as an independent apparatus that is accessed, for example, over a data network.

FIG. 1 is a block diagram of an example environment 100 in which an advertisement management system 110 manages advertising services. The example environment 100 includes a network 102, such as a local area network (LAN), a wide area network (WAN), the Internet, or a combination thereof. The network 102 connects websites 104, user devices 106, advertisers 108, and the advertisement management system 110. The example environment 100 may include many thousands of websites 104, user devices 106, and advertisers 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as JavaScript scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display (e.g., a presentation location of a pop-up window or in a slot of a web page) in which advertisements can be presented. These specified portions of the resource or user display are referred to as advertisement slots.

To facilitate searching of these resources, the environment 100 can include a search system 112 that identifies the resources by crawling and indexing the resources provided by the publishers on the websites 104. Data about the resources can be indexed based on the resource with which the data are associated. The indexed and, optionally, cached copies of the resources are stored in a search index 114. Data that are associated with a resource is data that represents content included in the resource and/or metadata for the resource.

User devices 106 can submit search queries 116 to the search system 112 over the network 102. In response, the search system 112 accesses the search index 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. An example search result 118 can include a web page title, a snippet of text or a portion of an image extracted from the web page, and the URL of the web page. Search results pages can also include one or more advertisement slots in which advertisements can be presented.

A search result page can be sent with a request from the search system 112 for the web browser of the user device 106 to set a Hypertext Transfer Protocol (HTTP) cookie. A cookie can represent, for example, a particular user device 106 and a particular web browser. For example, the search system 112 includes a server that replies to the query by sending the search results page in an HTTP response. This HTTP response includes instructions (e.g., a set cookie instruction) that cause the browser to store a cookie, e.g., instructions requesting the browser to store a cookie for the site hosted by the server. If the browser supports cookies and cookies are enabled, every subsequent page request to the same server will include the cookie for that server. The cookie can store a variety of data, including a unique or semi-unique identifier. The identifier can be anonymized so that the privacy of users is protected. For example, the semi-unique identifiers can be associated with users, but the actual identifying information of the users is not stored in the cookie. Additionally, any identified user interactions can be generalized (for example, generalized based on user demographics) rather than associated with a particular user. Encryption and obfuscation techniques can also be used to protect the privacy of users. Because HTTP is a stateless protocol, the use of cookies allows an external service, such as the search system 112 or other system, to track particular actions and status of a user over multiple sessions.

When a resource 105 or search results 118 are requested by a user device 106, the advertisement management system 110 receives a request for advertisements to be provided with the resource 105 or search results 118. The request for advertisements can include characteristics of the advertisement slots that are defined for the requested resource or search results page, and can be provided to the advertisement management system 110.

For example, a reference (e.g., URL) to the resource for which the advertisement slot is defined, a size of the advertisement slot, and/or media types that are available for presentation in the advertisement slot can be provided to the advertisement management system 110. Similarly, keywords (i.e., one or more words that are associated with content) associated with a requested resource ("resource keywords") or a search query 116 for which search results are requested can also be provided to the advertisement management system 110 to facilitate identification of advertisements that are relevant to the resource or search query 116.

Based on data included in the request for advertisements, the advertisement management system 110 can select advertisements that are eligible to be provided in response to the request ("eligible advertisements"). For example, eligible advertisements can include advertisements having characteristics matching the characteristics of advertisement slots and that are identified as relevant to specified resource keywords or search queries 116. In some implementations, advertisements having targeting keywords that match the resource keywords or the search query 116 are selected as eligible advertisements by the advertisement management system 110. When a targeting keyword matches a search query 116 or a resource keyword and the eligible advertisement associated with that targeting keyword is presented to a user (i.e., receives an impression), the targeting keyword is considered to have caused presentation of the eligible advertisement.

A targeting keyword can match a resource keyword or a search query 116 by having the same textual content ("text") as the resource keyword or search query 116. For example, an advertisement associated with the targeting keyword "hockey" can be an eligible advertisement for an advertisement request including the resource keyword "hockey." Similarly, the advertisement can be selected as an eligible advertisement for an advertisement request including the search query "hockey."

A targeting keyword can also match a resource keyword or a search query 116 by having text that is identified as being relevant to a targeting keyword or search query 116 despite having different text than the targeting keyword. For example, an advertisement having the targeting keyword "hockey" may also be selected as an eligible advertisement for an advertisement request including a resource keyword or search query for "sports" because hockey is a type of sport, and therefore, is likely to be relevant to the term "sports."

Advertisers can specify a level of match that is required between targeting keywords that are used to distribute their advertisements and a resource keyword and/or a search query 116. For example, an advertiser can specify a targeting keyword as a broad match keyword, a phrase match keyword, or an exact match keyword. Broad match keywords are keywords that are matched by phrases (i.e., one or more words) that include one or more same words as the broad match keywords. Broad match keywords can also be matched by phrases that include stubs, synonyms, various alternative forms of the broad match keywords (e.g., past tense, gerunds, future tense), and/or terms that are relevant to a same topic or concept as the broad match targeting keyword (e.g., based on term clustering techniques). For example, the broad match keyword "sports equipment," may be matched by "tennis equip" because this phrase includes the word "equipment," which is included in the broad match keyword. In this example, the phrase "hockey" can also match "sports equipment" because hockey is a type of sport, and therefore, is relevant to the term "sports." Conversion path performance measures described below can be computed and/or presented on a per targeting keyword match type basis.

Phrase match keywords are keywords that are matched by phrases that include at least one same word as the phrase match keyword. The phrases that match a phrase match keyword can include additional words that are not included in the phrase match keyword. For example, if "sports equipment" is designated as a phrase match keyword, the phrases "sports," "equipment," "sports equipment" and "new sports equipment" will match the phrase match keyword.

Exact match keywords are keywords that are matched by phrases that include the exact same words as the exact match keywords. For example, the exact match keyword "hockey sticks" is matched by the phrase "hockey sticks," and is not matched by the phrase "durable hockey sticks" because "durable hockey sticks" includes the word "durable," which is not included in the exact match keyword "hockey sticks."

The advertisement management system 110 can select the eligible advertisements that are provided for presentation in advertisement slots of a resource or search results page based on results of an auction. For example, the advertisement management system 110 can receive bids from advertisers and allocate the advertisement slots to the highest bidders at the conclusion of the auction.

Targeting keywords and other data associated with the distribution of advertisements can be stored in an advertising data store 119. The advertising data store 119 is a data store that stores references to advertisements, advertising campaign parameters that are used to control distribution of the advertisements, data representing conditions under which the advertisement was selected for presentation to a user, and data representing actions taken by users in response to presentation of the advertisement. For example, the advertising data store can store targeting keywords, bids, and other criteria with which eligible advertisements are selected for presentation.

The advertising data store can also store user interaction data representing user interactions with presented advertisements (or other content items). For example, when an advertisement is presented to the user, data can be stored in the advertisement data store 119 representing the advertisement impression. In some implementations, the data are stored in response to a request for the advertisement that is presented. For example, the ad request can include data specifying a user identifier for a user device (e.g., a cookie), such that data identifying the user device can be stored in association with data that identifies the advertisement(s) that were presented in response to the request.

When a user selects (i.e., clicks) a presented advertisement, data are stored in the advertisement data store 119 representing the selection of the advertisement. In some implementations, the data are stored in response to a request for a web page that is linked to by the advertisement. For example, the user selection of the advertisement can initiate a request for presentation of a web page that is provided by (or for) the advertiser. The request can include data specifying a user identifier for the user device, and this data can be stored in the advertisement data store.

The advertising data store 119 can also include data that specifies a quantity of impressions that each advertisement has received, and the quantity of impressions for each advertisement can be delineated, for example, using the keywords that caused the advertisement to receive impressions. Each impression and user selection can be associated with (i.e., stored with references to and/or indexed according to) the advertisement that was selected and/or the targeting keyword that caused the advertisement to be selected for presentation. Similarly, each impression and user selection can be associated with an identifier (e.g., cookie identifier) for the device that received the impression and from which the selection was made.

As described above, advertisers 108 can submit, to the advertisement management system 110, campaign parameters (e.g., targeting keywords and corresponding bids) that are used to control distribution of advertisements. Campaign parameters are parameters of a content distribution campaign that are used to control content distribution in response to content requests. For example, campaign parameters can include targeting keywords and corresponding bids, geographic or demographic targeting criteria, as well as other parameters corresponding to a set of advertisements.

A campaign is a set of one or more advertisements and corresponding campaign parameters that are grouped together into a same advertising unit. For example, advertisements for sporting equipment can be grouped together into a campaign. Within a campaign, subsets of the advertisements can be grouped into "ad groups." For example, an ad group in the above-referenced sports equipment campaign can include a set of advertisements for baseball equipment.

The campaign parameters for each ad group can be referred to as ad group parameters and, because ad group parameters are a subset of campaign parameters, changes to ad group parameters constitute changes to campaign parameters. The campaign parameters corresponding to each advertisement can be referred to as advertisement parameters. Advertisers can also adjust advertisement parameters that are used to control distribution of individual advertisements. Adjustment of advertisement parameters constitutes an adjustment of ad group parameters and campaign parameters of the ad group(s) and campaign(s) to which the advertisement belongs.

The advertisers 108 can access to the advertisement management system 110 to monitor performance of the advertisements that are distributed using the campaign parameters. For example, an advertiser can access a campaign performance report that provides a quantity of impressions (i.e., presentations), selections (i.e., clicks), and conversions that have been identified for the advertisements. The campaign performance report can also provide a total cost, a cost-per-click, and other cost measures for the advertisement over a specified period of time.

For example, an advertiser may access a performance report that specifies that advertisements distributed using the phrase match keyword "hockey" have received 1,000 impressions (i.e., have been presented to users 1,000 times), 20 clicks, and 5 conversions. Thus, the phrase match keyword hockey can be attributed with 1,000 impressions, 20 clicks, and 5 conversions.

Typically a conversion is attributed to a targeting keyword when an advertisement that is targeted using the targeted keyword is the "last clicked advertisement" prior to the conversion. For example, advertiser X may associate the phrase match keywords "tennis," "shoes," and "Brand-X" with advertisements. In this example, assume that a user submits the search query "tennis," the user is presented a search result page that includes advertiser X's advertisement, and the user selects the advertisement, but the user does not take an action that constitutes a conversion. Assume further that the user subsequently submits the search query "Brand-X," is presented with the advertiser X's advertisement, the user selects advertiser X's advertisement, and the user takes action that constitutes a conversion (e.g., the user purchases Brand-X tennis shoes). In this example, the keyword "Brand-X" will be attributed the conversion because the last advertisement selected prior to the conversion (i.e., the "last selected advertisement") was an advertisement that was presented in response to the "Brand-X" being matched (i.e., the "Brand-X" keyword caused presentation of the last clicked advertisement).

Attributing a conversion to the keyword that caused presentation of the last selected advertisement ("last selection credit") prior to a conversion is a useful measure of advertisement performance, but this measure alone does not provide advertisers with data that facilitates analysis of a conversion cycle that includes user exposure to, and/or selection of, advertisements prior to the last selected advertisement. For example, last selection credit measures alone do not specify keywords that may have increased brand or product awareness through presentation of advertisements that were presented to, and/or selected by, users prior to selection of the last selected advertisement. These previously presented and/or selected advertisements may have contributed significantly to the user subsequently taking action that constituted a conversion, but without data that provides user interaction measures with advertisements prior to the last click, the contributions of these keywords to the conversion can be overlooked.

A conversion cycle is a period that begins with an initial user interaction, by a particular user, with content provided for (or by) a particular content provider (e.g., advertiser) and ends at a time at which the particular user takes an action that constitutes a conversion for the particular content provider. The conversion cycle can be measured and/or constrained by time or actions and can span multiple user sessions. For example, a conversion cycle can include a period measured from a time at which a particular user was initially presented an advertiser's advertisement to a time at which the user took an action that the advertiser has specified as a conversion (i.e., an action that constituted a conversion for that advertiser). Alternatively, a conversion cycle can be limited to a specified period of time preceding a conversion, such that user interactions prior to the specified period of time are not considered part of the conversion cycle.

Conversion cycles for two different conversions can overlap, such that one or more of the same user interactions can be associated with each of the conversions. For example, assume that a set of user interactions are associated with a particular conversion (e.g., creating a user account). Further assume that shortly following the particular conversion, the user performs another interaction (e.g., makes a purchase) that constitutes a second conversion. In this example, the user interactions that are associated with the first conversion can also be associated with the second conversion.

Each user session is a set of user interactions for a particular user that are grouped together for analysis. The user sessions can include user interactions that occurred within a threshold period of time (e.g., within 1 hour, 1 day, or 1 month) or can be delineated using specified actions. For example, a user search session can include user search queries and subsequent actions that occur over a 1 hour period and/or occur prior to a session ending event (e.g., closing of a web browser).

Returning to the example above, the keyword "tennis" is not attributed credit for the conversion, even though the advertisement that was presented in response to a search query matching the keyword "tennis" may have contributed to the user taking an action that constituted a conversion (e.g., making a purchase of Brand-X tennis shoes). For instance, upon user selection of the advertisement that was presented in response to the keyword "tennis" being matched, the user may have viewed Brand-X tennis shoes that were available from advertiser X. Based on the user's exposure to the Brand-X tennis shoes, the user may have subsequently submitted the search query "Brand-X" to find the tennis shoes from Brand-X. Similarly, the user's exposure to the advertisement that was targeted using the keyword "tennis," irrespective of the user's selection of the advertisement, may have also contributed to the user subsequently taking action that constituted a conversion (e.g., purchasing a product from advertiser X).

Analysis of user interactions, with an advertiser's advertisements (or other content provided by a content provider), that occur prior to selection of the last selected advertisement can enhance an advertiser's ability to understand the advertiser's conversion cycle and how its customers interact with advertisements over a conversion cycle. For example, if an advertiser is provided data specifying that, on average, the time from a converting user's (i.e., a user that takes an action that constitutes a conversion) first exposure to an advertisement to a conversion is 20 days, the advertiser can use this data to infer an amount of time that users spend researching alternative sources prior to converting (i.e., taking actions that constitute a conversion). Similarly, if an advertiser is provided data specifying that a particular targeting keyword causes presentation of a substantial portion of the advertisements that are initially presented to many of the converting users, the advertiser may decide to increase the amount of money that it spends on advertisements distributed using that particular keyword and/or increase the quality of advertisements that are targeted using that particular keyword.

User interaction measures that facilitate analysis of user interactions over a conversion cycle are referred to as conversion path performance measures. Conversion path performance measures specify durations of conversion cycles and/or paths, quantities of user interactions that occurred during conversion cycles and/or paths, user interaction paths that preceded a conversion, as well as other measures of user interaction that occurred during conversion cycles, as described in more detail below.

The advertisement management system 110 includes a performance analysis apparatus 120 that determines conversion path performance measures. The performance analysis apparatus 120 obtains, for each advertiser, user interaction data that represents user interactions with advertisements that are provided by the advertiser, determines (i.e., computes) one or more conversion path performance measures, and provides data that cause presentation of a performance report specifying at least one of the conversion path performance measures. Using the performance report the advertiser can analyze its conversion cycle and/or conversion paths, how users interact with advertisements that are distributed using targeting keywords irrespective of whether the keywords caused presentation of the last selected advertisement before a conversion. In turn, the advertiser uses the performance report to make adjustments to campaign parameters that control distribution of its advertisements.

Figure 2:
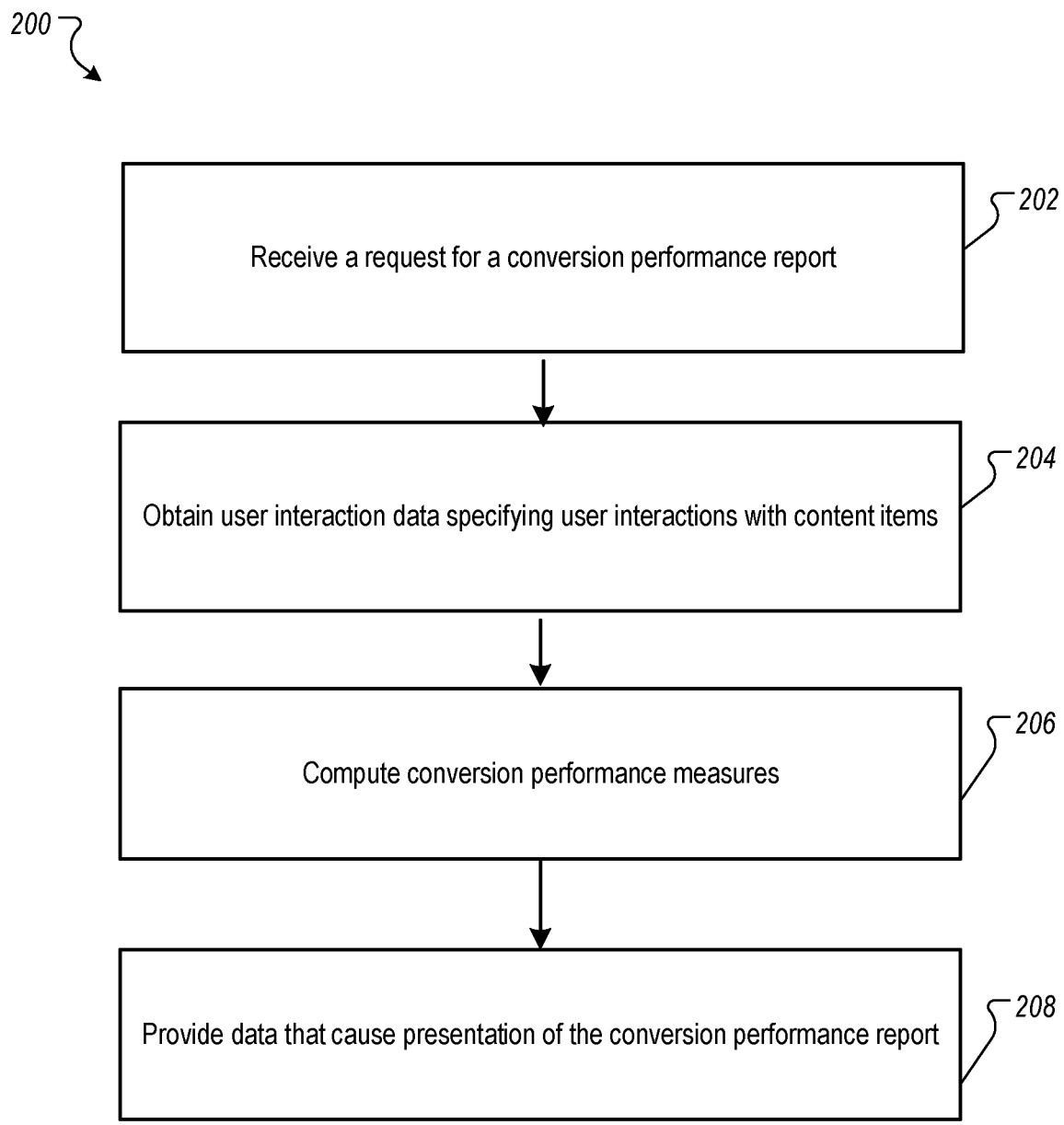
FIG. 2 is a flow chart of an example process for providing a conversion performance report.

FIG. 2 is a flow chart of an example process 200 for providing a conversion performance report. A conversion performance report can include one or more conversion path performance measures for conversions that occurred over a reporting period. For example, a conversion performance report can include conversion path performance measures such as time lag measures, path length measures, assist user interactions, and other performance measures for the conversions that occurred over the previous 30 days. These conversion path performance measures can be provided, for example, in a user interface similar to those described with reference to FIGS. 3B and 3C.

The process 200 is a process by which a request for a conversion performance report is received and user interaction data that are used to generate conversion path performance measures for the report are obtained. Using the user interaction data, conversions that occurred during a report period are selected, and the user interaction data associated with these conversions are used to compute conversion path performance measures for the conversions. Once the conversion path performance measures are computed, the conversion performance report can be populated with the conversion path performance measures. In turn, data that cause presentation of the conversion performance report are provided to a user device.

The process 200 is described below with reference to advertising campaigns that control distribution of advertisements in an online environment. However, the process 200 can also be used with other content distribution campaigns that control distribution of other content (e.g., video, audio, or other content).

The process 200 can be implemented, for example, by the performance analysis apparatus 120 of FIG. 1. In some implementations, the performance analysis apparatus 120 is a data processing apparatus that includes one or more processors that are configured to perform actions of the process 200. In other implementations, a computer readable medium can include instructions that, when executed by a computer, cause the computer to perform actions of the process 200.

A request for a performance report is received (202). The request for a performance report can be received, for example, from an advertiser for which advertisement distribution is being controlled by one or more targeting keywords. The request can include data specifying a report period for which the report is being requested. The report period can specify, for example, that the requested report is to be generated for conversions that occurred during the report period. For example, if the report period specifies a period of the previous 30 days, then the report that is generated in response to the request can be generated for conversions that occurred in the last 30 days.

User interaction data that specifies user interactions with content items are obtained (204). In some implementations, the user interaction data that are obtained are user interaction data for conversions that occurred during the reporting period. The user interaction data includes data that specifies a conversion and a time at which the conversion occurred. Thus, the user interaction data can be examined to identify conversions that occurred during the last 30 days.

Conversion path performance measures are computed using the user interaction data (206). As described in detail below, various conversion path performance measures can be performed. For example, top path measures, assisted conversion measures, first click measures, last click analyses, path length measures, and combinations thereof can be computed. Additional conversion path performance measures can also be computed, as described below. In some implementations, conversion path performance measures are computed on a per-keyword basis, a per-ad group basis, a per-ad campaign basis, a per-anonymized user basis and/or a per-advertiser basis. Other delineations of conversion path performance measures are also possible. For example, conversion path performance measures can also be computed on a per-keyword match type basis (e.g., broad, phrase, and/or exact match type).

Once the conversion path performance measures are computed, the conversion performance report is generated to include the conversion path performance measures, and data that cause presentation of the conversion performance report are provided (208). The data can be provided, for example, to a user device that uses the data to cause presentation of the conversion performance report on a display device.

The processes, apparatus, and computer products that can be used to compute conversion path performance measures and provide conversion performance reports are provided in more detail below. FIGS. 3A-8B describe various conversion path performance measures that can be computed. FIG. 9 describes computing and providing conversion path performance measures using multiple sources of user interactions and FIGS. 10A and 11 describe components and apparatus with which conversion path performance measures can be computed and reported.

Time Lag

Figure 3A:
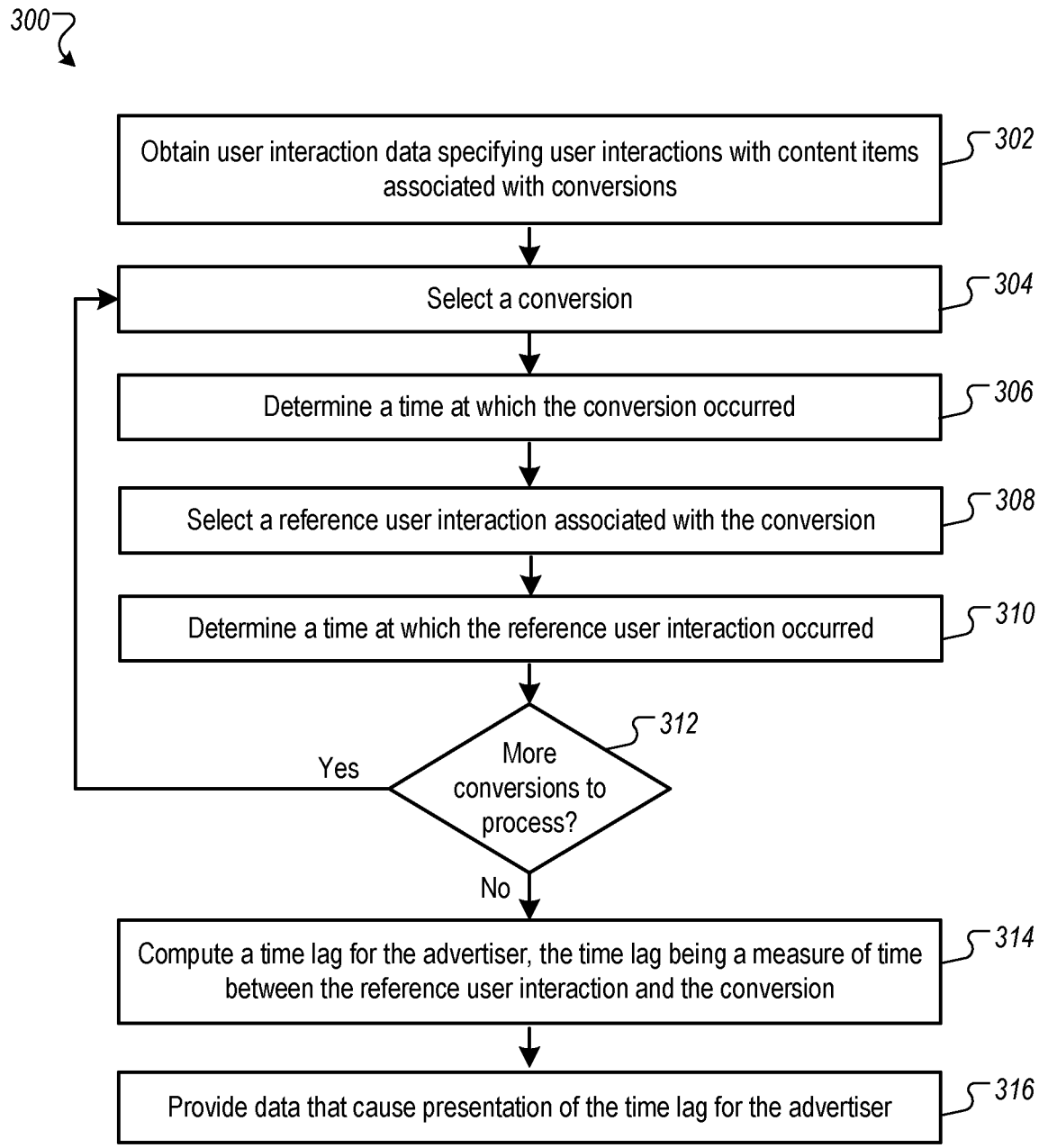
FIG. 3A is a flow chart of an example process for determining time lags for advertisement conversions.

FIG. 3A is a flow chart of an example process 300 for determining time lags for advertisement conversions. A time lag is an amount of time between a reference user interaction and a conversion. The reference interaction the user can be, for example, a first impression, a first click, or another specified interaction from which a time to conversion can be computed.

In general, time lags represent how long it takes a potential customer (e.g., a user executing a browser on a client device 106) to convert following the reference user interaction. For example, a user may spend more time researching alternative products or services as the cost of the product or service increases. Therefore, a time lag for higher priced items may be longer than the time lag for lower priced items, as users may spend more time researching higher priced item (e.g., a European vacation or a home theatre system) than they spend researching lower priced items (e.g., a T-shirt).

The process 300 is a process by which one or more conversions are selected from user interaction data that specify user interactions with content items, and a time at which each conversion occurred is determined. In turn, a reference user interaction is selected from the user interaction data for each conversion and a time at which each reference user interaction occurred is determined. A time lag is then computed for each of the conversions using the time at which the conversion occurred and the time at which the reference user interaction occurred. Measures of time lag ("time lag measures") can be presented, for example, in a time lag report.

The process 300 is described below with reference to advertising campaigns that control distribution of advertisements in an online environment. However, the process 300 can also be used with other content distribution campaigns that control distribution of other content (e.g., video, audio, or other content).

The process 300 can be implemented, for example, by the performance analysis apparatus 120 of FIG. 1. In some implementations, the performance analysis apparatus 120 is a data processing apparatus that includes one or more processors that are configured to perform actions of the process 300. In other implementations, a computer readable medium can include instructions that, when executed by a computer, cause the computer to perform actions of the process 300.

Different types of time lags can be determined by the process 300, including a "first impression" time lag, a "first click" time lag, and a last click time lag. As used throughout this document, the first impression time lag is an amount of time between the time at which a user is first presented a content item ("first impression time") and the time at which the user performs an action that constitutes a conversion ("conversion time"). The first impression time lag can be used to measure a conversion cycle. The first click time lag is an amount of time between the time at which the user first selects (e.g., clicks) a content item and the conversion time. The last click time lag is an amount of time between the time at which the "last click" occurred and the conversion time.

In some implementations, time lags are unbounded, such that any value of time lag can be provided to an advertiser. In other implementations, time lags can have upper bounds that limit the maximum time lag that is computed and/or reported.

For example, the first impression time lag can have an upper bound of 30 days. The upper bound can be determined based on data storage constraints (e.g., administratively imposed) that limit the amount of user interaction data that are stored. For example, if data storage constraints specify that 90 days of user interaction data are to be stored for each conversion, then the performance analysis apparatus 120 can be configured to compute and/or provide time lags that are up to 90 days long. Similarly, the advertising data store 119 can be configured to maintain user interaction data that occurred within the upper bound. For example, the advertising data store can be configured such that user interaction data that occurred outside of the upper bound expires and/or is overwritten by new user interaction data. The upper bounds used for time lags can be established by the advertisement management system 110, or an administrator thereof, for use by the performance analysis apparatus 120.

In some implementations, the system 100 can use different upper bounds for different advertisers 108. For example, some advertisers may offer products or services that have a longer average time lag than products or services that are provided by other advertisers. Therefore, the advertisers offering products or services that have longer average time lag may require a larger upper bound to receive accurate measures of time lag than the upper bound required to provide the other advertisers with accurate measures of time lag.

User interaction data specifying user interactions with content items is obtained (302). The content items can be, for example, ads presented with search results, banner ads, text ads, video content, or audio content. Forms of user interactions can include presentation of a content item (i.e., an impression) to a user, selection (i.e., a click) of a content item by a user, and presentation of all or a portion of an audio and/or video content item to the user. In some implementations, the user interaction data for each converting user (i.e., a user that performs an action that constitutes a conversion) are collected over a specified time period (e.g., as specified by the upper bound). For example, user interaction data can be collected for all user interactions that have occurred with each converting user over the last two months (or other specified time periods).

As an example, referring to FIG. 1, the system 100 can obtain user interaction data corresponding to advertisement conversions (e.g., conversions related to "Brand X" tennis shoes) that are associated with user interactions with content items using the client device 106. The user interactions can include queries 116 that were submitted by a converting user, presentation of advertisements and search results 118 that are responsive to the converting user's queries 116, and subsequent actions performed by the converting user after presentation of the advertisements and search results 118. The advertisements that are presented with the search results 118 can be advertisements that are associated with one or more targeting keywords ("tennis," "shoes," and "Brand-X"), and were selected for presentation, for example, based on the one or more targeting keywords being matched by a search query 116. If the user subsequently performs an act constituting a conversion (e.g., purchases "Brand-X" tennis shoes), the user interaction data can be associated with the conversion. In some implementations, user interactions for each conversion are one or more presentations of content items during a conversion cycle for the conversion and zero or more user selections of the content items that occurred during the conversion cycle. In other implementations, the user interactions can be one or more user selections of the content items during the conversion cycle (i.e., a specified period preceding the conversion).

The obtained user interaction data specify user interactions that are associated with a particular advertiser. User interactions that are associated with a particular advertiser are user interactions with content items provided by the advertiser. User interaction data that represent user interactions are associated with the advertiser by being stored with an advertiser identifier (e.g., an advertiser name, campaign name, and/or another identifier) that represents the advertiser and/or by being indexed according to the advertiser identifier or to a same index key (e.g., a same conversion identifier) as the ad campaign identifier.

User interactions that are specified by the user interaction data can also be associated with one or more conversions. For example, a user with which one or more user interactions occurred (i.e., a user that was presented one or more advertisements and/or selected one or more of the presented advertisements) can subsequently purchase goods from a retailer (i.e., complete a conversion). In this example, the impressions and/or selections of content items (e.g., advertisements) that occurred prior to the conversion can be identified as user interactions that are associated with the conversion, and can be stored with the conversion identifier that represents the conversion and/or be indexed according to the conversion identifier. If another conversion occurs prior to any additional user interactions and/or within the conversion cycle for the other conversion, the user interactions described above can also be associated with the other conversion in a similar manner.

For example, a user can be presented a first ad for a pizza chain and later be presented a second ad for a pizza chain without selecting either of the two ads. The user can then submit the URL for a web page of the pizza chain and order a pizza online (i.e., perform an act that constitutes a conversion). In this example, the impressions (i.e., the presentations of the two ads by the user) can be associated with the conversion (i.e., the purchasing of the pizza by the user), as described above. If the user again submits the URL of the web page and orders another pizza (or performs another act that constitutes a conversion) the impressions can also be associated with a second conversion, assuming that the impressions occurred within the conversion cycle for (i.e., within a specified period preceding) the second order.

As described above, each conversion can also be associated with content items that were presented and/or selected during the conversion cycle for the conversion as well as targeting keywords that control distribution of the content items. In some implementations, data specifying a targeting keyword that was matched, and therefore, caused a content item to be presented during the conversion cycle for the conversion can be stored at a memory location associated with the conversion and/or indexed according to a conversion identifier representing the conversion. For example, if the targeting keyword "clothing" causes presentation of an ad to a user and the user subsequently selects (i.e., clicks) the presented ad, the keyword "clothing" can be associated with the user selection. If the user subsequently completes a conversion, then the selection of the ad is identified as a user interaction for the conversion.

User interactions and/or conversions can be associated with one or more ad groups and/or ad campaigns based on the associations of the user interactions and/or conversions with targeting keywords that belong to the respective ad groups and/or ad campaigns. For example, a user interaction that is associated with a particular targeting keyword can be associated with ad groups and/or ad campaigns to which the particular targeting keyword belongs based on the association of the user interaction with the targeting keyword.

A conversion is selected from the user interaction data (304). In some implementations, the conversion can be selected in response to receiving a request, from an advertiser, for a time lag report (i.e., a report that provides measures of time lag) for a content distribution campaign (e.g., ad campaign). For example, an advertiser may access a user interface similar to that described with reference to FIGS. 3B and 3C, and request a time lag report that specifies one or more measures of time lag for a particular ad campaign, particular ad group, or particular targeting keyword. In turn, data for the conversions that will be used for computing the measures of time lag can be selected.

In other implementations, the conversion can be selected as part of a periodic time lag report update. For example, a time lag report can be generated and, in turn, updated periodically to provide an advertiser with an updated time lag report upon demand. Pre-computing time lag reports can provide faster access to the reports in response to the request. The description that follows describes selecting an individual conversion, but groups of conversions can also be selected for processing.

In some implementations, the performance analysis apparatus 120 selects a conversion (e.g., a conversion related to Brand-X tennis shoes) from a group of conversions that are stored in the advertising data store 119. The group can include the selected conversion related to Brand-X tennis shoes and other unrelated conversions, such as for pet toys or European vacations.

For example, the performance analysis apparatus 120 can access the advertising data store and identify each conversion that is associated with a particular advertiser for which a time lag report is being generated or updated. The performance analysis apparatus 120 can identify conversions that are associated with a particular advertiser, for example, by searching the user interaction data for the advertiser identifier representing the particular advertiser and identifying the conversions to which each instance of the advertiser identifier is indexed, as described in more detail with reference to FIG. 10.

Once the conversions that are associated with the particular advertiser have been identified, the performance analysis apparatus 120 can select one or more of the conversions. The conversions can be selected randomly, in an order in which they are indexed in the user interaction data, or in another predetermined order. For example, the user interaction data can include a set of conversions that each has a unique conversion identifier that uniquely identifies the conversion with which the identifier is associated. In this example, the conversions can be selected in sequential order of the conversion identifiers. Each conversion can also have a timestamp that specifies a time at which the conversion occurred, and the timestamp can be used to select conversions in chronological order in which the conversions occurred.

A time at which the conversion occurred is determined (306). As described above, each conversion can have a timestamp that represents a time at which the conversion occurred. In some implementations, the time at which the conversion occurred is the time at which the act that constituted the conversion was detected. For example, when the advertisement management system 110 receives data specifying that a conversion occurred, the data can include a timestamp or the advertisement management system can append a timestamp to the data specifying the occurrence of the conversion. In turn, the advertisement management system 110 can store the data specifying the occurrence of the conversion and its corresponding timestamp in the advertising data store 119. Therefore, when the performance analysis apparatus 120 obtains the conversion from the advertising data store 119, the performance analysis apparatus 120 can read the timestamp for the conversion to determine the time at which the conversion occurred.

A reference user interaction associated with the conversion is selected (308). In some implementations, the reference user interaction is a user interaction that occurred prior to user selection (i.e., a user click) of a last selected content item (i.e., a last clicked content item preceding the conversion) for the advertiser. Continuing with the Brand-X tennis shoes example, assuming that at least one advertisement was presented to the advertiser before the last selected advertisement, the performance analysis apparatus 120 can select, as the reference user interaction, the first presentation of an advertisement, such as an advertisement for a new style of Brand X shoes, to the user.

The reference user interaction can be selected from the user interaction data that are associated with the selected conversion. As described above, user interaction that is associated with each conversion can be stored with the conversion identifier and/or indexed according to the conversion identifier. Therefore, the user interaction data can be searched and/or filtered to identify the user interactions that are associated with the conversion identifier for the conversion. In turn, the user interaction data can be analyzed to select the user interaction data that represents the reference user interaction.

For example, when the reference user interaction is an initial presentation of a content item prior to the presentation of the last user selected content item, the user interaction data can be analyzed to select, as the reference user interaction, the initial (i.e., first) presentation of a content item to the user. The initial presentation of a content item can be identified, for example, by analyzing timestamps for the user interactions to identify the content item presentation having the earliest timestamp. Alternatively, when the user interactions are stored in sequential order of occurrence, the first content item presentation listed in the sequence can be selected as the reference user interaction.

A time at which the reference user interaction occurred is determined (310). As described above, the data representing each user interaction can be stored with a timestamp representing a time at which the user interaction occurred. Therefore, the time at which the reference user interaction occurred can be determined by analyzing the timestamp for the reference user interaction. As described above, the timestamp for the reference user interaction can be appended to and/or stored with the data representing the particular user interaction.

A determination is made whether more conversions remain to be processed (312). When more conversions remain to be processed, then the process 300 selects another conversion (302). For example, the performance analysis apparatus 120 can determine that additional conversions remain to be processed, such as conversions that are being analyzed for a time lag report.

When no conversions remain to be processed, then measures of time lag are determined (314). The measures of time lag are measures of time between one or more reference user interactions and the conversions with which the user interactions are associated. The measures of time lags can include, for example, total time lags for each conversion, an average time lag for all, or a subset, of the conversions, a maximum and/or minimum time lag for any conversion, a median time lag, or other statistical measures of the measure of time between the reference user interactions and the associated conversions (e.g., standard deviation or mode).

In some implementations, the measures of time lag can be used to generate a time lag distribution for the conversions. The time lag distribution can be represented by a graphical histogram that organizes the conversions according to their respective time lags and generates a histogram the specifies a quantity of conversions that have time lags that are within each of multiple histogram bins, as described in more detail with reference to FIG. 3C.

In some implementations, advertisers can provide data that specifies the monetary value of each conversion, or another measure of value for each of the conversions. In these implementations, the measures of time lag can include measures of value that are computed relative to the time lag. For example, the total value of all conversions that have a time lag between X and Y can be computed, and compared to the total value of all conversions having a time lag between A and B. Similarly, average values of these groups of conversions can be computed and compared to each other to determine relationships between time lag and conversion values.

In some implementations, the measures of time lag can be computed on a per-targeting keyword basis. For example, the performance analysis apparatus 120, when determining advertisement conversion measures (e.g., time lags for an advertiser) can categorize and summarize the measures based on keywords (e.g., "tennis," "shoes," and "Brand-X"), advertisement groups (e.g., a group of sporting equipment advertisements), and one or more advertisement campaigns (e.g., a group of advertisements for tennis shoes).

Data are provided that cause presentation of the measures of time lag (316). In some implementations, For example, described in detail with reference to FIGS. 3B and 3C below, the performance analysis apparatus 120 can provide data that causes presentation of the measures of time lag in a time lag report that is presented to the user in a user interface. The data can be provided, for example, over the network 102 of FIG. 1, and displayed to an advertiser, for example, with a computer device executing at the advertiser's location.

Figure 3B:
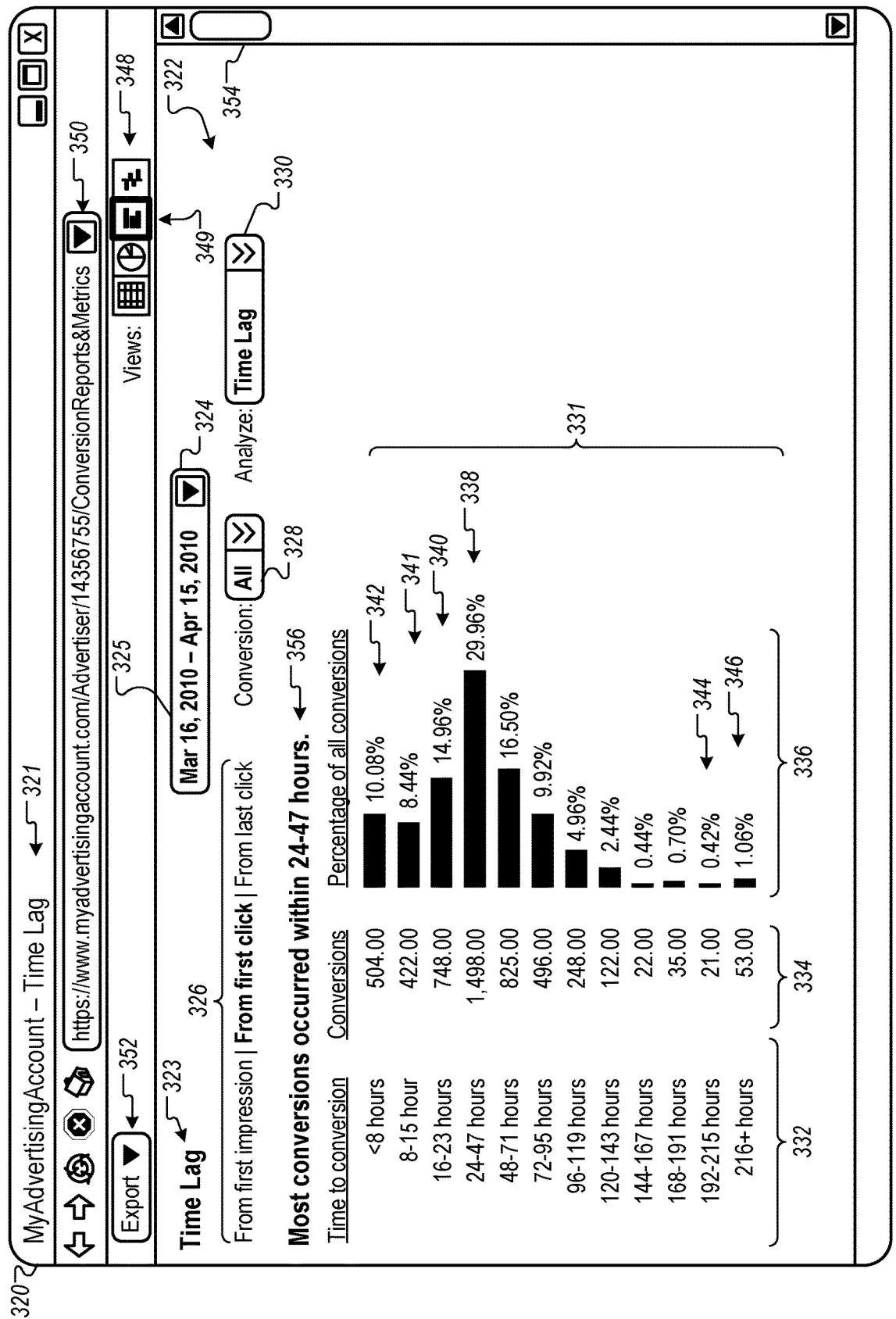
FIGS. 3B and 3C are screen shots of example user interfaces that display information for time lags for advertisement conversions.
Figure 3C:
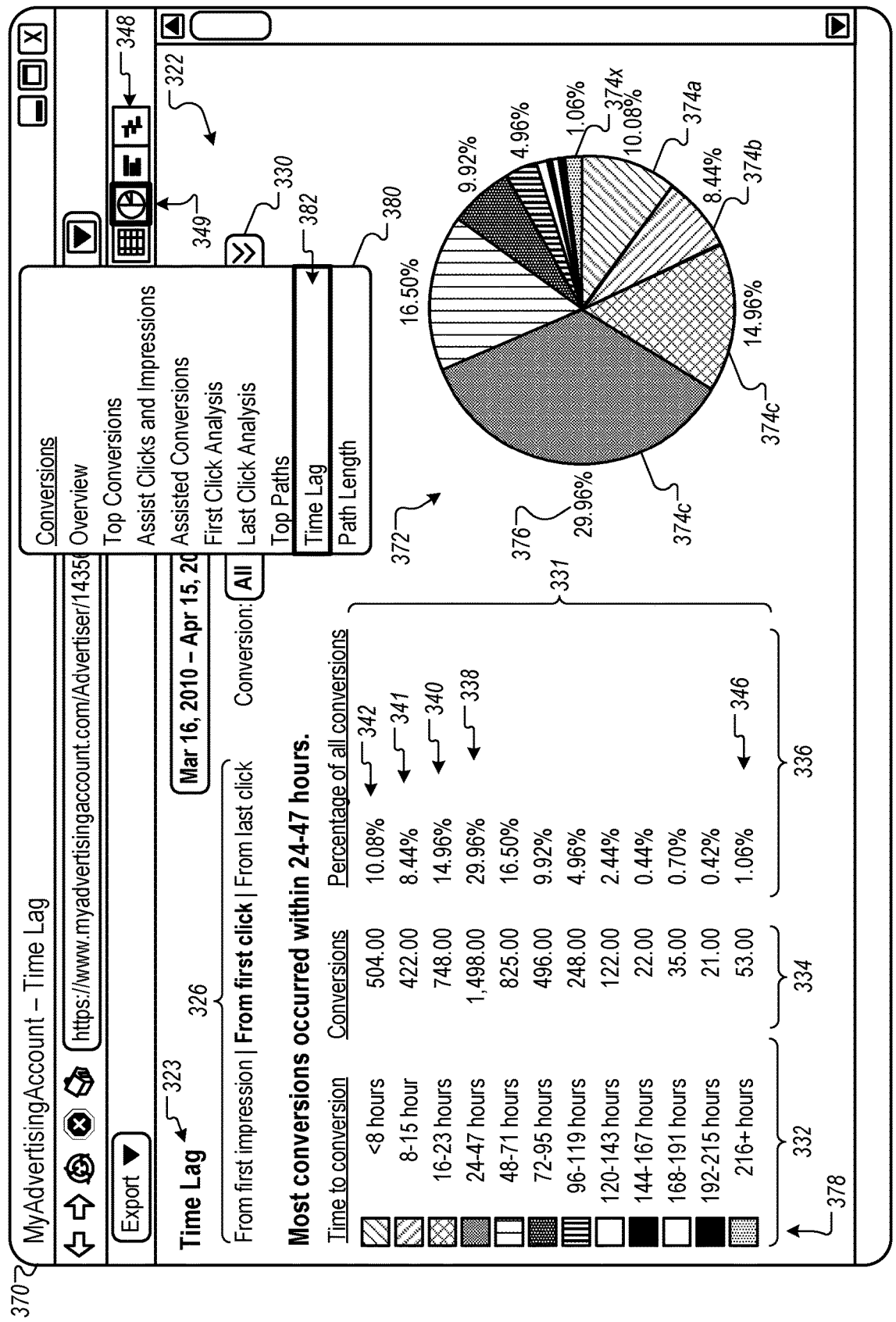

FIGS. 3B-3C are screen shots of example user interfaces 320 and 370 that display information for time lags associated with advertisement conversions. For example, an advertiser 108 (e.g., the advertiser of Brand X shoes) can use the user interfaces 320 and 370 to display and review information for advertisement conversion measures and reports associated with conversion time lags. In some implementations, the user interfaces 320 and 370 are displayed in a web browser by an advertiser 108 based on information provided over the network 102. In some implementations, the information used in the user interfaces 320 and 370 is based on conversion information determined by the advertisement management system 110 and/or the performance analysis apparatus 120. For example, some conversion information displayed in the user interfaces 320 and 370 can be determined using the process 300 described with reference to FIG. 3A.

The user interface 320 includes a header 321 and a data page 322. The header 321 (e.g., "MyAdvertisingAccount—Time Lag") identifies the information in the user interface 320 as relating to conversion time lag information associated with an advertising account. The data page 322 contains the advertisement conversion information, specifically displaying and summarizing conversion time lag information for a specific time period based on settings established by the user (e.g., the advertiser 108 displaying the user interface 320).

The data page 322 includes a page title 323 (e.g., "Time Lag") and a date range selection control 324. The page title 323 identifies the data page 322 as containing "Time Lag"

information, which is consistent with the subject displayed in the header 321. The date range selection control 324 provides a way for the user (e.g., advertiser) to identify a time period for which to display information on the data page 322. As shown, a current selection that the user has selected using the date range selection control 324 is the month-long period from Mar. 16 to Apr. 15, 2010. This time period can correspond to any time duration selected by the advertiser. For example, the user can select a time period as short as a few hours up to a time period of several days or weeks, such as a 30-day duration. The value for the current selection (i.e., the month-long period) can typically be more useful to an advertiser 108 if the time period includes conversions having a longer conversion cycle. This is because, in general, while some advertisement conversions can occur rapidly, even within a few seconds, others can take several days.

In some implementation, when the user selects the date range selection control 324, a calendar interface (not shown) can appear. For example, the user can identify dates in the current selection by clicking on individual cells on a calendar display, such as cells for Mar. 16 and Apr. 15, 2010. In some implementations, the date range selection control 324 can provide additional controls for specifying time ranges on specific dates. An example range using date and time, for example, can be noon on Mar. 16, 2010 to 4 PM on Mar. 17, 2010. In some implementations, various controls (e.g., sliders, etc.) can be used to allow the user to specify dates and times, without having to type in values explicitly. For example, a user can interact with drop down menus, radio buttons, and/or other user interface elements to select pre-selected or pre-specified values or ranges.

The data page 322 includes various settings for controlling the type of information that is to be displayed on the data page 322 for the current time period selection. A time lag type control 326 allows the conversion information displayed to be based on different types of lag times. In this case, the time lag type control 326 provides user options to display conversion information from the "first impression," from the "first click," or from the "last click." As shown in FIG. 3B, the current selection 327 is set to display conversion information from the first click.

The time lag report 322 includes a conversion type selection control 328 that enables the user to specify one or more types of conversions for which the time lag report includes related information. In some implementations, the conversion type selection control 328 can be a drop down menu having user selectable options. In other implementations, the conversion type selection control 328 can be a hypertext link or another user interface control element (e.g., a text box, check box, or radio button). In the example shown, the conversion type selection control 328 indicates that the time lag report includes information for "all" types of conversions is presented in the time lag report 322.

Time lag reports can be generated for each of many different types of conversions. In some implementations, each of the following user actions can be identified as a different conversion type: signing up for a mailing list, making a purchase, creating a user profile, making a reservation, requesting presentation of a video, requesting presentation of audio, downloading one or more files, installing one or more programs on the user device, or providing specified information.

Each advertiser can specify its own set of conversion types and the user actions that constitute a conversion for each conversion type. For example, an on-line gaming company can identify three types of conversions. The first conversion type can be identified as an information conversion that is completed when a mailing address (physical or electronic) is received from a user. The second conversion type can be identified as a download conversion that is completed when a user downloads and/or installs a trial version of an on-line game. The third conversion type can be identified as a purchase conversion that is completed when a user purchases an on-line game. In this example, the conversion type selection control 328 enables allows the user (i.e., the advertiser) to request presentation of a time lag report that specifies measures of time lags for purchase conversions and/or a time lag report that specifies measures of time lags for other types of conversions (e.g., information conversions or download conversions).

In some implementations, the time lag report 322 can separately specify, in a single user interface display, measures of time lags for more than one conversion type. Continuing with the example above, in response to a request for a time lag report that includes separate measures of time lags for purchase conversions and download conversions, data can be provided that cause presentation of the measures of time lags for the purchase conversions at a display location that is adjacent to the display location of the measures of time lags for the download conversions. Thus, a user can directly compare the measures time lags for purchase conversions to the measures of time lags for the download conversions.

An analysis type selection control 330 allows the user to specify the type of information displayed on the screen. The current setting for the analysis type selection control 330 is "Time Lag", which agrees with the "Time Lag" annotations indicated in the header 321 and the page title 323. As an example of how to change the type of information displayed in the user interface 320, the user can select a different setting (e.g., "Path Length") from the analysis type selection control 330. As a result, path length-related information is displayed in user interface 320 (as described below with reference to FIG. 4B), and the header 321 and the page title 323 are updated to indicate the new selection (e.g., "Path Length").

A table portion 331 in the data page 322 provides the detailed information of interest within the user interface 320. For example, the table portion 331 shown in FIG. 3B includes data values and display areas related to conversion time lags. The table portion 331, as depicted using the current settings for various user controls and settings, includes rows of information arranged in three columns. A time lag ranges column 332 (e.g., "Time to conversion") identifies ranges of time lags corresponding to conversions. For instance, the time lags ranges listed in the time lag ranges column 332 include ranges for less than eight hours, 8-15 hours, and so on up to a range of 216 or more hours. Each of the time lag ranges identifies a group of conversions for which a total quantity of conversions is displayed in the table portion 331.

A conversion counts column 334 identifies the quantity of conversions that occurred for each of the time lag ranges identified by the time lag ranges column 332. A conversion percentages column 336 identifies the overall percentage (e.g., relative to 100% of the conversions) that each of the conversion ranges represents, on a row-by-row basis in the table portion 331.

For example, a row 338 in the table portion 331 identifies 1,498 as the quantity of conversions that occurred within 24-47 hours of a first click (e.g., a user's first click on an ad impression). The value 1,498 represents 29.96% of the overall total of conversions, as indicated by the percentage displayed in the row 338.

In another example, as indicated in a row 340, a total of 748 conversions occurred within 16-23 hours of the first click. This value represents 14.96% of the conversions that occurred during the month-long period from Mar. 16 to Apr. 15, 2010.

In another example row 342, the value of 504 conversions, or 10.8%, occurred in less than eight hours. In other example rows 344 and 346, a total of 21 conversions occurred within 192-215 hours, and a total of 53 conversions occurred after 216 or more hours.

The user interface 320 includes a display type selection control 348 that can be used, for example, to select one or more type of views for displaying information in the conversion percentages column 336. For example, the view selection 349 currently selected is the bar graph option, as indicated by a bar graph icon. As a result, in addition to the percentages displayed in the conversion percentages column 336, bar graphs of various lengths are also displayed, each proportional to the percentage of conversions represented by a particular row (e.g., rows 338, 340, 341, etc.). The longest bar graph in this case appears in the row 338, representing the highest quantity (e.g., 1498) of the conversions for any one conversion time lag ranges listed in the time lag ranges column 332.

The user interface 320 includes other controls and areas. For example, an address bar 350 can identify the address (e.g., URL) that is associated with the current display of the user's browser, in this case time lag information for an advertising account. An export control 352 can provide the user with options for exporting information from the user interface 320, primarily the information included in the table 331 and the identification of any user settings used to generate the data. A scroll bar 354 is provided in some implementations to allow the user to scroll to other parts of the user interface 320, for example if the entries in the table 331 are outside the viewport of the data page 322.

The data page 322 includes a summary 356 (e.g., "Most conversions occurred within 24-47 hours") which can be used to direct the user's attention to specific information on the user interface 320. For example, the summary 356 in this case points out that the highest quantity of conversions corresponds to the information displayed in the row 338.

As shown in FIG. 3C, the information displayed in the user interface 370 differs from that displayed in the user interface 320. The data page 322 in the user interface 370 includes a pie chart display 372 that is can appear, for example, as a result of a different view selection 349 that is chosen by the user from the display type selection control 348. This contrasts with the bar chart display on the data page 322 shown in FIG. 3B.

The pie chart 372 includes sectors 374a through 374x, each representing a conversion percentage that appears in the corresponding row in the table portion 331. For example, the percentage 10.08 that appears in the row 342 is represented in the pie chart display 372 as the sector 374a. Continuing clockwise from the sector 374a, the sector 374b (e.g., marked 8.44%) corresponds to the row 341, the sector 374c (e.g., marked 14.96%) corresponds to the row 340, and so on through the sector 374x (e.g., marked 1.06%) that corresponds to the row 346. The largest sector 374d corresponds to the row 338 in the table portion 331 that has the highest percentage, 29.96%, and includes a label 396 indicating the percentage. Different shading of the individual sectors (e.g., sectors 374a-374x) in the pie chart 372 corresponds to the shading patterns shown in the shading key 378. In some implementations, shading patterns are replaced by color shading.

The user interface 370 also includes a view selection popup 380 that includes view options that can be available, for example, upon selection of the analysis type selection control 330. As shown, a "Time Lag" selection 382 is currently selected from the view selection popup 380. As a result, the information displayed in the user interface 370 is information related to time lags before advertisement conversions.

Path Length

Figure 4A:
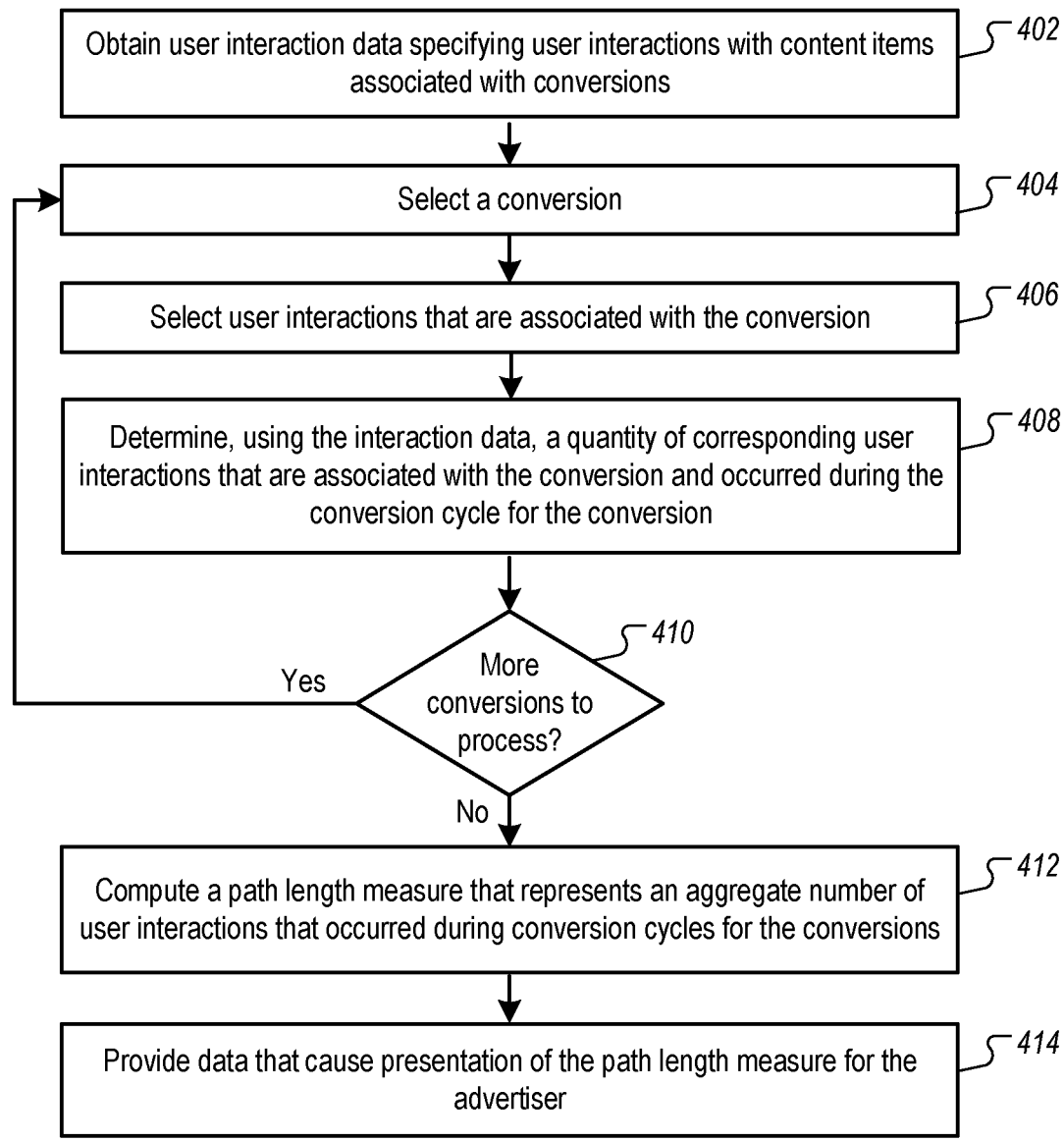
FIG. 4A is a flow chart of an example process for determining path lengths for advertisement conversions.

FIG. 4A is a flow chart of an example process 400 for determining path length for advertisement conversions. A path length is a measure of how many user interactions are included in a conversion path for a conversion. A conversion path for a conversion can include each impression and/or click (or other content-related user interactions) of a content item (ads) that is associated with a particular conversion by a particular user. Thus, the conversion path for a particular conversion can include every user interaction during the conversion cycle for the conversion.

An example conversion path related to a conversion for Brand X tennis shoes can include five user interactions, such that the conversion has a path length of five. In this example, a user can first be presented with an ad for Brand X (i.e., an impression of the ad occurs). The ad ("Ad 1") can be a general ad for the Brand X manufacturer, for instance, and not include a specific reference to shoes. This initial impression of Ad 1 can represent the first user interaction in the user's path to conversion. If the user clicks on Ad 1, the act of clicking Ad 1 can be considered another user interaction in the conversion path. The user can subsequently be presented with a Brand-X tennis equipment ad ("Ad 2"), which can represent a third user interaction in the conversion path. A fourth user interaction in the conversion path can be presentation of a Brand X tennis shoe ad ("Ad 3") and the user's selection of Ad 3 can be the "last click" and the final user interaction in the conversion path prior to converting (e.g., buying a pair of Brand X tennis shoes).

In general, path lengths represent how many user interactions occur during a conversion cycle for a conversion. For example, a user may perform more searches (i.e., submit more search queries) researching alternative products or services as the cost of the product or service that they are researching increases. Therefore, the quantity of interactions with the user may also increase, such that a path length for higher priced items may be longer than the path length for lower priced items. The quantity of user interactions during a conversion cycle, and in turn, path lengths can also vary for reasons other than the price of the product or service being offered. For example, the path length may vary based on the quality of the advertisements that are presented to the user and/or how well targeted the advertisements are.

The user interactions of a conversion path can be represented by keywords that caused presentation of the presented and/or clicked content items, URLs of web pages with which the content items were presented, and/or interaction indicators that specify whether the content item was presented and/or selected. Representations of the user interactions can be presented, for example, according to a sequence in which the user interactions occurred. For example, the conversion path associated with the user's purchase of Brand X tennis shoes can be illustrated by a sequential listing of the keywords that caused presentation of the content items.

The process 400 is a process by which one or more conversions are selected from user interaction data that specify user interactions with content items. In turn, a path length (i.e., a quantity of user interactions in a conversion path) is then determined for each of the conversions using impressions and/or clicks that are associated with the conversion that are included in the conversion path for the conversion path length measures are computed using the path lengths of the conversions, and the path length measures can be presented, for example, in a path length report.

The process 400 is described below with reference to advertising campaigns that control distribution of advertisements in an online environment. However, the process 400 can also be used with other content distribution campaigns that control distribution of other content (e.g., video, audio, games, or other content).

The process 400 can be implemented, for example, by the performance analysis apparatus 120 of FIG. 1. In some implementations, the performance analysis apparatus 120 is a data processing apparatus that includes one or more processors that are configured to perform actions of the process 400. In other implementations, a computer readable medium can include instructions that, when executed by a computer, cause the computer to perform actions of the process 400.

Path length measures can be determined for various types of user interactions. For example, impression path length measures and click path length measures can be separately computed using the method 400. As used throughout this document, the impression path length measure is a path length measure that is computed using the quantity of content item impressions (e.g., a total number of search ad impressions) that occurred during conversion cycles for selected conversions. In some implementations, the quantity of content item impressions is determined using only content item impressions that did not result in a click. In other implementations, the quantity of content item impressions is determined using a total quantity of content item impressions, irrespective of whether the impressions resulted in a click by the user. Click path length measures are measures of path length that are computed using a quantity of content item clicks (i.e., user selections of content items) that occurred during conversion cycles of selected conversions. The quantity of content item clicks can be, for example, a total quantity of search ad clicks that preceded a conversion. In some implementations, the quantity of content item clicks for each conversion can include the "last click" for the conversion while in other implementations, the last click can be omitted from the quantity of content item clicks.

User interaction data specifying user interactions with content items are obtained (402). As described above, content items can be ads that are presented with search results, banner ads, text ads, video content, or audio content and user interactions can include presentations of content items, user selections (i.e., clicks) of content items, and presentation of an audio and/or video content item. In some implementations, the user interaction data includes data representing all user interactions prior to a conversion. In other implementations, the user interaction data includes data representing user interactions that occurred within a specified period of time of the conversion (e.g., within three months of the conversion). As described in more detail below, the user interaction data that is obtained can include a set of conversions for one or more advertiser, the user identifiers representing converting users for each of the conversions, and data representing user interactions with advertisements during the conversion cycle and by the converting users.

In some implementations, the obtained user interaction data specify user interactions that are associated with a particular advertiser and/or user interactions that are associated with one or more conversions for the particular advertiser. User interactions that are associated with a particular advertiser are user interactions with content items provided by (or provided for) the advertiser. User interaction data can be associated with the advertiser by being stored with an advertiser identifier (e.g., an advertiser name, campaign name, and/or another identifier) that represents the advertiser and/or by being indexed according to the advertiser identifier or indexed to a same index key (e.g., a same conversion identifier) as the advertiser identifier.

As described above, user interactions that are specified by the user interaction data can also be associated with one or more conversions. For example, impressions and/or selections (i.e., clicks) of content items (e.g., advertisements) that occurred prior to a conversion can be identified as user interactions that are associated with the conversion and user interaction data representing the user interactions that are associated with the conversion can be stored with a conversion identifier that represents the conversion and/or by being indexed according to the conversion or indexed to a same index key as the conversion identifier. If another conversion occurs prior to any additional user interactions and/or within the conversion cycle for the other conversion, the impressions and/or clicks can also be associated with the other conversion in a similar manner.

As described above, each conversion can also be associated with content items that were presented to and/or selected by a particular user during the conversion cycle for the conversion as well as targeting keywords that control distribution of the content items. In some implementations, data specifying a targeting keyword that was matched, and therefore, caused a content item to be presented during the conversion cycle for the conversion can be stored at a memory location associated with the conversion and/or indexed according to a conversion identifier representing the conversion. User interactions and/or conversions can be associated with one or more ad groups and/or ad campaigns based on the associations of the user interactions and/or conversions with targeting keywords that belong to the respective ad groups and/or ad campaigns, as described above with reference to FIG. 3A.

A conversion is selected from the user interaction data (404). In some implementations, the conversion can be selected in response to receiving a request, from an advertiser, for a path length report (i.e., a report that provides path length measures) for a content distribution campaign (e.g., ad campaign). For example, an advertiser may access a user interface similar to that described with reference to FIG. 4B, and request a path length report that specifies one or more path length measures for a particular ad campaign, particular ad group, or particular targeting keyword. In turn, conversions for computing the path length measures can be selected.

In other implementations, the conversion can be selected as part of a periodic path length report update. For example, a path length report can be generated and, in turn, updated periodically to provide an advertiser with an updated path length report upon demand. Pre-computing path length reports can provide faster access to the reports in response to the request. The description that follows describes selecting an individual conversion, but groups of conversions can also be selected for processing.

In some implementations, the performance analysis apparatus 120 selects the conversion (e.g., a conversion related to Brand-X tennis shoes). For example, the performance analysis apparatus 120 can access the advertising data store 119 and identify each conversion that is associated with a particular advertiser for which a path length report is being generated or updated. The performance analysis apparatus 120 can identify conversions that are associated with a particular advertiser, for example, by searching the user interaction data for the advertiser identifier representing the particular advertiser and identifying the conversions by which each instance of the advertiser identifier is indexed, as described in more detail with reference to FIG. 10.

Once the conversions that are associated with the particular advertiser have been identified, the performance analysis apparatus 120 can select one or more of the conversions. The conversions can be selected randomly, in an order in which they are indexed in the user interaction data, or in another predetermined order. For example, the user interaction data can include a set of conversions that each has a unique conversion identifier that uniquely identifies the conversion with which the identifier is associated. In this example, the conversions can be selected in sequential order of the conversion identifiers. Each conversion can also have a timestamp that specifies a time at which the conversion occurred, and the timestamp can be used to select conversions in chronological order in which the conversions occurred.

User interactions that are associated with the selected conversion are selected from the user interaction data (406). In some implementations, the selected user interactions are user interactions with the converting user prior to an action that constituted a conversion. When the user interaction data are indexed according to the conversion with which the user interaction data are associated, as described in more detail with reference to FIG. 10, the user interactions can be selected by examining (e.g., searching) and/or filtering the user interaction data that are indexed to the selected conversion.

In some implementations, the identified user interactions for each user are interactions for that user that occurred at any time prior to the conversion that is associated with that user. In other implementations, the identifier user interactions are user interactions that occurred within a specified time preceding the conversion. For example, the identified user interactions may include the user interactions that occurred within 30 days preceding the conversion, but exclude user interactions that occurred prior to the 30 days preceding the conversion.

The specified time can be specified by the advertiser or determined, for example, on an advertiser specific basis according to an analysis of the time lag measures for each advertiser. In some implementations, the specified time for each advertiser can be selected as a threshold period that exceeds time lag measures for at least a minimum portion of the advertiser's conversions. For example, using the time lag measures for the advertiser, a specified time can be selected that is greater than the first impression time lag for at least 67% of the advertiser's conversions.

For example, when the reference user interaction is an initial presentation of a content item prior to the presentation of the last clicked content item, the user interaction data can be analyzed to select, as the reference user interaction, the initial (i.e., first) presentation of a content item to the user. The initial presentation of a content item can be identified, for example, by analyzing timestamps for the user interactions to identify the content item presentation having the earliest timestamp. Alternatively, when the user interactions are stored in sequential order of occurrence, the first content item presentation listed in the sequence can be selected as the reference user interaction.

Once the reference user interaction has been selected the user interactions that occurred following the reference user interaction, but prior to the conversion, can be selected from the user interaction data. When a timestamp is stored with each user interaction, the selected user interactions can be user interactions having timestamps that specify a time between the timestamp for the reference user interaction and the timestamp for the conversion. When the user interactions are stored in sequential order of occurrence, each of the user interactions that are located between the reference user interaction and the conversion can be selected.

A quantity of user interactions that are associated with the conversion is determined (408). In some implementations, the determination is made using the user interaction data for the selected user interactions that occurred during the conversion cycle for the conversion. For example, the quantity of user interactions can be determined using an impression volume (e.g., a quantity of impressions) and a click volume (e.g., a quantity of clicks) that includes the last click for the conversion cycle.

In other implementations, the determination is made using the user interaction data for the selected user interactions that occurred during the conversion cycle for the conversion and prior to the last click for the conversion. For example, the quantity of user interactions can be determined using an impression volume (e.g., a quantity of impressions) and a click volume (e.g., a quantity of clicks) that does not include the last click for the conversion cycle. In some implementations, the quantity of user interactions associated with the selected conversion can be determined by summing of a quantity of impressions that are associated with the selected conversion and a quantity of user selections of content items for the conversion.

A determination is made whether more conversions remain to be processed (410). When more conversions remain to be processed, then the process 400 selects another conversion (404). For example, when a path length report is being generated for a particular advertiser, the performance analysis apparatus 120 can determine that additional conversions remain to be processed for the particular advertiser.

When no conversions remain to be processed, a path length measure is computed for the conversion (412). In some implementations, the path length measure can represent an aggregate quantity of user interactions that occurred during conversion cycles for a set of conversions. One example of a path length measure is an average path length for the conversions. The average path length for the conversions can be computed as a ratio of the total quantity (i.e., the value of the sum) of content item impressions and user selections of content items that are included in a conversion path for the conversion. For example, an average path length of four can represent that on average, four user interactions occur prior to a conversion. This example conversion path can include an impression of the Brand X ad, a subsequent user selection (i.e., click) of the Brand X ad, an impression of the Brand-X tennis equipment ad, and the user's last click on the ad for Brand X tennis equipment ad.

Other path length measures can also be computed. For example, a maximum path length for the conversions, minimum path length for the conversions, a median path length, and other statistical measures (e.g., standard deviation) can be computed. Additionally, the quantity of user interactions associated with each conversion can be used to generate a histogram that represents the distribution of conversions according to path length, as described in more detail with reference to FIGS. 4B and 4C.

Path length measures can be filtered and/or computed on a user interaction type basis. In some implementations, the path length measure is computed by computing a click path length measure that specifies a quantity of advertisement selections, by converting users, that are included in the conversion path. For example, the click path length measure can be computed using the quantity of advertisements clicks that are included in the conversion path for the conversion, but excluding the quantity of impressions for the conversion path. In these implementations, the quantity of user interactions that are associated with the conversion can be determined to be a quantity of user selections of advertisements that are included in the conversion path for the selected conversion.

In some implementations, the path length measure can be computed by computing an impression path length measure for the conversion cycle. The impression path length measures the quantity of search queries that were submitted during the conversion cycles and matched the targeting keywords. For example, converting users can submit several queries that match targeting keywords prior to the conversion. The impression path length measure can be computed using the quantity of advertisement impressions that are included in the conversion path for the conversion, but excluding the quantity of clicks for the conversion path. In these implementations, the quantity of user interactions that are associated with the conversion can be determined to be a quantity of advertisement impressions that are included in the conversion path for the selected conversion.

Data are provided that cause presentation of the path length measure (414). For example, as described in detail with reference to FIG. 4B below, the performance analysis apparatus 120 can provide data that causes presentation of the path length measure in a path length report that is presented to the user in a user interface. The data can be provided, for example, over the network 102 and displayed to an advertiser, for example, with a computer device executing at the advertiser's location.

In some implementations, the process 400 further includes obtaining value measures for the conversions. Each value measure is a measure of monetary value or another measure of value that is assigned to a particular conversion. An aggregate value of the conversions is computed using the value measures, and data are provided that causes presentation of the aggregate value of the conversions. In some implementations, the aggregate value can be a total value, an average value, or another computed aggregate value that is representative of the values of the conversions.

For example, using conversions related to Brand X tennis shoes, the performance analysis apparatus 120 can determine the aggregate dollar value of conversions related to tennis shoes bought from Brand X ads. The value can be, for example, an average that is computed based on several conversions (e.g., by the same user or several different users over time). The aggregate value can be provided for presentation to the advertiser, such as in a user interface described below with reference to FIG. 4B.

Figure 4B:
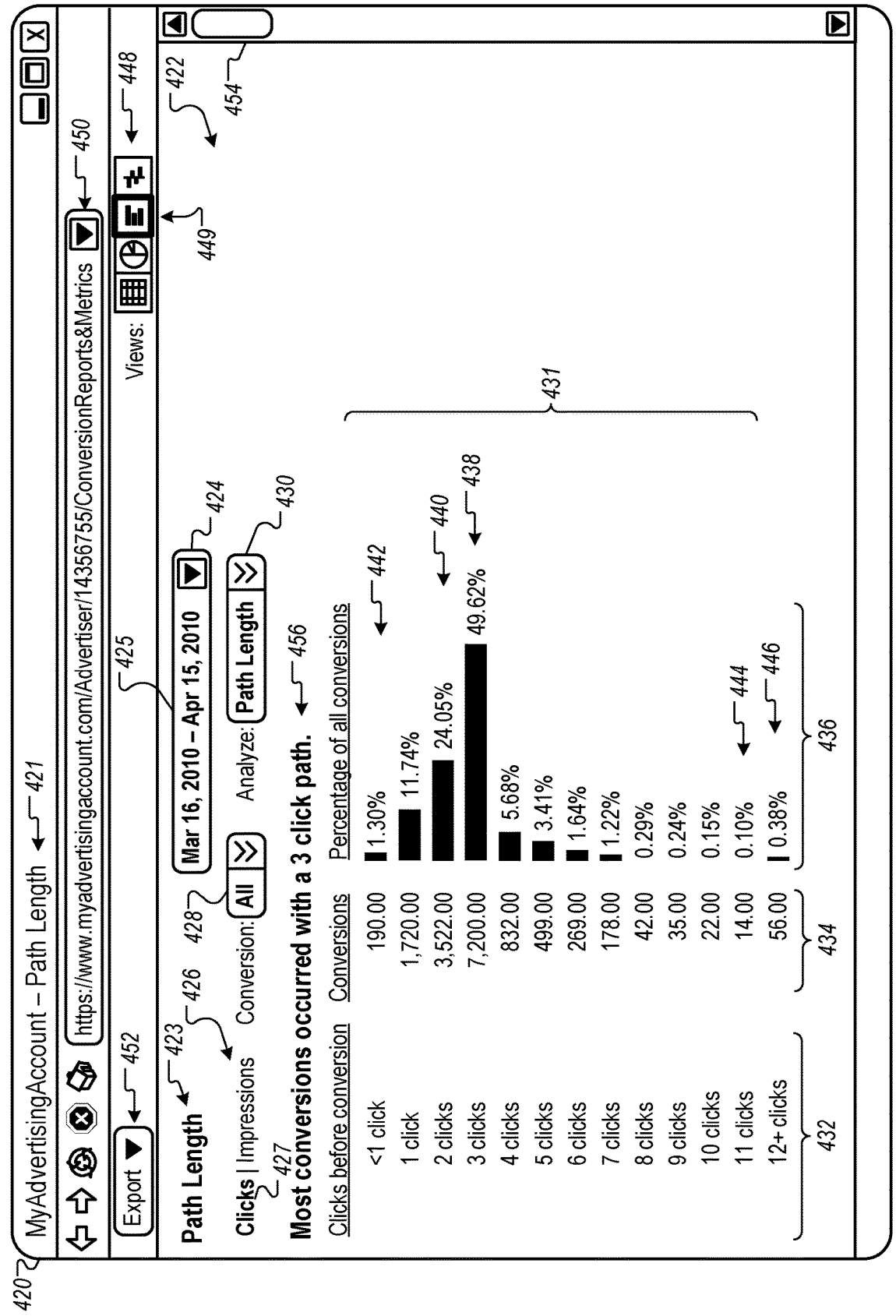
FIG. 4B is a screen shot of an example user interface for providing path length measures for conversions.

In some implementations, a histogram of path length measures, such as the histogram of FIG. 4B, can be generated, where each histogram group represents a particular path length (or range of path lengths) and specifies a quantity of conversions having a path length that matches the particular path length (or is within the range of path lengths). In these implementations, an aggregate value can be determined for the conversions that are represented by the histogram group. For example, ten conversions having a path length of three can be represented by a histogram bar having a value of ten. In this example, the aggregate value for the ten conversions can be a total value of the ten conversions, a ratio of the total value relative to the quantity of conversions (i.e., total value/no. of conversions), or another statistical measure of aggregate value. The performance analysis apparatus 120 can generate the histograms and provide information for presenting a histogram that represents the aggregate values associated with conversions.

FIG. 4B is a screen shot of an example user interface 420 for providing path length measures for conversions. For example, an advertiser 108 (e.g., the advertiser of Brand X shoes) can use the user interface 420 to display and review information for advertisement conversion measures and reports associated with conversion path lengths. In some implementations, the user interface 420 is displayed in a web browser by an advertiser 108 based on information provided over the network 102. In some implementations, the information provided in the user interface 420 includes conversion information (e.g., path length measures for conversions and associated data) provided by the advertisement management system 110 and/or the performance analysis apparatus 120. For example, some conversion information displayed in the user interface 420 can be determined using the process 400 described with reference to FIG. 4A.

The user interface 420 includes a header 421 and a path length report 422. The header 421 (e.g., "MyAdvertisingAccount—Path length") identifies the information in the user interface 420 as relating to conversion path length information associated with an advertising account. The path length report 422 contains the advertisement conversion information, specifically displaying and summarizing conversion path length information for a specific time period based on settings established by the user (e.g., the advertiser 108 displaying the user interface 420).

The path length report 422 includes a page title 423 (e.g., "Path Length") and a date range selection control 424. The page title 423 identifies the path length report 422 as containing "Path Length" information, which is consistent with the subject displayed in the header 421. The date range selection control 424 enables the user (e.g., advertiser) to specify a date range for the assisted conversion measures that are presented in the path length report 422. The date range specified in the date range selection control 424 can be used to select data with which the path length measures presented in the path length report 422 are computed. For example, the date range can be used to select user interaction data that are associated with conversions that occurred within the specified date range, user interaction data that are associated with conversion paths (or cycles) where the entire conversion path occurred during the specified date range, or user interaction data that are associated with conversion paths where any portion of the conversion path occurred during the specified date range.

As shown, a current time period selection 425 that has been selected using the date range selection control 424 is the month-long period from Mar. 16 to Apr. 15, 2010. This time period can correspond to any time duration selected by the advertiser. For example, the user can select a time period as short as a few hours up to a time period of several days or weeks, such as a 30-day duration, and years. Some advertisers may select a longer date range than others because, in general, while some advertisement conversions can occur rapidly, even within a few seconds, others can take several days, weeks, or even years. As a result, path lengths that originate, for example, from the first ad impression that is presented the user, can span several hours or days before a conversion occurs.

In some implementations, when the user selects the date range selection control 424, a calendar interface (not shown) can appear. For example, the user can identify dates in the current selection 425 by clicking on individual cells on a calendar display, such as cells for Mar. 16 and Apr. 15, 2010. In some implementations, the date range selection control 424 can provide additional controls for specifying time ranges on specific dates. An example range using date and time, for example, can be noon on Mar. 16, 2010 to 4 PM on Mar. 17, 2010. In some implementations, various controls (e.g., sliders, etc.) can be used to allow the user to specify dates and times, without having to type in values explicitly. For example, a user can interact with drop down menus, radio buttons, and/or other user interface elements to select pre-selected or pre-specified values or ranges.

The path length report 422 includes various settings for controlling the type of path length report that is displayed in the user interface 420 for the current time period selection 425. A path length type control 426 can include, for example, active links or other user interface elements that upon selection cause submission of a request for one or more different types of path length reports. In the present example, the path length type control 426 can cause presentation of a click path length report or an impression path length report. For example, user selection of the "clicks" active link can cause submission of a request for a click path length report, while selection of the "impressions" active link can cause submission of a request for an impression path length report. In response to the submission, data that causes presentation of the selected report can be provided to the user device. As shown in FIG. 4B, the current selection 427 is set to display a click path length report and a click path length report is presented in the user interface 420.

The path length report 422 includes a conversion type selection control 428 that enables the user to specify one or more types of conversions for which the path length report includes related information. In some implementations, the conversion type selection control 428 can be a drop down menu having user selectable options. In other implementations, the conversion type selection control 428 can be a hypertext link or another user interface control element (e.g., a text box, check box, or radio button). In the example shown, the conversion type selection control 428 indicates that the path length report includes information for "all" types of conversions is presented in the path length report 422.

Path length reports can be generated for each of many different types of conversions. In some implementations, each of the following user actions can be identified as a different conversion type: signing up for a mailing list, making a purchase, creating a user profile, making a reservation, requesting presentation of a video, requesting presentation of audio, downloading one or more files, installing one or more programs on the user device, or providing specified information, and a separate path length report can be generated for each of these different conversion types.

Each advertiser can specify its own set of conversion types and the user actions that constitute a conversion for each conversion type. For example, an on-line gaming company can identify three types of conversions. The first conversion type can be identified as an information conversion that is completed when a mailing address (physical or electronic) is received from a user. The second conversion type can be identified as a download conversion that is completed when a user downloads and/or installs a trial version of an on-line game. The third conversion type can be identified as a purchase conversion that is completed when a user purchases an on-line game. In this example, the conversion type selection control 428 enables allows the user (i.e., the advertiser) to request presentation of a path length report that specifies path length measures for purchase conversions and/or an path length report that specifies path length measures for other types of conversions (e.g., information conversions or download conversions).

In some implementations, the path length report 422 can separately specify, in a single user interface display, path length measures for more than one conversion type. Continuing with the example above, in response to a request for a path length report that includes separate path length measures for purchase conversions and download conversions, data can be provided that cause presentation of the path length measures for the purchase conversions at a display location that is adjacent to the display location of the path length measures for the download conversions. Thus, a user can directly compare the path length measures for purchase conversions to the path length measures for the download conversions.

An analysis type selection control 430 allows the user to specify the type of information displayed on the screen. The current setting for the analysis type selection control 430 is "Path length", which agrees with the "Path length" annotations indicated in the header 421 and the page title 423. As an example of how to change the type of information displayed in the user interface 420, the user can select a different setting (e.g., "Time Lag") from the analysis type selection control 430. In response to the change, information related to the different setting (e.g., time lags) is displayed (as described above with reference to FIG. 3B), and the header 421 and the page title 423 are updated to indicate the new selection (e.g., "Time Lag").

A table portion 431 of the path length report 422 provides detailed path length information within the user interface 420. For example, the table portion 431 shown in FIG. 4B includes data values and display areas related to conversion path lengths. The table portion 431, as depicted using the current settings for various user controls and settings, includes rows of information arranged in three columns. A clicks column 432 (e.g., "Clicks before conversion") identifies ranges of path lengths corresponding to conversions. For instance, the path lengths listed in the clicks column 432 specify quantities of clicks that occur before conversion (i.e., click path lengths) ranging from fewer than 1 click up to 12 or more clicks.

A conversion counts column 434 identifies the quantity of conversions that occurred for each of the path lengths identified by the clicks column 432. A conversion percentages column 436 identifies the overall percentage (e.g., relative to 100% of the conversions) that each of the conversion counts represents, on a row-by-row basis in the table portion 431.

For example, a row 438 in the table portion 431 identifies 7200 as the quantity of conversions that occurred with three clicks. The value 7200 represents 49.62% of the overall total of conversions, as indicated by the percentage displayed in the row 438.

In another example, as indicated in a row 440, a total of 3522 conversions occurred with two clicks. This value represents 24.05% of the conversions that occurred during the month-long period from Mar. 16 to Apr. 15, 2010.

In another example row 442, the value of 190 conversions, or 1.3%, occurred in less than one click. In other example rows 444 and 446, a total of 14 conversions occurred with 11 clicks, and a total of 56 conversions occurred with 12 or more clicks.

The user interface 420 includes a display type selection control 448 that can be used, for example, to select one or more types of views for displaying information in the conversion percentages column 436, or elsewhere in the user interface. For example, the view selection 449 that is currently selected is the histogram view option, as indicated by a histogram icon. As a result, in addition to the percentages displayed in the conversion percentages column 436, path length measures are also presented in a histogram (i.e., in bar graph form), and a length of each group (or bar) is proportional to the percentage of conversions that are represented by a particular row (e.g., rows 438, 440, 441, etc.). The largest group (or longest bar) in this case appears in the row 438, representing the highest quantity (e.g., 7,200) of the conversions for any one quantity of clicks in column 432.

The user interface 420 includes other controls and areas. For example, an address bar 450 can identify the address (e.g., URL) that is associated with (e.g., identifies a network location for) the data that causes presentation of the current display of the user's browser, in this case path length information for an advertising account. An export control 452 can provide the user with options for exporting information from the user interface 420, primarily the information included in the table 431 and the identification of any user settings used to generate the data. The export control 452 can also be used to export user interaction data and/or data that may have been computed as described herein, but has not been presented. A scroll bar 454 is provided in some implementations to allow the user to scroll to other parts of the user interface 420, for example, if the entries in the table 431 are outside the viewport of the path length report 422.

The path length report 422 includes a summary 456 (e.g., "Most conversions occurred with a 3 click path") which can be used to direct the user's attention to specific information on the user interface 420. For example, the summary 456 in this case points out that the highest quantity of conversions corresponds to the information displayed in the row 438.

Top Paths

Figure 5A:
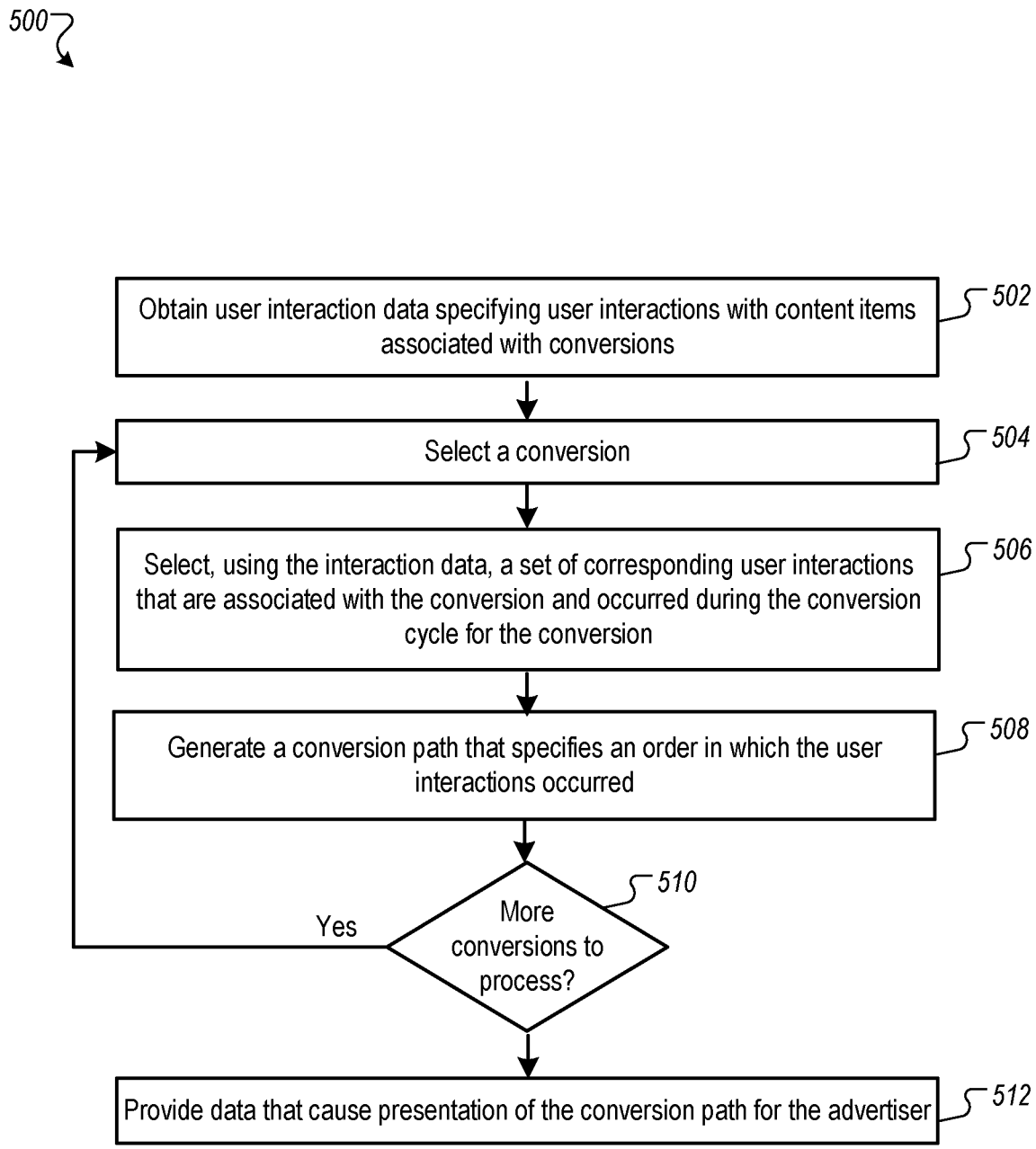
FIG. 5A is a flow chart of an example process for determining top paths for advertisement conversions.

FIG. 5A is a flow chart of an example process 500 for selecting top paths for advertisement conversions. Top paths are conversion paths that are associated with at least a specified minimum quantity of conversions. In some implementations, the top paths for an advertiser are a threshold number of conversion paths for the advertiser that resulted in the highest quantities of conversions for the advertiser. Each conversion path in the top paths specifies an order (or path) of occurrence (i.e., an interaction sequence) for the set of user interactions that occurred during a conversion cycle for the conversion. The conversion path further specifies keywords that caused presentation of content items that were presented to and/or selected by the user (i.e., clicked by the user). As a result, the top paths measure provides conversion measures for the highest conversion-producing conversion paths, and identifies the keywords that are associated with the top conversion paths.

For example, a set of top paths for an advertiser can specify ten conversion paths that provided the ten highest total number of conversions for the advertiser. Each of these top paths can specify a set of targeting keywords that caused presentation of advertisements with which the user interacted, where the keywords are presented according to the order in which the content items were presented to the user. Each of the top paths can also specify, for each of the keywords, the type of interaction that occurred with the user. For example, a click identifier can be presented with the keywords that caused presentation of clicked advertisements in the conversion path, while an impression identifier can be presented with the keywords that caused presentation of non-clicked advertisements in the conversion path.

As an example of tops path related to conversions for Brand X tennis shoes, a user can first be presented with an ad ("Ad 1") for Brand X (i.e., an impression of the ad occurs), followed by the presentation of three consecutive ads ("Ads 2-4") related to Brand X tennis gear, and the presentation of an ad ("Ad 5") for Brand X tennis shoes that the user clicks on just before conversion. The ads can be represented, for example, by the targeting keywords that caused their presentation (i.e., keywords "Brand X," "tennis" and "shoes"). In this case, the resulting conversion path including the presentation of "Ads 1-5" can be represented as Brand X>tennis>tennis>tennis>shoes, where "Brand X" is the keyword that caused presentation of Ad 1 and "shoes" is the keyword that caused presentation of Ad 5. If this particular conversion path has been determined to lead to the most conversions of Brand X tennis shoes over a particular period, then the path is one of the top paths. Other conversion paths and top paths measures can be based on ads within the same ad group, or ads in the same ad campaign.

Further, click conversion paths and impression conversion paths can be generated, where a click conversion path represents a series of content item clicks without regard to impressions that occurred during the conversion cycle, and an impression conversion path represents a series of content item impressions without regard to the clicks that occurred prior to the last click. In any case, the conversion paths generally represent a sequence of related user actions ending in the user's "last" click, such as clicking on "Ad 5," and ultimate conversion (e.g., buying a pair of Brand X tennis shoes).

The user interactions of a conversion path can be represented by keywords that caused presentation of the presented and/or clicked content items, URLs of web pages with which the content items were presented, and/or interaction indicators that specify whether the content item was presented and/or selected. Representations of the user interactions can be presented, for example, according to a sequence in which the user interactions occurred. For example, the conversion path associated with the user's purchase of Brand X tennis shoes can be illustrated by a sequential listing of the keywords that caused presentation of the content items.

The process 500 is a process by which one or more conversions are selected from user interaction data that specify user interactions with content items. In turn, a top paths (i.e., the conversion paths that resulted in the most conversions) are then determined for each of the conversions using impressions and/or clicks that are associated with the conversion that are included in the conversion path for the conversion Top paths measures can be presented, for example, in a top paths report.

The process 500 is described below with reference to advertising campaigns that control distribution of advertisements in an online environment. However, the process 500 can also be used with other content distribution campaigns that control distribution of other content (e.g., video, audio, or other content).

The process 500 can be implemented, for example, by the performance analysis apparatus 120 of FIG. 1. In some implementations, the performance analysis apparatus 120 is a data processing apparatus that includes one or more processors that are configured to perform actions of the process 500. In other implementations, a computer readable medium can include instructions that, when executed by a computer, cause the computer to perform actions of the process 500.

Top paths measures can be determined for various types of user interactions. For example, impression top paths measures and a click top paths measures can be separately computed using the method 500. As used throughout this document, "top paths based on clicks" describes the sequence of search ad clicks (or other ad clicks) leading up to conversion. Similarly, "top paths based on impressions" describes the sequence of ad impressions leading up to conversion. In either of the top paths measures (i.e., click- or impression-based), the clicks (or impressions) can be measured at the keyword, ad group, and campaign level. In some implementations, keyword analysis of adjacent keywords in the conversion path can be performed to remove redundant information, such as if a keyword is repeated multiples times in succession. For example, when keyword A is repeated in a conversion path (e.g., A>A>A>C) repetitive instances of the same keyword can be removed so the conversion path represents keyword transitions (e.g., A>C representing a transition from keyword A to keyword C).

A similar analysis can be performed for ad groups and campaigns. As a result, two additional "transition type" top paths measures can be produced. "Click Top paths-Transition" describes a top paths measure that is similar to "top paths based on clicks" except that consecutive "repeat clicks" in each conversion path are collapsed to a single instance. Similarly, "Impression Top Paths-Transition" describes a top paths measure that is similar to "top paths based on impressions," except that consecutive "repeat impressions" in each conversion path are collapsed to a single instance. For either "transition type" measure, i.e., click-based or impression-based, for example, a conversion containing repeated keywords, such as the repeated keyword B in the conversion path A>B>B>B>C, results in the conversion path A>B>C. This process of collapsing multiple instances into one instance can also be used for ad groups or campaigns.

In some implementations, top path measures for conversions are determined using only content item impressions that did not result in a click. In other implementations, top path measures for conversions are determined using a total quantity of content item impressions, irrespective of whether the impressions resulted in a click by the user. In some implementations, top path measures can include the "last click" for the conversion while in other implementations, the last click can be omitted from the top path measures.

User interaction data specifying user interactions with content items is obtained (502). As described above, content items can ads that are presented with search results, banner ads, text ads, video content, or audio content and user interactions can include presentations of content items user selections (i.e., a click) of content items, and presentation of an audio and/or video content item. In some implementations, the user interaction data includes data representing all user interactions prior to a conversion. In other implementations, the user interaction data includes data representing user interactions that occurred within a specified period of time of the conversion (e.g., within three months of the conversion). As described in more detail below, the user interaction data that is obtained can include a set of conversions for one or more advertiser, the user identifiers representing converting users for each of the conversions, and data representing user interactions with advertisements during the conversion cycle and by the converting users.

In some implementations, the obtained user interaction data specify user interactions that are associated with a particular advertiser and/or user interactions that are associated with one or more conversions. User interactions that are associated with a particular advertiser are user interactions with content items provided by (or provided for) the advertiser. User interaction data can be associated with the advertiser by being stored with an advertiser identifier (e.g., an advertiser name, campaign name, and/or another identifier) that represents the advertiser and/or by being indexed according to the advertiser identifier or indexed to a same index key (e.g., a same conversion identifier) as the advertiser identifier.

As described above, user interactions that are specified by the user interaction data can also be associated with one or more conversions. For example, impressions and/or selections (i.e., clicks) of content items (e.g., advertisements) that occurred prior to a conversion can be identified as user interactions that are associated with the conversion and user interaction data representing the user interactions that are associated with the conversion can be stored with a conversion identifier that represents the conversion and/or by being indexed according to the conversion or indexed to a same index key as the conversion identifier. If another conversion occurs prior to any additional user interactions and/or within the conversion cycle for the other conversion, the impressions and/or clicks can also be associated with the other conversion in a similar manner.

As described above, each conversion can also be associated with content items that were presented and/or selected during the conversion cycle for the conversion as well as targeting keywords that control distribution of the content items. In some implementations, data specifying a targeting keyword that was matched, and therefore, caused a content item to be presented during the conversion cycle for the conversion can be stored at a memory location associated with the conversion and/or indexed according to a conversion identifier representing the conversion. User interactions and/or conversions can be associated with one or more ad groups and/or ad campaigns based on the associations of the user interactions and/or conversions with targeting keywords that belong to the respective ad groups and/or ad campaigns, as described above with reference to FIGS. 3A and 4A.

In some implementations, user interaction data for conversions can include at least two of advertisement impressions, user selections of advertisements, and data representing user actions by converting users that constitute conversions. A minimum information requirement can be established so that a top paths report that is generated will include more meaningful data than it might otherwise include. For example, if many of the top paths include only one targeting keyword, this information may not be as useful to the user as analysis of top paths that include more keywords. The minimum information requirement can be specified, for example, by the advertiser.

In some implementations, each user interaction is associated with a user identifier that represents a converting user with whom the user interaction occurred. For example, obtaining the user interaction data in order to generate top paths reports can automatically obtain information for user identifiers associated with the current conversion being processed. To accomplish this, indexes (e.g., on user identifiers, etc.) can be established on the historical data 119 so that only user interaction data that are pertinent to the top paths reports are accessed.

In some implementations, the user identifier is a cookie that is retrieved from a user device with which the user interaction was performed, and each pair of user device and browser has a unique cookie. For example, obtaining the user identifier can occur from a cookie that is stored on the user's device 106 by the user's browser.

In some implementations, the conversion cycle for each conversion is a period that includes each user interaction that occurred prior to the conversion and occurred within a specified time of the conversion. For example, a threshold period of time (e.g., 30 days) can established for which conversion paths are to be considered. Specifically, generation of top paths measures can look back in time for user interactions that do not exceed the threshold (e.g., are not older than 30 days). In some implementations, different thresholds can be established for different advertisers, ad groups and ad campaigns.

A conversion is selected from the user interaction data (504). In some implementations, the conversion can be selected in response to receiving a request, from an advertiser, for a top paths report (i.e., a report that provides top paths measures) for a content distribution campaign (e.g., ad campaign). For example, an advertiser may access a user interface similar to that described with reference to FIG. 5B, and request a top paths report that specifies one or more top paths measures for a particular ad campaign, particular ad group, or particular targeting keyword. In turn, conversions for computing the top paths measures can be selected.

In some implementations, the conversion can be selected as part of a periodic top paths report update. For example, a top paths report can be generated and, in turn, updated periodically to provide an advertiser with an updated top paths report upon demand. Pre-computing top paths reports can provide faster access to the reports in response to the request. The description that follows describes selecting an individual conversion, but groups of conversions can also be selected for processing.

In some implementations, the performance analysis apparatus 120 selects the conversion (e.g., a conversion related to Brand-X tennis shoes). For example, the performance analysis apparatus 120 can access the advertising data store 119 and identify each conversion that is associated with a particular advertiser for which a top paths report is being generated or updated. The performance analysis apparatus 120 can identify conversions that are associated with a particular advertiser, for example, by searching the user interaction data for the advertiser identifier representing the particular advertiser and identifying the conversions by which each instance of the advertiser identifier is indexed, as described in more detail with reference to FIG. 10.

Once the conversions that are associated with the particular advertiser have been identified, the performance analysis apparatus 120 can select one or more of the conversions (504). The conversions can be selected randomly, in an order in which they are indexed in the user interaction data, or in another predetermined order. For example, the user interaction data can include a set of conversions that each has a unique conversion identifier that uniquely identifies the conversion with which the identifier is associated. In this example, the conversions can be selected in sequential order of the conversion identifiers. Each conversion can also have a timestamp that specifies a time at which the conversion occurred, and the timestamp can be used to select conversions in chronological order in which the conversions occurred.

User interactions that are associated with the selected conversion are selected from the user interaction data (506).

In some implementations, the selected user interactions are user interactions with the converting user prior to an action that constituted the conversion. When the user interaction data are indexed according to the conversion with which the user interaction data are associated, as described in more detail with reference to FIG. 10, the user interactions can be selected by examining (e.g., searching) and/or filtering the user interaction data that are indexed to the selected conversion.

In some implementations, the identified user interactions are interactions that occurred at any time prior to the conversion. In other implementations, the selected user interactions can be user interactions that occurred during the conversion cycle, but prior to the last click for the conversion. In still other implementations, the identifier user interactions are user interactions that occurred within a specified time preceding the conversion. For example, the identified user interactions may include the user interactions that occurred within 30 days preceding the conversion, but exclude user interactions that occurred prior to the 30 days preceding the conversion.

The specified time can be specified by the advertiser or determined, for example, on an advertiser specific basis according to an analysis of the lag time measures for each advertiser. In some implementations, the specified time for each advertiser can be selected as a threshold period that exceeds the expected time period (e.g., based on lag time measures) of conversion cycles for at least a minimum portion of the advertiser's conversions. For example, using the lag time measures for the advertiser, a specified time can be selected that is likely to produce conversion paths that provide accurate top paths measures for at least 67% of the advertiser's conversions.

A conversion path for the conversion is generated (508). The conversion path specifies an order in which the user interactions from the set of corresponding user interactions occurred leading up to conversion. The conversion path further specifies keywords that caused presentation of content items with which the user interactions occurred. As described above, the conversion path can be described by a path length is computed based on presentations of content items to the user and user clicks leading up to the conversion. For example, a path length of four can represent a conversion path having the impression of the Brand X ad, the user click on a Brand X ad, the presentation of the Brand-X tennis equipment ad, and the user's ("last") click on the ad for Brand X tennis shoes.

In some implementations, the conversion path for the conversion can be generated as a click conversion path that represents user selections (i.e., clicks) of content during the conversion cycle. The click conversion path can be generated using a sequence of user selections (i.e., clicks) of content items that occurred during the conversion cycle for the conversion. The click conversion path can be presented to a user by providing data that causes presentation of targeting keywords that caused presentation of the user selected (i.e., clicked) content items. The content item selections can be represented by the targeting keywords that caused presentation of the content items that were selected. When the click conversion path is presented, the targeting keywords can be presented according to the sequence of content item selections. For example, the keywords that appear in a top paths report can be ordered by the sequence that ad impressions associated with those keywords were presented to the user during the conversion path that led to conversion.

A determination is made whether more conversions remain to be processed (510). When more conversions remain to be processed, then the process 500 selects another conversion (504). For example, when a top paths report is being generated for a particular advertiser, the performance analysis apparatus 120 can determine that additional conversions remain to be processed for the particular advertiser.

When no conversions remain to be processed, then data are provided that causes presentation of at least one conversion path for at least one conversion (512). The information for the one or more conversion paths can be provided, for example, for presentation in a top paths report. As an example, the information can be sorted in descending order of conversions so that the top paths report can display the information for conversion paths having the most conversions listed first.

Other top paths measures can also be computed and provided. For example, the user interactions associated with each conversion can be used to generate a histogram that represents the distribution of conversions according to top paths, as described in more detail with reference to FIG. 5B.

In some implementations, the process of generating top paths reports determines that a same targeting keyword caused presentation of a content item for two or more sequential content item selections. The process can represent the targeting keywords according to the sequence of content item selections. The two or more sequential content item selections are replaced with a single instance of the same targeting keyword. For example, a conversion path that includes the keywords "tennis—tennis—tennis" can be replaced with "tennis."

Figure 5B:
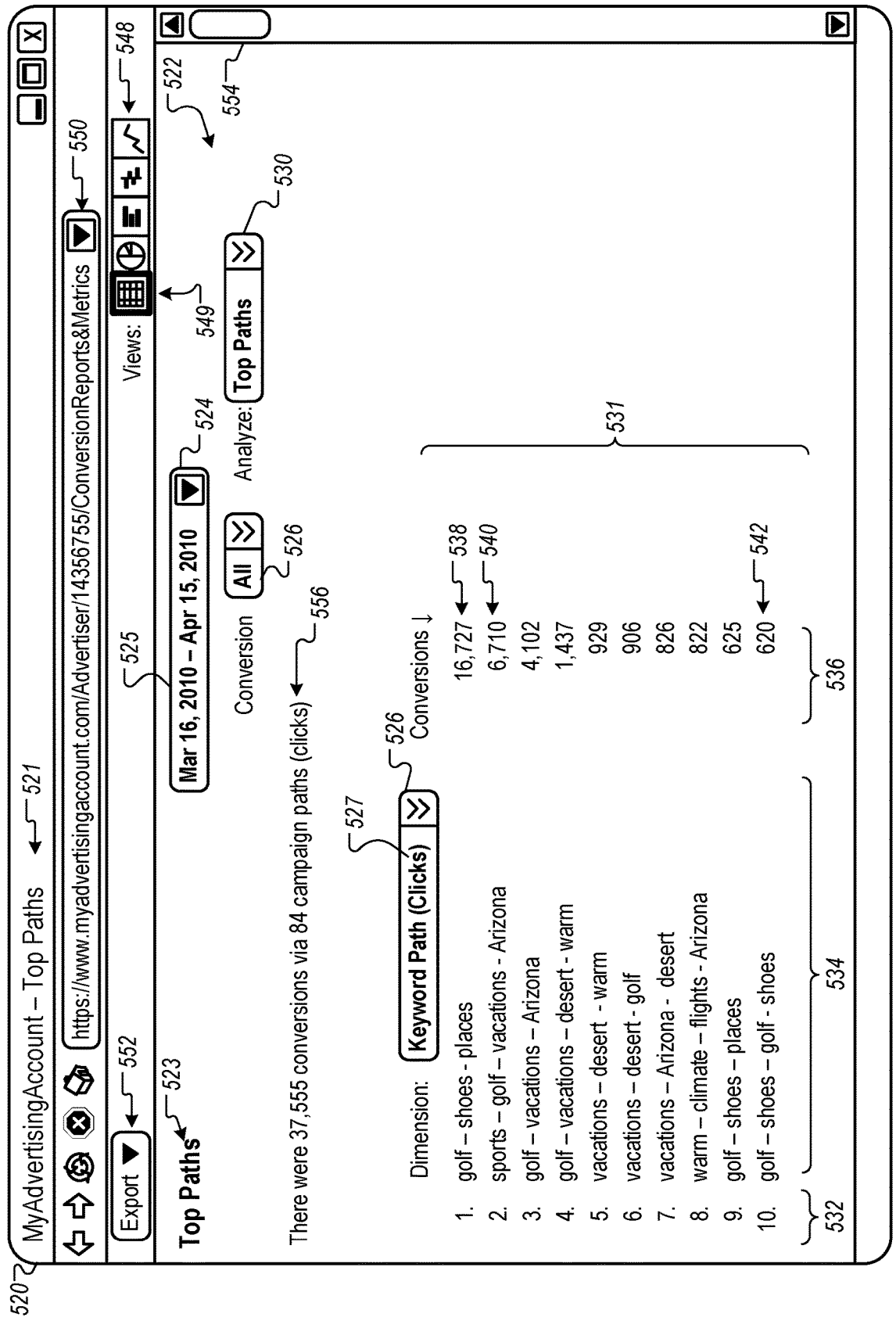
FIG. 5B is a screen shot of an example user interface for providing for providing top path measures for conversions.

FIG. 5B is a screen shot of an example user interface 520 for providing top paths measures for conversions. For example, an advertiser 108 (e.g., the advertiser of Brand X shoes) can use the user interface 520 to display and review information for advertisement conversion measures and reports associated with conversion top paths. In some implementations, the information provided in the user interface 520 includes conversion information (e.g., top paths measures for conversions and associated data) provided by the advertisement management system 110 and/or the performance analysis apparatus 120. For example, some conversion information displayed in the user interface 520 can be determined using the process 500 described with reference to FIG. 5A.

The user interface 520 includes a header 521 and a top paths report 522. The header 521 (e.g., "MyAdvertisingAccount—Top Paths") identifies the information in the user interface 520 as relating to top paths for conversions associated with an advertising account. The top paths report 522 contains the advertisement conversion information, specifically displaying and summarizing top paths for conversions within a specific time period based on settings established by the user (e.g., the advertiser 108 displaying the user interface 520).

The top paths report 522 includes a page title 523 (e.g., "Top Paths") and a date range selection control 524. The page title 523 identifies the top paths report 522 as containing "Top Paths" information, which is consistent with the subject displayed in the header 521. The date range selection control 524 enables the user (e.g., advertiser) to specify a date range for the assisted conversion measures that are presented in the top paths report 522. The date range specified in the date range selection control 524 can be used to select data with which the top paths measures presented in the top paths report 522 are computed. For example, the date range can be used to select user interaction data that are associated with conversions that occurred within the specified date range, user interaction data that are associated with conversion paths (or cycles) where the entire conversion path occurred during the specified date range, or user interaction data that are associated with conversion paths where any portion of the conversion path occurred during the specified date range.

As shown, a current time period selection 525 that has been selected using the date range selection control 524 is the month-long period from Mar. 16 to Apr. 15, 2010. This time period can correspond to any time duration selected by the advertiser. For example, the user can select a time period as short as a few hours up to a time period of several days or weeks, such as a 30-day duration, and years. Some advertisers may select a longer date range than others because, in general, while some advertisement conversions can occur rapidly, even within a few seconds, others can take several days, weeks, or even years. As a result, top paths that originate, for example, from the first ad impression that is presented the user, can span several hours or days before a conversion occurs.

In some implementations, when the user selects the date range selection control 524, a calendar interface (not shown) can appear. For example, the user can identify dates in the current selection 525 by clicking on individual cells on a calendar display, such as cells for Mar. 16 and Apr. 15, 2010. In some implementations, the date range selection control 524 can provide additional controls for specifying time ranges on specific dates. An example range using date and time, for example, can be noon on Mar. 16, 2010 to 5 PM on Mar. 17, 2010. In some implementations, various controls (e.g., sliders, etc.) can be used to allow the user to specify dates and times, without having to type in values explicitly, for example.

The top paths report 522 includes various settings for controlling the type of top paths report that is displayed in the user interface 520 for the current time period selection 525. A report type control 526 can include, for example, a drop down menu having user selectable options, active links or other user interface elements that upon selection cause submission of a request for one or more different types of top paths reports.

In the present example, the report type control 526 can cause presentation of a clicks-based top paths report or an impressions-based top paths report. For example, a user selection of the "Keyword Path (Clicks)" option 527 can cause submission of a request for a top paths report based on keywords and user clicks. In another example, selection of an "Ad Group (Impressions)" option can cause submission of a request for a top paths report based on ad impressions seen by the user, where the information is summarized by ad group. In response to the submission, data that causes presentation of the selected report can be provided to the user device. As shown in FIG. 5B, the current selection 527 is set to display top paths report based on keywords and clicks, and top paths report is presented in the user interface 520.

The top paths report 522 includes a conversion type selection control 528 that enables the user to specify one or more types of conversions for which the top paths report includes related information. In some implementations, the conversion type selection control 528 can be a drop down menu having user selectable options. In other implementations, the conversion type selection control 528 can be a hypertext link or another user interface control element (e.g., a text box, check box, or radio button). In the example shown, the conversion type selection control 528 indicates that the top paths report includes information for "all" types of conversions is presented in the top paths report 522.

Top paths reports can be generated for each of many different types of conversions. In some implementations, each of the following user actions can be identified as a different conversion type: signing up for a mailing list, making a purchase, creating a user profile, making a reservation, requesting presentation of a video, requesting presentation of audio, downloading one or more files, installing one or more programs on the user device, or providing specified information, and a separate top paths report can be generated for each of these different conversion types Each advertiser can specify its own set of conversion types and the user actions that constitute a conversion for each conversion type. For example, an on-line gaming company can identify three types of conversions. The first conversion type can be identified as an information conversion that is completed when a mailing address (physical or electronic) is received from a user. The second conversion type can be identified as a download conversion that is completed when a user downloads and/or installs a trial version of an on-line game. The third conversion type can be identified as a purchase conversion that is completed when a user purchases an on-line game. In this example, the conversion type selection control 528 enables allows the user (i.e., the advertiser) to request presentation of an top paths report that specifies top paths measures for purchase conversions and/or an top paths report that specifies top paths measures for other types of conversions (e.g., information conversions or download conversions).

In some implementations, the top paths report 522 can separately specify, in a single user interface display, top paths measures for more than one conversion type. Continuing with the example above, in response to a request for a top paths report that includes separate top paths measures for purchase conversions and download conversions, data can be provided that cause presentation of the top paths measures for the purchase conversions at a display location that is adjacent to the display location of the top paths measures for the download conversions. Thus, a user can directly compare the top paths measures for purchase conversions to the top paths measures for the download conversions.

An analysis type selection control 530 allows the user to specify the type of information displayed on the screen. The current setting for the analysis type selection control 530 is "Top Paths." As an example of how to change the type of information displayed in the user interface 520, the user can select a different setting (e.g., "Time Lag") from the analysis type selection control 530. In response to the change, information related to the different setting (e.g., time lags) is displayed (as described above with reference to FIG. 3B), and the header 521 and the page title 523 are updated to indicate the new selection (e.g., "Time Lags").

A table portion 531 of the top paths report 522 provides detailed top paths information within the user interface 520. For example, the table portion 531 shown in FIG. 5B includes data values and display areas related to conversion top paths. The table portion 531, as depicted using the current settings for various user controls and settings, includes rows of information arranged in three columns. A path number column 532 labels each of the top paths in the table portion with a unique path number. A path column 534 identifies the keywords (e.g., "golf—shoes—places") of each of the paths top paths in the table portion 531. A conversion percentages column 536 identifies the overall percentage (e.g., relative to 100% of the conversions) that each of the paths represents, on a row-by-row basis in the table portion 531.

For example, a row 538 in the table portion 531 identifies path number 1 as "golf—shoes—places," and 16,727 conversions occurred for that top path. The row 538 is listed first in the table portion because no other top path (i.e., based on keyword path and clicks) resulted in more conversions. A row 540 identifies the path "sports—golf—vacations—Arizona" as having 6,710 conversions. As a result, the path appears as the second entry in the table portion 531, and is identified with a "2" in the path number column 532 because it is the conversion path that led to the second highest number of conversions. Another example row 542, or the tenth entry in the table portion 531, identifies the path "golf—shoes—golf—shoes" as having 620 conversions, which is the tenth highest number of conversions for a conversion path.

In general, the order of keywords that appear in a row (e.g., row 540) matches the sequence that ad impressions associated with those keywords that were viewed by the user during the conversion path that led to conversion. For example, in the 6,710 conversions associated with the path "sports—golf—vacations—Arizona" (e.g., in row 540), users who eventually converted were presented ads having associated keywords "sports" through "Arizona," and the corresponding ads appeared in that order.

The user interface 520 includes a display type selection control 548 that can be used, for example, to select one or more types of views for displaying information in the conversion percentages column 536, or elsewhere in the user interface. For example, the view selection 549 that is currently selected is the table option, as indicated by a spreadsheet icon. As a result, the percentages displayed in the conversion percentages column 536, appear in tabular format. Other options selectable from the display type selection control 548 can cause the data in the table portion to be displayed a histogram or in other ways.

The user interface 520 includes other controls and areas. For example, an address bar 550 can identify the address (e.g., URL) that is associated with (e.g., identifies a network location for) the data that causes presentation of the current display of the user's browser, in this case top paths information for an advertising account. An export control 552 can provide the user with options for exporting information from the user interface 520, primarily the information included in the table 531 and the identification of any user settings used to generate the data. The export control 552 can also be used to export user interaction data and/or data that may have been computed as described herein, but has not been presented. A scroll bar 554 is provided in some implementations to allow the user to scroll to other parts of the user interface 520, such as if the more top paths appear in the table 531 but are not currently within the viewport of the top paths report 522.

The top paths report 522 includes a summary 556 (e.g., "There were 37,555 conversions via 84 campaign paths (clicks)") which can be used to direct the user's attention to specific information on the user interface 520, or to provide a summary of the information presented. For example, the summary 556 in this case provides a total of the conversions corresponding to the top paths and identifies that the conversions are keyword- and click-based.

Assist User Interactions

Figure 6A:
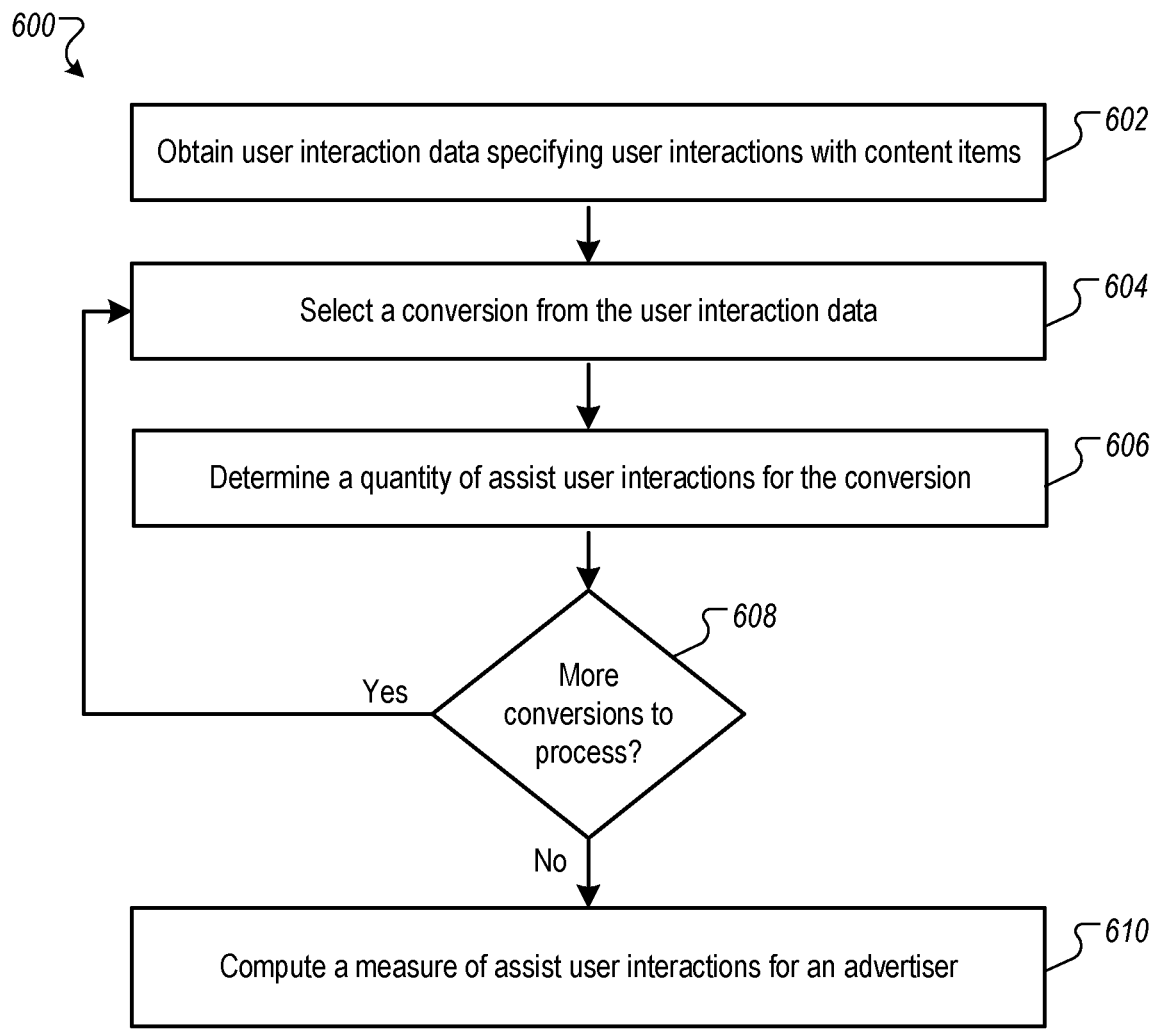
FIG. 6A is a flow chart of an example process for tracking assist user interactions in association with conversions.

FIG. 6A is an example process 600 for tracking assist user interactions in association with conversions and computing assist user interaction measures for conversions. An assist user interaction for a conversion is a user interaction with a converting user (i.e., a user that performs an action that constitutes the conversion) during a conversion cycle for the conversion and prior to the last click for the conversion. For example, an assist user interaction can be any user interaction by the converting user that occurs prior to user selection (or presentation) of the last clicked advertisement for the conversion. In some implementations, assist user interactions include one or more assist impressions and/or one or more assist clicks. An assist click for a conversion is a selection of a content item by the converting user during the conversion cycle for the conversion and prior to the last click for the conversion.

An assist impression for a conversion is a presentation of a content item (e.g., advertisement, video, audio, or widget, or another content item) to the converting user prior to the conversion. In some implementations, assist impressions for a conversion can include only impressions other than the impression of the last clicked advertisement for the conversion. For example, if a converting user is presented a single advertisement, selects the advertisement, and converts, then there will be no assist impressions for that conversion because the only advertisement that was presented was the last clicked advertisement. When a conversion occurs without any prior clicks, such that there is not a last clicked advertisement, each impression during the conversion cycle for the conversion can be an assist impression for the conversion.

The process 600 is a process by which one or more conversions are selected from user interaction data that specifies user interactions with content items. In turn, user identifiers that are associated with each of the conversions are identified and quantities of assist user interactions is determined for each of the user interactions, for example, using the user identifiers to identify assist user interactions for each of the conversions. A measure of user interactions is then computed using the quantities of assist user interactions for the conversions.

The process 600 is described below with reference to advertising campaigns that control distribution of advertisements in an online environment. However, the process 600 can also be used with other content distribution campaigns that control distribution of other content (e.g., video, audio, or other content).

The process 600 can be performed, for example, by the performance analysis apparatus 120 shown in FIG. 1. In some implementations, the performance analysis subsystem 120 is a data processing apparatus that includes one or more processors that are configured to perform actions of the process 600. In other implementations, a computer readable medium can include instructions that, when executed by a computer, cause the computer to perform actions of the process 600. The stages shown in FIG. 6 are illustrative of a set of stages that can be used to perform the process 600. Additional or fewer stages may be used, or stages may not be used at all.

User interaction data specifying user interactions with content items is obtained (602). The content items can be, for example, advertisements (ads) displayed with search results provided by a search system in response to a search query that was submitted by a user. As another example, the content items can include banner ads displayed with a web page provided by a publisher. As yet another example, the content items can be or include video or audio content. Forms of user interactions can include presentation of a content item (i.e., an impression) to a user, selection (i.e., a click) of a content item by a user, presentation of all or a portion of an audio and/or video content item to the user. In some implementations, the user interaction data are collected over a specified time period. For example, user interaction data can be collected for all user interactions that have occurred over the last two months. As another example, user interaction data are collected for all user interactions associated with conversions that have occurred over the past 15 days. In some implementations, the user interaction data that are obtained are associated with multiple users. In other implementations, the user interaction data that are obtained is associated with a single user.

In some implementations, the obtained user interaction data specify user interactions that are associated with a particular advertiser. User interactions that are associated with a particular advertiser are user interactions with content items provided by the advertiser. For example, user interaction data can be obtained that represent user interactions with all content items that are provided by and/or provided for a particular travel services company (e.g., Travel Planning Corp. ("TPC")). User interaction data that represent user interactions can be associated with the advertiser by being stored with an advertiser identifier that represents the advertiser and/or by being indexed according to the advertiser identifier or to a same index key (e.g., a same conversion identifier) as the advertiser identifier.

In some implementations, user interactions are associated with one or more conversions. For example, a user that performed one or more user interactions (i.e., was presented one or more advertisements and/or selected one or more of the presented advertisements) can subsequently sign up for a mailing list for TPC. In this example, when TPC. specifies that signing up for a mailing list is a conversion, then the impressions and selections of content items (e.g., advertisements) for TPC that occurred with respect to the user prior to the conversion by the user can be identified as user interactions that are associated with the conversion.

Continuing with this example, the user interaction data can specify that prior to the conversion the user was presented a first ad and a second ad for TPC and that the user selected the second ad, but did not select the first ad. In this example, the user interaction data can specify that the two interactions (i.e., one impression and one selection) are associated with the conversion, for example, by storing data representing the user interactions with references to the conversion and/or indexing the user interactions according to a conversion identifier for the conversion. In this example, since the user selected the second ad, the presentation of the second ad is not counted as an assist impression for the conversion. In some alternative implementations, the user interaction data can specify that three interactions (i.e., two impressions and one selection) occurred. In such implementations, the presentation of the second ad can be counted as an interaction (i.e., an impression) separately from the selection of the section ad (i.e., a selection).

In some implementations, content items are associated with one or more targeting keywords that control distribution of the content items, as described above with reference to FIG. 1. Each user interaction with a content item can be associated with one or more targeting keywords that are associated with the content item. In some implementations, each user interaction with a content item is associated with a targeting keyword that was matched, and therefore, caused the content item to be presented. For example, if the keyword "clothing" is used to select an ad for presentation to a user and the user subsequently selects (i.e., clicks) the identified ad, the keyword "clothing" can be associated with the user selection. If the user selection of the ad is the last user selection of an ad provided by the advertiser prior to a conversion, the keyword "clothing" can be associated with a last click for the conversion.

As another example, if an advertisement for a hotel chain is the last advertisement selected by a user prior to the user booking a room with the hotel chain, the advertisement can be identified as a last clicked advertisement for the conversion. Additionally, the conversion can be associated with the advertisement and with a keyword (e.g., "hotels in Atlanta") that caused the advertisement to be selected for presentation. As yet another example, if an advertisement is selected for presentation based on the targeting keyword "toy cars," being matched, user selections of the advertisement will be associated with the keyword "toy cars." In this example, each presentation of the advertisement to the user where the user did not select the advertisement can also be associated with the keyword "toy cars" as an impression.

In some implementations, the user interactions that are associated with each conversion include one or more presentations of content items to a user (i.e., impressions) and/or one or more user selections of the content items by the user prior to the conversion occurring. For example, a user can be presented a first ad for a pizza chain and later be presented a second ad for a pizza chain without selecting either of the two ads. The user can then type in a URL for the website of the pizza chain and order a pizza online. The impressions (i.e., the presentations of the two ads by the user) can be associated with the conversion (i.e., the purchasing of the pizza by the user). In some implementations, the two impressions are identified as assist impressions for the conversion, as described in more detail below. In this example, user interactions that are associated with the conversion include the two impressions and no selections (i.e., clicks). Thus, two user interactions are associated with the conversion.

As another example, the user can be presented the first ad and the second ad. Assuming that the user does not select the first ad, but selects the second ad, selection of the second ad can cause the user to be redirected, for example, to the website for the pizza chain. When the user orders a pizza on the website, a conversion is associated with the user. In this example, the selection of the second ad can be identified as a last click for the conversion and the presentation of the first ad can be identified as an assist impression for the conversion. In some implementations, a keyword that is associated with the second ad and caused presentation of the second ad is associated with data identifying the keyword as the keyword that caused presentation of a last clicked content item for the conversion. A keyword that is associated with the first ad and caused presentation of the first ad is associated with an assist impression for the conversion.

A conversion is selected from the user interaction data (604). For example, user interaction data associated with TPC can include user interaction information associated with multiple conversions. One or more of the conversions can be selected from among the multiple conversions that are included in the user interaction data. Conversions can be selected randomly, in an order in which they are indexed in the user interaction data, or in a predetermined order. For example, the user interaction data can include a set of conversions that each has a unique conversion identifier that uniquely identifies the conversion with which the identifier is associated. In this example, the conversions can be selected in sequential order of conversion identifiers. Each conversion can also have a timestamp that specifies a time at which the conversion occurred. Thus, conversions can be selected in chronological order in which the conversions occurred.

As another example, conversions can be arranged according to keywords that are associated with last clicks for the conversions. For example, all conversions for which the last clicked ad was selected for presentation using the targeting keyword "car rental" can be grouped together. In this example, each conversion that is associated with a last clicked keyword (i.e., a keyword that caused presentation of a last clicked content item) of "car rental" can be selected as a group.

A quantity of assist user interactions for the conversion is determined (606). As described above, the assist user interactions can include one or more assist impressions and/or one or more assist clicks. In some implementations, each content item presentation during the conversion cycle for the conversion qualifies as an assist impression for the conversion irrespective of whether the user selected the presented content item. For example, if a first advertisement is presented to the user and selected by the user, the user interactions with the content item would include an assist impression.

In other implementations, impressions qualify as assist impressions when a content item is presented to a user but not selected by the user. In these implementations, if an ad is presented to the user and the user does not click on the ad, the impression can be identified as an assist impression. However, if an ad is presented to the user and the user clicks on the presented ad, the user interaction with the ad does not qualify as an assist impression, but may qualify as an assist click, as described below.

Assist user interactions can also include assist clicks. An assist click is a user selection of a content item that occurs during a conversion cycle for the conversion, and prior to the last click for the conversion. As described above, the last click for a conversion is a last user selection of a content item preceding the conversion by the user. For example, three different ads for a shoe brand are presented to a user, the user selects each of the three ads, and purchases a pair of shoes after selecting the last of the three presented ads. The last click for this conversion is the selection of the last of the three presented ads, while the selections of each of the first two ads are assist clicks. Note that the conversion cycle for this conversion (i.e., the purchase of the shoes) includes two assist clicks, one last click and one conversion.

A single content item can be associated with multiple assist user interactions for a single conversion cycle. For example, a first ad is presented to a user twice and the user selects the ad the first time it is presented, but does not select the ad the second time it is presented. In this example, a conversion does not occur after the first or second presentation of the ad. A second ad associated with the same advertiser as the second ad is then presented. The user selects the second ad and makes a purchase from the advertiser (i.e., a conversion occurs). The first ad is associated with both an assist impression and an assist click for the conversion cycle. The assist impression and the assist click can be associated with the first ad by being stored with an ad identifier that represents the ad and/or by being indexed according to the ad identifier or to a same index key (e.g., a same conversion identifier) as the ad identifier.

In some implementations, keywords that cause presentation of the content items with which the user interactions occur are considered associated with the user interactions. For example, a keyword that causes presentation of a content item associated with an assist click can be identified as an assist click keyword for a conversion and a keyword that causes presentation of a content item associated with an assist impression can be identified as an assist impression keyword for the conversion. Continuing with the example above, the first ad for the shoe brand can be selected for presentation based on the targeting keyword "shoes," being matched by a search query, while the second ad for the shoe brand can be selected for presentation based on the targeting keyword "running" being matched by another search query, and the third ad for the shoe brand can be selected for presentation based on the targeting keyword "hiking" being matched by a third search query. In this example, the keywords "shoes" and "running" are each associated with an assist click because each of these targeting keywords caused presentation of an ad that was selected by the user during the conversion cycle for the conversion prior to the last click for the conversion cycle, while the keyword "hiking" is associated with a last click because the keyword "hiking" caused presentation of the ad that was last selected prior to the conversion.

A single keyword can be associated with multiple assist user actions during a single conversion cycle. For example, if the three ads described above are each selected for presentation based on the keyword "running shoes" being matched, the keyword "running shoes" can be associated with two assist clicks and one last click. A keyword can be associated an assist user interaction by being stored with a user interaction identifier that represents the user interaction and/or by being indexed according to the user interaction identifier or to a same index key (e.g., a same conversion identifier) as the user interaction identifier.

In some implementations, data representing user interactions that are associated with a conversion are indexed according to the conversion with which the user interactions are associated. As described in more detail below with reference to FIG. 10, each conversion can be stored at a separate row (or column) of a database and data that are associated with the conversion can be stored at separate locations of the same row (or column) as the conversion. In these implementations, the user interactions for each conversion can be identified, extracted, and/or obtained from locations (e.g., columns) of the row in which the conversion is stored.

In other implementations, assist user interactions are identified for each conversion using the user identifier that is associated with the conversion. For example, a user performs an act that constitutes a conversion (e.g., purchasing a product, making a reservation, signing up for a mailing list, etc.) and a user identifier for the converting user is associated with data representing the conversion. The user identifier for the converting user can then be used to search the user interaction data to identify impressions and clicks that are associated with the user identifier for the converting user. For example, if the conversion is a purchase of Brand-X hand sanitizer, the user identifier that is associated with the purchase can be used to identify four impressions that are associated with the converting user and occurred prior to the conversion. The user identifier can also be used to identify clicks, by the converting user, of one or more ads that were presented during the conversion cycle for the conversion.

A determination is made as to whether there are more conversions to process (608). If there are additional conversions to process, the process 600 returns to stage 604 of selecting a conversion from the user interaction data. If it is determined that there are no remaining conversions to process, the process 600 proceeds to stage 610.

A measure of assist user interactions for the advertiser is computed using the quantity of assist user interactions for the conversions (610). Measures of assist user interactions ("assist interaction measures") can be computed on a per-advertiser, per content item, per-advertising campaign, per-ad group, and per-keyword basis. The measures of assist user interactions can also be computed for other attributes of an advertising campaign (e.g., a per-bid basis or a per-budget basis).

Measures of assist user interactions can include a total quantity of assist clicks and/or a total quantity of assist impressions. The measures of assist user interactions can also include an average quantity of assist clicks per conversion and/or an average quantity of assist impressions per conversion. Additionally, other statistical measures (e.g., standard deviation, mode, median) and distributions of assist clicks and/or assist conversions can be generated. The discussion below describes several example measures of user interactions that can be computed, but other measures can be computed.

In some implementations, the measure of assist user interactions can be associated with the advertiser, with a content item that is distributed for the advertiser, and/or with a keyword that controls distribution of content items for the advertiser. For example, a measure of assist user interactions can be computed for all content that is distributed for TPC. As another example, a measure of assist user interactions can be computed for an ad that is distributed for TPC. As yet another example, a measure of assist user interactions can be computed for a keyword that is used to control distribution of one or more ads for TPC Computing a measure of assist user interactions for the advertiser can include determining a total quantity of assist user interactions that are associated with conversions for the advertiser. For example, the quantity of assist user interactions determined at stage 606 can be summed for all conversions that are associated with the advertiser. For example, assume that three conversions occurred for an advertiser during a specified time period (e.g., 1 month). Assume further that the conversion cycle for the first conversion includes 3 assist user interactions, the conversion cycle for the second conversion includes 2 assist user interactions, and the conversion cycle for the third conversion includes 5 assist user interactions. In this example, the total quantity of assist user interactions for the advertiser during the specified time period is 10.

In some implementations, computing a measure of assist user interactions for the advertiser includes computing a total quantity of assist clicks associated with the advertiser. For example, the quantity of assist clicks associated with each conversion for the advertiser can be summed to identify a total quantity of assist clicks for the advertiser.

Computing a measure of assist user interactions ("assist interaction measures") for the advertiser can include computing an average quantity (or another statistical measure) of assist clicks for each conversion. For example, if the total quantity of assist clicks associated with the advertiser (or ad group or keyword) is 36 and the total quantity of conversions associated with the advertiser (or ad group or keyword) is 12, the average quantity of assist clicks per conversion can be calculated by dividing 36 by 12 to give an average of 3 assist clicks per conversion.

In some implementations, computing a measure of assist user interactions for the advertiser includes computing a total quantity of assist impressions associated with the advertiser. For example, the quantity of assist impressions associated with each conversion is summed to identify a total quantity of assist impressions for the advertiser. In some implementations, computing a measure of assist user interactions for the advertiser includes computing an average quantity of assist impressions for each conversion. For example, if the total quantity of assist impressions associated with the advertiser is 26 and the total quantity of conversions associated with the advertiser is 8, the average quantity of assist impressions for each conversion is 3.25 assist impressions per conversion.

In some implementations, computing a measure of assist user interactions for the advertiser includes computing a ratio of assist clicks, assist impressions, or assist user interactions to last clicks for the advertiser. For example, if the total quantity of last clicks for the advertiser is 342 and the total quantity of assist clicks for the advertiser is 71, the ratio of assist clicks to last clicks for the advertiser is 0.21.

Computing a measure of assist user interactions for the advertiser can include computing a total quantity of assist clicks for one or more targeting keywords associated with the advertiser. Computing a total quantity of assist clicks for a targeting keyword can include identifying the quantity of user selections of content items within conversion cycles occurring prior to a last click where the content items are presented in response to the keyword being matched. For example, a keyword of "fashion" can cause presentation of multiple advertisements. The total quantity of times that the advertisements are presented in association with a match for the keyword "fashion" and the advertisement is subsequently selected by a user prior to a last selection (i.e., a last click) for a conversion cycle can be identified.

As another example, the keyword "fashion" is associated with two advertisements. The first advertisement is also associated with a keyword of "dresses." The first advertisement is selected by a user, prior to a last click, in a conversion cycle 5 times in association with keyword "fashion" and 3 times in association with the keyword "dresses." The second advertisement is selected by a user, prior to a last click, in a conversion cycle 4 times in association with the keyword fashion. The total quantity of assist clicks for the keyword fashion is 9, while the total quantity of assist clicks for the first advertisement is 8 and the total quantity of assist clicks for the second advertisement is 4.

Computing a measure of assist user interactions for the advertiser can include computing a total quantity of assist impressions for one or more keywords associated with the advertiser. Computing a total quantity of assist impressions for a keyword can include identifying the quantity of times a keyword causes content items to be presented prior to a conversion occurring, where the content items are not selected. Computing a measure of assist user interactions for the advertiser can include computing a ratio of assist clicks or assist impressions to last clicks for one or more keywords, where the quantity of last clicks for a keyword can be a quantity of last clicks for content items that were presented in response to the targeting keyword being matched. For example, a keyword can be identified as being associated with 12 assist clicks and 3 last clicks. The ratio of assist clicks to last clicks for the keyword is 4.

Computing a measure of assist user interactions for the advertiser can include computing a total quantity of assist clicks and/or a total quantity of assist impressions for one or more advertising campaigns or advertisement groupings associated with the advertiser. An advertising campaign for a particular advertiser can include a quantity of advertisements directed toward the same or similar products. For example, a shoe company can have an advertising campaign that includes seven different ads for a particular running shoe. The quantity of assist clicks and assist impressions for the advertising campaign can be calculated by summing the quantity of assist clicks and assist impressions for each ad included in the ad campaign. In some implementations, computing a measure of assist user interactions for the advertiser includes computing a ratio of assist clicks or assist impressions to last clicks for one or more advertising campaigns.

Computing a measure of assist user interactions for the advertiser can include computing a total quantity of assist clicks and/or a total quantity of assist impressions for a content item that is distributed for the advertiser. For example, an advertisement is identified as appearing in conversion cycles for three conversions. In the first conversion cycle, the advertisement is viewed but not clicked once, and clicked prior to the last click once. In the second conversion cycle, the advertisement is clicked twice prior to the last click. In the third conversion cycle, the advertisement is viewed but not clicked twice and clicked once as the last click prior to the conversion. In this example, the total quantity of assist clicks for the advertisement is three and the total quantity of assist impressions for the advertisement is three. In some implementations, the total quantity of assist clicks and/or the total quantity of assist impressions is computed for all content items associated with the advertiser. In other implementations, the total quantity of assist clicks and/or the total quantity of assist impressions is computed for less than all of the content items associated with the advertiser.

Computing a measure of assist user interactions for the advertiser can include computing a ratio of assist clicks to last clicks for one or more content items where the quantity of last clicks for a content item can be a number of times the content item was the last click in a conversion cycle prior to a conversion. For example, an advertisement can be identified as being associated with 7 assist clicks and 3 last clicks. The ratio of assist clicks to last clicks for the advertisement is 2.33. In some implementations, computing a measure of assist user interactions for the advertiser includes computing a ratio of assist impressions to last clicks for one or more advertisements. For example, an advertisement can be identified as being associated with 15 assist impressions and 3 last clicks. The ratio of assist impressions to last clicks for the advertisement is 5.

In some implementations, data representing one or more computed measures of assist user interactions is presented to a user. For example, the total quantity of assist clicks for a quantity of target keywords associated with the advertiser can be displayed to the user. As another example, a webpage showing the ratio of assist user interactions to last clicks for a quantity of advertisements is displayed to the user. The data can be presented to the user, for example, in the form of a graph, chart, table, or spread sheet. The data can be presented as part of a webpage, or exported as a file (e.g., a text file, word processing file, spread sheet, or database file).

Figure 6B:
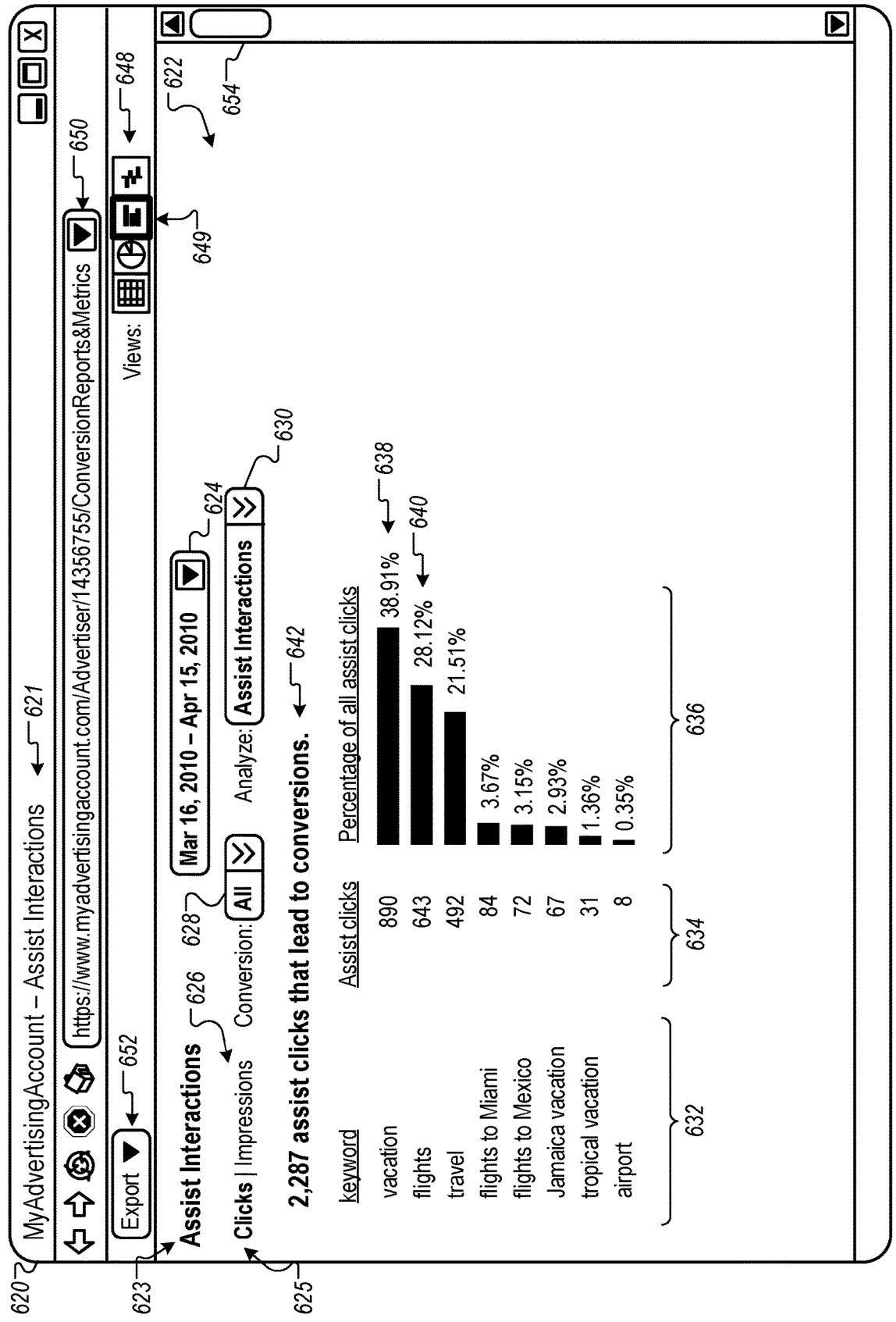
FIG. 6B is a screen shot of an example user interface for providing assist click and assist impression associated measures.

FIG. 6B shows an assist user interaction report user interface 620 that depicts a browser which includes a user interface for providing assist click and assist impression associated measures. The browser can be used, for example, to display web pages and other resources that make up websites, (such as the websites 104 of FIG. 1). The assist user interaction report user interface 620 includes a header 621 for indicating information that is displayed in the assist user interaction report user interface 620. In this example, the header 621 indicates that information associated with a website titled "MyAdvertisingAccount" is being presented and that the presented information more specifically relates to assist interactions.

The assist user interaction report user interface 620 includes an assist user interaction report 622 for presenting information relating to conversion path performance measures and several selection controls to allow a user to specify parameters for the conversion path performance measures. The assist user interaction report 622 can be, for example, a webpage received from a web server through the Internet. As another example, referring to FIG. 1, the assist user interaction report 622 can be a resource 105 of a website 104 received through the network 102 by one of the user devices 106.

The assist user interaction report user interface 620 includes an address bar 650 that displays a URL for the assist user interaction report 622. In some implementations, the user can access the assist user interaction report 622 by entering the URL into the address bar 650. The assist user interaction report user interface 620 further includes a scroll bar 654 to allow the user to scroll through content presented on the assist user interaction report 622.

The assist user interaction report 622 includes a page title 623 indicating that the information included on the assist user interaction report 622 relates to assist interactions. The assist user interaction report 622 further includes a date range selection control 624 to allow the user to specify a date range for conversion path performance measures to be presented on the assist user interaction report 622. In some implementations, the date range specified in the date range selection control 624 limits the information presented on the assist user interaction report 622 to information relating to conversions that occurred within the specified date range. In some implementations, the specified date range limits the information presented on the assist user interaction report 622 to information relating to conversion cycles where the entire conversion cycle occurred during the specified date range. In some implementations, the specified date range limits the information presented on the assist user interaction report 622 to information relating to conversion cycles where any portion of the conversion cycle occurred during the specified date range. For example, information relating to a conversion cycle where a first assist impression occurred during the specified date range can be included in the information presented on the assist user interaction report 622.

The assist user interaction report 622 includes links 625 and 626 to allow the user to select a type of assist user interaction information to present. In the example shown, selecting the link 625 causes information relating to assist clicks to be presented. Selecting the link 626 causes information relating to assist impressions to be presented. In the example shown, the link 625 is bold to indicate that the link 625 is currently selected and that information presented on the assist user interaction report 622 is related to assist clicks. In some implementations, the assist user interaction report 622 includes a link that allows the user to view information relating to both assist clicks and assist impressions.

The assist user interaction report 622 includes a conversion type selection control 628 to allow the user to indicate one or more types of conversions to for which to present related information. In the example shown, the conversion type selection control 628 indicates that information relating to all types of conversions is presented on the assist user interaction report 622. In some implementations, conversions can be divided into different types. User actions that can be identified as different conversion types can include, signing up for a mailing list, making a purchase, creating a user profile, making a reservation, watching a video, listening to an audio file, downloading one or more files, installing one or more programs, or providing information. For example, a computer software company can identify three types of conversions. The first conversion type can be identified as a user providing a mailing address. The second conversion type can be identified as a user downloading and installing a trial version of a program. The third conversion type can be identified as a user purchasing a full version of a program. The conversion type selection control 628 allows the user to view assist interaction measures for revenue generating conversions (e.g., purchases) from other types of conversions (e.g., signing up for a mailing list or downloading trial software). In some implementations, the conversion type selection control 628 can be a drop down menu having user selectable options.

The assist user interaction report 622 includes an analysis type selection control 630 to allow the user to select from among multiple types of conversion path performance measures. In the example shown, the analysis type selection control 630 indicates that information currently presented on the assist user interaction report 622 relates to assist interactions. Other types of conversion path performance measures can include time lag measures, path length measures, assist interaction measures, last click measures, first click measures, and assisted conversion measures. In some implementations, the analysis type selection control 630 can be a drop down menu having user selectable options.

As mentioned above, the assist user interaction report 622 includes conversion path performance measures as specified by the user using the selection controls and links of the assist user interaction report 622. In the example shown, the assist user interaction report 622 includes information relating to assist clicks associated with all conversion types for a date range of Mar. 16, 2010 to Apr. 15, 2010. The information presented on the assist user interaction report 622 includes a list of keywords 632. The list of keywords 632 can be, for example, targeting keywords that control distribution of content items associated with an advertiser. As another example, the keywords 632 can be targeting keywords that control distribution of a single content item. As yet another example, the keywords 632 can be targeting keywords that control distribution of advertisements included in a specified advertisement campaign or advertisement group. In the example shown, the assist user interaction report 622 presents assist click statistics relating to each of the keywords 632. In some implementations, in place of or in addition to the list of keywords 632, the assist user interaction report 622 can include a list of advertisements associated with an advertiser or ad campaign and show assist click statistics for each listed advertisements. In some implementations, the assist user interaction report 622 can include a list of ad campaigns or ad groups and show assist click statistics for each listed ad campaign or ad group. In some implementations, the assist user interaction report 622 can include a selection control to allow the user to select a category of information for which to present statistics (e.g., keywords, advertisements, ad campaigns, or ad groups).

The assist user interaction report 622 further includes a list of assist click totals 634 indicating a total quantity of assist clicks associated with each keyword 632 for the date range specified in the date range selection control 624. The assist click totals indicate that a keyword "vacation" is associated with 890 assist clicks. As described above, this indicates that the keyword "vacation" caused presentation of a content item 890 times where the content item was selected by a user prior to a last click for a conversion path. In some implementations, selecting the link 626 causes the list of assist click totals 634 to be replaced by a list of assist impression totals. In some implementations, selecting a link for assist user interactions causes the list of assist click totals 634 to be replaced by a list of assist user interaction totals.

The assist user interaction report 622 includes a bar graph 636 that indicates assist click percentages for each of the keywords in relation to the total quantity of assist clicks for the specified date range. The bar graph 636 visually indicates the percentage of assist clicks attributed to each keyword in relation to the total quantity of assist clicks to allow the user to readily visually inspect the totals and identify the relative contributions of each keyword from an assist click perspective. For example, the user can readily identify that the keyword "vacation" is associated with more assist clicks than the keyword "flights" since the bar at row 638 is larger than the bar at row 640. As another example, the user can readily identify that the keywords "vacation," "flights," and "travel" are associated with significantly more assist clicks than the remaining keywords 632 since the bars associated with the keywords of "vacation," "flights," and "travel" are significantly longer than the bars associated with the remaining keywords 632. This information can assist the user identifying the most successful keywords 632 for use in on-going and future advertising campaigns. In some implementations, selecting the link 626 causes the bar graph 636 to present assist impression percentage information. In some implementations, selecting a link for assist user interactions causes bar graph 636 to present percentage information for all assist user interactions.

In some implementations, additional assist user interaction measures ("assist interaction measures") can be presented on the assist user interaction report 622. For example, the assist user interaction report 622 includes text 642 indicating that the total quantity of assist clicks leading to conversions for the relevant conversion paths is 2,287 assist clicks. As another example, a percentage of assist clicks to last clicks for each keyword can be presented. As another example, a percentage of assist impressions to last clicks for each keyword can be presented. As yet another example, a percentage of assist user interactions to last clicks for each keyword can be presented. In some implementations, the assist user interaction measures can be presented in additional or alternative formats. For example, a pie graph similar to that shown in FIG. 3C can be presented showing the percentage of total assist clicks for each keyword. As another example, a line graph showing the total quantity of assist clicks or assist impressions for unique time periods (e.g., days or hours) over the course of the specified date range can be included on the assist user interaction report 622. As another example, the assist user interaction report 622 can include a table listing assist user interaction measures.

The assist user interaction report 622 includes a display type selection control 648 to allow the user to select one or more formats for presenting conversion path performance measures on the assist user interaction report 622. In the example shown, a selection control 649 is selected. The selection control 649 is used to select a bar graph format for presentation of some or all of the conversion path performance measures presented on the assist user interaction report 622. In the example shown, the display type selection control 648 additionally includes options for table, pie chart, and relative comparison chart formats. Selecting the relative comparison chart format can, for example, cause a bar graph comparing the total quantity of assist clicks for each keyword 632 to the average quantity of assist clicks for all keywords associated with an advertisement management system to be displayed.

The assist user interaction report 622 includes an export control 652 that allows the user to export some or all of the assist user interaction measures displayed on the assist user interaction report 622. In some implementations, the export control 652 allows the user to specify an export format. For example, the user can export the measures as a spread sheet file. As another example, the user can export the measures in a word processing document.

Assisted Conversions

Figure 7A:
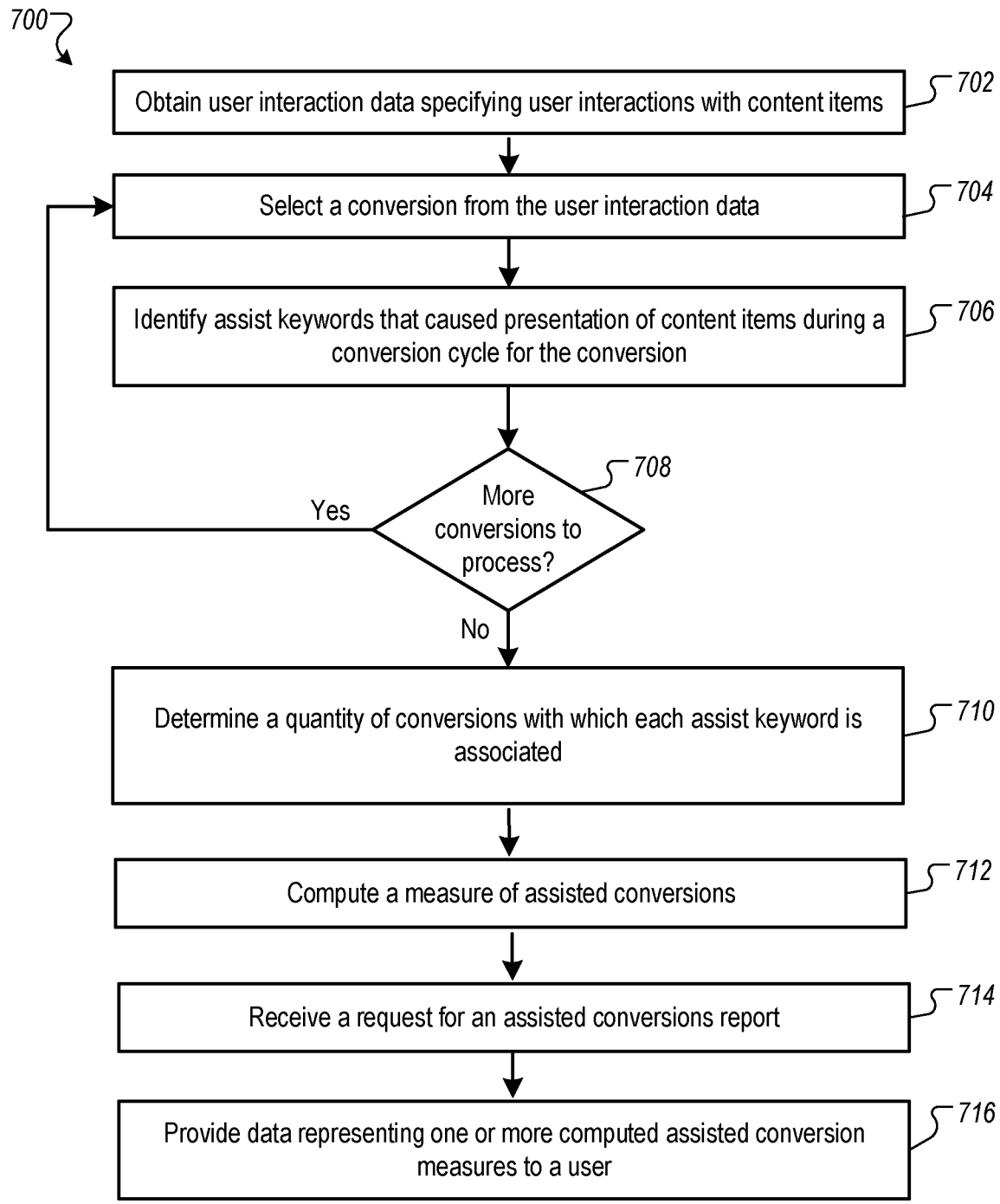
FIG. 7A is a flow chart of an example process for computing assisted conversion measures.

FIG. 7A is an example process 700 for computing assisted conversion measures. An assisted conversion is a conversion for which one or more assist user interactions occur during a conversion cycle for the conversion. For example, a conversion that is associated with an assist impression and/or an assist click, as described above, is an assisted conversion. In some implementations, a conversion having a conversion cycle that includes a last click, but no assist impressions or assist clicks is not an assisted conversion. A click assisted conversion is a conversion for which one or more assist user clicks occur during a conversion cycle for the conversion. An impression assisted conversion is a conversion for which one or more assist impressions occur during a conversion cycle for the conversion.

In some implementations, a keyword is identified as assisting a conversion (i.e., being an assist keyword) when the keyword causes one or more content items (e.g., ads) to be presented during a conversion cycle for the conversion. Similarly, ad campaigns and content item groups (e.g., ad groups) to which the targeting keyword belongs can also be identified as assisting the conversion. Content items that are presented during the conversion cycle for the conversion can also be identified as assisting a conversion in a similar manner.

For example, if a keyword and/or an ad that are included in an ad campaign are associated with an assist click for a conversion, the ad campaign is identified as assisting the conversion and the keyword is referred to as an "assist click keyword" for the conversion. Continuing with this example, if another keyword and/or another ad included in the ad campaign are associated with an assist impression for a conversion, the other keyword is referred to as an "assist impression keyword" and the ad campaign is associated with an impression assisted conversion and one click assisted conversion. An assisted conversion can be associated with an ad campaign by being stored at a memory location associated with the ad campaign, stored in association with an ad campaign identifier that represents the ad campaign, and/or by being indexed according to the ad campaign identifier or to a same index key (e.g., a same conversion identifier) as the ad campaign identifier.

The process 700 is a process by which one or more conversions are selected from user interaction data that specifies user interactions with content items. In turn, content items presented and/or selected during a conversion cycle for a selected conversion are identified and targeting keywords that caused presentation of the identified content items are selected. A quantity of conversions for which the targeting keywords caused content items to be presented is determined, and an assisted conversion measure is computed using the quantities of conversions for which the targeting keywords caused content items to be presented.

The process 700 is described below with reference to advertising campaigns that control distribution of advertisements in an online environment. However, the process 700 can also be used with other content distribution campaigns that control distribution of other content (e.g., video, audio, games, or other content).

The process 700 can be performed, for example, by the performance analysis apparatus 120 shown in FIG. 1. In some implementations, the performance analysis apparatus 120 is a data processing apparatus that includes one or more processors that are configured to perform actions of the process 700. In other implementations, a computer readable medium can include instructions that, when executed by a computer, cause the computer to perform actions of the process 700. The stages shown in FIG. 7A are illustrative of a set of stages that can be used to perform the process 700. Additional or fewer stages may be used, or stages may not be used at all.

User interaction data specifying user interactions with content items is obtained (702). The content items can be, for example, ads presented with search results, banner ads, text ads, video content, or audio content. Forms of user interactions can include presentation of a content item (i.e., an impression) to a user, selection (i.e., a click) of a content item by a user, and presentation of all or a portion of an audio and/or video content item to the user. In some implementations, the user interaction data are collected over a specified time period. For example, user interaction data can be collected for all user interactions that have occurred over the last two months (or other specified time periods).

In some implementations, the obtained user interaction data specify user interactions that are associated with a particular advertiser. User interactions that are associated with a particular advertiser are user interactions with content items provided by the advertiser. User interaction data that represent user interactions are associated with the advertiser by being stored with an advertiser identifier (e.g., an advertiser name, campaign name, and/or another identifier) that represents the advertiser and/or by being indexed according to the advertiser identifier or to a same index key (e.g., a same conversion identifier) as the advertiser identifier.

User interactions that are specified by the user interaction data can be associated with one or more conversions. For example, a user with which one or more user interactions occurred (i.e., a user that was presented one or more advertisements and/or selected one or more of the presented advertisements) can subsequently purchase goods from a retailer (i.e., complete a conversion). In this example, the impressions and/or selections of content items (e.g., advertisements) that occurred prior to the conversion can be identified as user interactions that are associated with the conversion, and are respectively referred to as assist impressions and assist clicks, as described above with reference to FIG. 6A. If another conversion occurs prior to any additional user interactions and/or within the conversion cycle for the other conversion, the assist impressions and assist clicks described above can also be associated with the other conversion.

For example, a user can be presented a first ad for a pizza chain and later be presented a second ad for a pizza chain without selecting either of the two ads. The user can then submit the URL for a web page of the pizza chain and order a pizza online (i.e., perform an act that constitutes a conversion). In this example, the impressions (i.e., the presentations of the two ads by the user) can be associated with the conversion (i.e., the purchasing of the pizza by the user) as assist impressions for the conversion, as described above. If the user again submits the URL of the web page and orders another pizza (or performs another act that constitutes a conversion) the impressions can also be associated with a second conversion, assuming that the impressions occurred within the conversion cycle for the second order.

As described above, each conversion can also be associated with content items that were presented and/or selected during the conversion cycle for the conversion as well as targeting keywords that control distribution of the content items. In some implementations, data specifying a targeting keyword that was matched, and therefore, caused a content item to be presented during the conversion cycle for the conversion can be stored at a memory location associated with the conversion and/or indexed according to a conversion identifier representing the conversion.

For example, if the targeting keyword "clothing" causes presentation of an ad to a user and the user subsequently selects (i.e., clicks) the presented ad, the keyword "clothing" can be associated with the user selection. If the user subsequently completes a conversion, then the selection of the ad is identified as an assist click for the conversion. In this example, the keyword "clothing" is associated with an assist click for the conversion by causing presentation of an ad that was selected during the conversion cycle for the conversion. Thus, a keyword identifier that represents the keyword can be associated with the conversion (e.g., stored at a memory location assigned to the conversion and/or being indexed according to the conversion identifier for the conversion) as an assist click keyword (i.e., a keyword that caused presentation of a content item that was selected during a conversion cycle).

User interactions and/or conversions can be associated with one or more ad groups and/or ad campaigns based on the associations of the user interactions and/or conversions with targeting keywords that belong to the respective ad groups and/or ad campaigns. For example, if a particular targeting keyword is an assist click keyword for a conversion, the assist click can also be associated with the ad group and/or ad campaign to which the particular targeting keyword belongs.

A conversion is selected from the user interaction data (704). In some implementations, the conversion can be selected in response to receiving a request, from an advertiser, for an assisted conversions report for a content distribution campaign (e.g., ad campaign). For example, an advertiser may access a user interface similar to that described with reference to FIG. 7B, and request an assisted conversions report that specifies an assisted conversion measure for a particular ad campaign, particular ad group, or particular targeting keyword. In turn, conversions for computing the report can be selected.

In other implementations, the conversion can be selected as part of a periodic assisted conversions report update. For example, an assisted conversions report can be generated and, in turn, updated periodically to provide an advertiser with an updated assisted conversions report upon demand. Pre-computing the performance reports can provide faster access to the report in response to the request. The description that follows describes selecting an individual conversion, but groups of conversions can also be selected for processing.

The conversion is selected from user interaction data that are associated with a particular advertiser. For example, user interaction data associated with TPC can include data representing multiple conversions. In this example, one or more of the conversions can be selected from among the multiple conversions that are included in the user interaction data for TPC. Conversions can be selected randomly, in an order in which they are indexed in the user interaction data, or in another predetermined order. For example, the user interaction data can include a set of conversions that each has a unique conversion identifier that uniquely identifies the conversion with which the identifier is associated. In this example, the conversions can be selected in sequential order of the conversion identifiers. Each conversion can also have a timestamp that specifies a time at which the conversion occurred, and the timestamp can be used to select the conversions in chronological order in which the conversions occurred.

Assist keywords that caused presentation of content items during a conversion cycle for the conversion are identified (706). Assist keywords that are associated with the conversion, either as assist click keywords or assist impression keywords can be selected from the user interaction data. For example, the user interaction data can include data specifying a first and a second targeting keyword that respectively caused presentation of two content items during the conversion cycle for the selected conversion, and that the user selected the second content item but not the first content item. In this example, the first targeting keyword is an assist impression keyword for the conversion and can be selected from the user interaction data.

In some implementations, targeting keywords that caused presentation of content items that are presented and/or selected prior to the last click for the conversion cycle are selected, and targeting keywords that are associated with the last click of the conversion cycle (i.e., a keyword that caused presentation of the last clicked content item) are not selected. Continuing with the example above, the second targeting keyword will not be selected in these implementations because the second targeting keyword caused presentation of the content item that was last selected prior to the conversion. Thus, the second targeting keyword is a last click keyword for the conversion rather than an assist impression keyword or an assist click keyword for the conversion.

A determination is made as to whether there are more conversions to process (708). If there are additional conversions to process, the process 700 returns to stage 704 of selecting a conversion from the user interaction data. If it is determined that there are no remaining conversions to process, the process 700 proceeds to stage 710.

A quantity of conversions with which each assist keyword is associated is determined (710). The quantity of conversions with which each assist keyword is associated is referred to an assisted conversion count for the assist keyword. In some implementations, the assisted conversion count for each assist keyword is the total quantity of conversions for which the assist keyword caused presentation of at least one content item during the conversion cycles for the conversions. For example, each time the process 700 repeats stages 704 through 708 for a different conversion, a counter associated with a targeting keyword can be incremented in response to determining that the targeting keyword is identified at stage 706 as an assist keyword for the conversion. In this example, a final value of each counter will be the assisted conversion counts for each respective assist keyword.

The assisted conversion count described above includes both the quantity of conversions for which the assist keyword was an assist click keyword and a quantity of conversions for which the assist keyword was an assist impression keyword. In some implementations, a quantity of click assisted conversions (i.e., conversions for which the assist keyword was an assist click keyword) and a quantity of impression assisted conversions (i.e., conversions for which the assist keyword was an assist impression keyword) is determined separately for each assist keyword. For example, assist keywords can be associated with separate counters that track click assisted conversions and impression assisted conversions for the assist keyword. In this example, the assisted conversion counter can be incremented once for each conversion for which the assist keyword is associated with an assist click, but is not associated with a last click, And the impression assisted conversion counter can be incremented once for each conversion for which the assist keyword is associated with an assist impression, but is not associated with an assist click or a last click.

In some implementations, each assist keyword can be credited with at most one conversion count for each conversion irrespective of how many times the assist keyword is identified as an assist click keyword and/or an assist impression keyword for the conversion. For example, assume that during a conversion cycle for a conversion, a particular assist keyword causes presentation of five content items, three of which are selected by the user. In this example, the assist keyword can be credited with one assisted conversion, even though the assist keyword caused presentation and selection of multiple content items.

An assisted conversion measure is computed (712). As described above, an assisted conversion is a conversion for which one or more assist user interactions occur during a conversion cycle for the conversion. Assisted conversions can include, for example, conversions for which at least one content item was presented to a converting user and zero or more of the presented content items were selected by the converting user prior to a last click for the conversion. Assisted conversion measures can be computed for each assist keyword that is identified as described above. The assisted conversion measures can also be computed on a per-advertiser, per content item, per-advertising campaign, and per-ad group basis. For example, assisted conversion measures for an ad group can be computed using the assisted conversion measures for each of targeting keywords that belong to the ad group. The assisted conversion measures can also be computed for other attributes of an advertising campaign.

In some implementations, the assisted conversion measures can include a total quantity of conversions for which assist clicks and/or assist impressions occurred during the conversion cycles for the conversions. For example, a quantity of click assisted conversions is a quantity of conversions for which at least one content item is selected prior to a last click for the conversions. As another example, a first ad is presented twice, followed by a presentation and selection of a second ad. A third ad is then presented and selected, followed by a conversion. The first and second ads are identified as assisting the conversion while the third ad is not identified as assisting the conversion since the third ad is associated with only the last click. In this example, the first ad can be associated with an impression assisted conversion and the second ad can be associated with a click assisted conversion. In some implementations, if a content item is presented and not selected and subsequently presented and selected in the same conversion cycle prior to a last click, the content item is associated with a click assisted conversion and not an impression assisted conversion (e.g., the conversion is only counted once with respect to the content item).

The assisted conversion measures can also include an average quantity of assisted conversions, click assisted conversions, or impression assisted conversions. Additionally, other statistical measures (e.g., standard deviation, mode, median) and distributions of assisted conversions, click assisted conversions, and/or impression assisted conversions can be generated. The discussion below describes several example measures of user interactions that can be computed, but other measures can be computed.

In some implementations, computing an assisted conversion measure includes computing a ratio of the quantity of assisted conversions, click assisted conversions, or impression assisted conversions relative to the quantity of last clicks or conversions for an advertiser. In these implementations, the quantity of assisted conversions (or click/impression assisted conversions) for the targeting keyword can be divided by the quantity of last clicks for the targeting keyword to compute the ratio of assisted conversions to last clicks for the targeting keyword. For example, if the total quantity of last clicks for a particular keyword is 844 and the total quantity of assisted conversions for the particular keyword is 112, the ratio of assisted conversions to last clicks for the particular keyword is 0.13. As another example, if the total quantity of conversions for an ad campaign is 931 and the total quantity of click assisted conversions for the ad campaign is 274, the ratio of click assisted conversions to total conversions for the ad campaign is 0.29.

In some implementations, a request for an assisted conversions report that specifies an assisted conversion measure for a content distribution campaign is received (714). The request can be received, for example, from an advertiser that accesses a user interface, such as the user interface described with reference to FIG. 7B, and selects a user interface element that causes the data representing the request to be submitted. The request can specify, for example, a report period for the assisted conversions report. For example, if the specified report period is a one month period, then the assisted conversions report specify assisted conversion measures for conversions that occurred during the one month period.

In response to the request, data representing one or more computed assisted conversion measures is presented to a user (716). For example, data that causes presentation of the total quantity of click assisted conversions for a one or more assist keywords associated with an advertiser can be provided to a user device. As another example, data that causes presentation of a web page that specifies the ratio of assisted conversions to last clicks for one or more ad campaigns can be provided to a user device. The data can be presented to the user, for example, in the form of a graph, chart, table, or spread sheet. The data can be presented as part of a webpage, or exported as a file (e.g., a text file, word processing file, spread sheet, or database file).

Figure 7B:
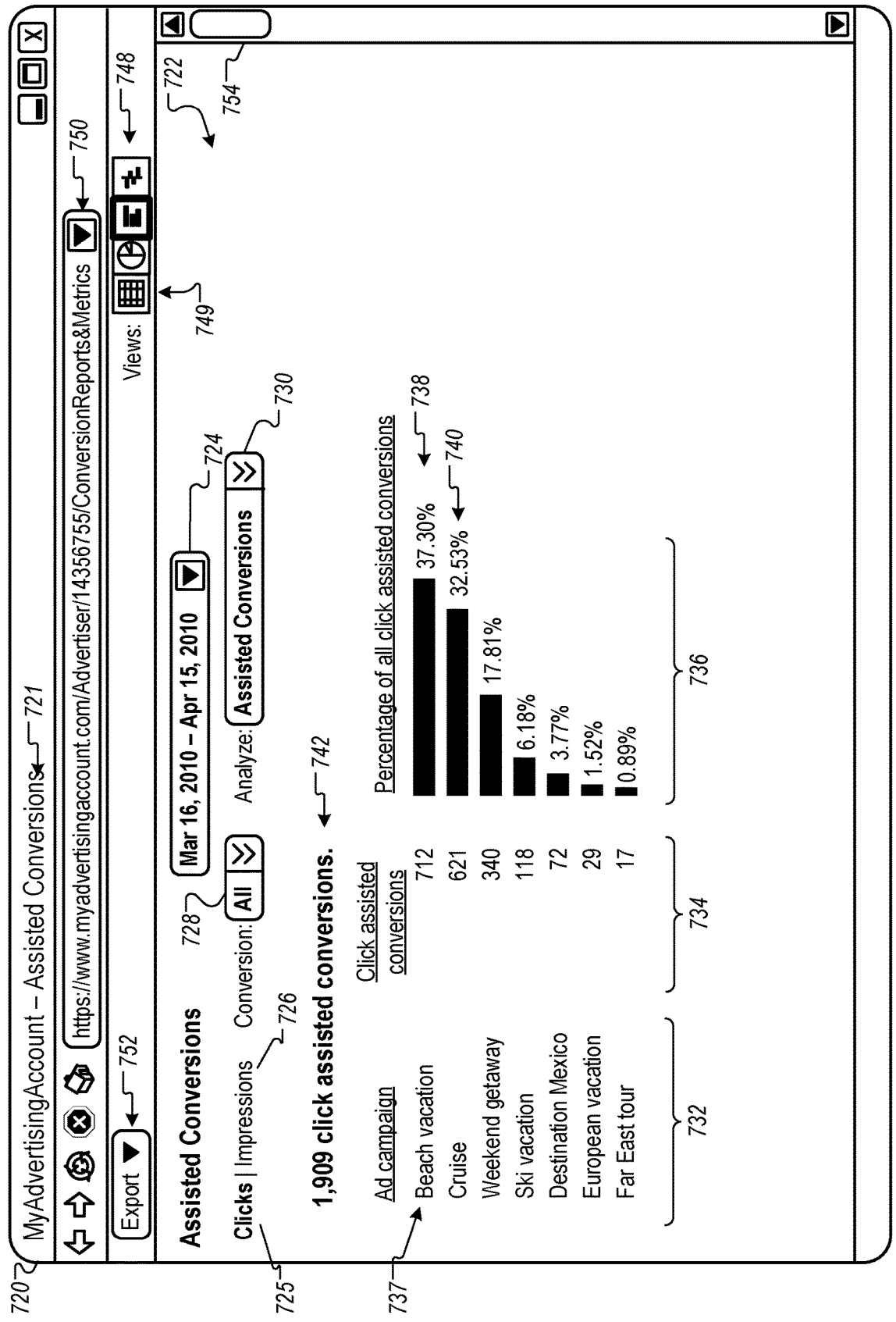
FIG. 7B is a screen shot of an example user interface for providing assisted conversion measures.

FIG. 7B is a screen shot of a conversion report user interface 720 for providing assisted conversion measures (e.g., click assisted conversion and impression assisted conversion measures) are provided. The user interface 720 can be presented, for example, in a web browser application that displays web pages and other resources that make up websites, (such as the websites 104 of FIG. 1). The conversion report user interface 720 includes a header 721 for indicating information that is displayed in the conversion report user interface 720. In this example, the header 721 indicates that information associated with a web page titled "MyAdvertisingAccount" is being presented and that the presented information more specifically relates to assisted conversions.

The conversion report user interface 720 includes an assisted conversion report 722 for presenting assisted conversion measures. The assisted conversion report 722 includes a number of selection controls (described in more detail below) that enable a user to specify parameters for the assisted conversion measures. The assisted conversion report 722 can be presented, for example, in a web page received from a web server over the Internet. As another example, referring to FIG. 1, the assisted conversion report 722 can be presented with another resource 105 that is received over the network 102 by one of the user devices 106.

The conversion report user interface 720 includes an address bar 750 that displays a URL for the assisted conversion report 722. In some implementations, the user can access the assisted conversion report 722 by entering the URL into the address bar 750. The user interface 720 further includes a scroll bar 754 that enables the user to scroll through content presented on the assisted conversion report 722.

The assisted conversion report 722 includes a date range selection control 724 that enables the user to specify a date range for the assisted conversion measures that are presented in the assisted conversion report 722. The date range specified in the date range selection control 724 can be used to select data with which the assisted conversion measures that are presented in the assisted conversion report 722 are computed. For example, the date range can be used to select user interaction data that are associated with conversions that occurred within the specified date range, user interaction data that are associated with conversion cycles where the entire conversion cycle occurred during the specified date range, or user interaction data that are associated with conversion cycles where any portion of the conversion cycle occurred during the specified date range. For example, user interaction data associated with a conversion cycle for which only a first assist impression occurred during the specified date range can be included in the information presented on the assisted conversion report 722.

The assisted conversion report 722 includes active links 725 and 726 that enable the user to specify a type of assisted conversion report to present. In the example shown, selection of the link 725 causes information for a click assisted conversion report to be presented. For example, selection of the link 725 can cause submission of a request for the click assisted conversion report. In response to the selection of the link 725, data that causes presentation of measures of click-assisted conversions and related data can be provided. The measures of click-assisted conversions can include, for example, a total quantity of click-assisted conversions, an average quantity of click assisted conversions, and other statistical measures of click assisted conversions.

Selecting the link 726 causes information for an impression assisted conversion report to be presented. For example, selection of the link 726 can cause submission of a request for the impression assisted conversion report. In response to the selection of the link 726, data that causes presentation of measures of impression-assisted conversions and related data can be provided to the user device. The measures of impression-assisted conversions can include, for example, a total quantity of impression-assisted conversions, an average quantity of impression-assisted conversions, and other statistical measures of impression-assisted conversions.

In the example shown, the link 725 is bold to indicate that the link 725 is currently selected and that a click assisted conversions report is currently being presented by the assisted conversion report 722. The click assisted conversion report provides measures of click assisted conversions, where the conversions were completed during a date range of Mar. 16, 2010 to Apr. 15, 2010. Thus, user interaction data that are associated with conversions that were completed during the specified date range were used to compute the measures of click-assisted conversions.

The click assisted conversion report provides measures of click-assisted conversions for a set of ad campaigns 732. The list of ad campaigns 732 can be, for example, ad campaigns that each include one or more sets of targeting keywords that control distribution of advertisements for a particular advertiser. For example, a beach vacation ad campaign 737 can include the targeting keywords "beach," "swimming," "surfing," "family vacation," "sun," and "relaxing vacation." Thus, when any of these targeting keywords are matched, as described above, one or more ads included in the ad campaign can be presented. As another example, a ski vacation ad campaign can include the targeting keywords "skiing," "winter vacation," "Colorado vacation," "snowboarding," "snow vacation," and "winter weekend getaway."

In the example shown, the click assisted conversion report presents click assisted conversion statistics for each campaign in the set of the ad campaigns 732. In some implementations, in place of or in addition to presentation of the set of ad campaigns 732, the click assisted conversion report can present a set of targeting keywords (e.g., the set of keywords 632 shown in FIG. 6B) associated with an advertiser and/or ad campaign and the click assisted conversion statistics for each targeting keyword in the set of targeting keywords.

The click assisted conversion report can also present references (i.e., advertisement identifiers) for advertisements in a set of advertisements that are distributed for an advertiser and/or by ad campaigns and present click assisted conversion statistics for each of the advertisements. In some implementations, the click assisted conversion report can include a list of products sold by the advertiser and present click assisted conversion statistics for ads and/or targeting keywords that are associated with each product.

The click assisted conversion report further includes a set of click assisted conversion totals 734 indicating a total quantity of click assisted conversions that are associated with each ad campaign 732. The click assisted conversion totals indicate that the beach vacation ad campaign 737 is associated with 712 click assisted conversions. Thus, the keywords that are included in the beach vacation ad campaign provided at least one assist click for each of 712 conversions that occurred during the specified period. In some implementations, the text "beach vacation" is associated with a hyper-link that upon selection requests presentation of the keywords that are included in the "beach vacation" ad campaign and the quantity of assisted click conversions for each of the keywords.

The assisted conversion report 722 includes a bar graph 736 that specifies click assisted conversion percentages for each of the ad campaigns 732 in relation to the total quantity of click assisted conversions for the specified date range. The bar graph 736 visually indicates the percentage of the total click assisted conversions that are attributed to each ad campaign 732 for the specified period. Therefore, the user can visually inspect the percentages and identify the relative contributions of each ad campaign 732 from a click assisted conversion perspective. For example, the user can readily identify that the beach vacation ad campaign is associated with more click assisted conversions than a cruise ad campaign since the bar at row 738 is larger than the bar at row 740. In some implementations, selecting the link 726 causes the bar graph 736 to present impression assisted conversion percentage information. In some implementations, selecting a link for all assisted conversions causes bar graph 736 to present percentage information for all assisted conversions.

In some implementations, additional assisted conversion measures can be presented on the click assisted conversion report. For example, the click assisted conversion report includes text 742 indicating that the total quantity of click assisted conversions for the advertiser over the specified date range is 1,909 click assisted conversions. As another example, a ratio (e.g., presented as a percentage) of click assisted conversions relative to a quantity of last clicks for each ad campaign 732 can be presented. As another example, a ratio (e.g., presented as a percentage) of impression assisted conversions relative to a quantity of last clicks for each ad campaign 732 can be presented. As yet another example, a ratio (e.g., presented as a percentage) of all assisted conversions relative to a total quantity of last clicks for each ad campaign 732 can be presented.

In some implementations, the assisted conversion report 722 includes a link that upon user selection generates a co-presentation request that requests presentation of both a click assisted conversion report and an impression assisted conversion report (i.e., all assisted conversions) in a same user interface. For example, in response to the co-presentation request, the click assisted conversion report and the impression assisted conversion report can both be presented in the user interface 720.

The assisted conversion report 722 includes a conversion type selection control 728 that enables the user to specify one or more types of conversions for which the assisted conversion report includes related information. In some implementations, the conversion type selection control 728 can be a drop down menu having user selectable options. In other implementations, the conversion type selection control can be a hypertext link or another user interface control element (e.g., a text box, check box, or radio button). In the example shown, the conversion type selection control 728 indicates that the assisted conversion report includes information for "all" types of conversions is presented on the assisted conversion report 722.

Conversion reports can be generated for each of many different types of conversions. In some implementations, each of the following user actions can be identified as a different conversion type: signing up for a mailing list, making a purchase, creating a user profile, making a reservation, requesting presentation of a video, requesting presentation of audio, downloading one or more files, installing one or more programs on the user device, or providing specified information, and each a separate path length report can be generated for each of these different conversion types.

Each advertiser can specify its own set of conversion types and the user actions that constitute a conversion for each conversion type. For example, an on-line gaming company can identify three types of conversions. The first conversion type can be identified as an information conversion that is completed when a mailing address (physical or electronic) is received from a user. The second conversion type can be identified as a download conversion that is completed when a user downloads and/or installs a trial version of an on-line game. The third conversion type can be identified as a purchase conversion that is completed when a user purchases an on-line game. In this example, the conversion type selection control 728 enables allows the user (i.e., the advertiser) to request presentation of an assisted conversion report that specifies assisted conversion measures for purchase conversions and/or an assisted conversion report that specifies assisted conversion measures for other types of conversions (e.g., information conversions or download conversions).

In some implementations, the assisted conversion report 722 can separately specify, in a single user interface display, assisted conversion measures for more than one conversion type. Continuing with the example above, in response to a request for an assisted conversion report that includes separate assisted conversion measures for purchase conversions and download conversions, data can be provided that cause presentation of the assisted conversion measures for the purchase conversions at a display location that is adjacent to the display location of the assisted conversion measures for the download conversions. Thus, a user can directly compare the measures assisted conversions for purchase conversions to the assisted conversion measures for the download conversions.

The assisted conversion report 722 includes an analysis type selection control 730 to allows the user to select from among multiple types of conversion path performance measures (similar to the analysis type selection control 630 shown in FIG. 6B). In the example shown, the analysis type selection control 730 indicates that information currently presented on the assisted conversion report 722 relates to assisted conversions. Other types of conversion path performance measures can include time lag measures, path length measures, last click measures, first click measures, assist user interaction measures, and other conversion path performance measures. In some implementations, the analysis type selection control 730 can be a drop down menu having user selectable options.

In some implementations, the assisted conversion measures can be presented in additional or alternative formats. For example, a pie graph similar to that shown in FIG. 3C can be presented showing the percentage of total click assisted conversions for each ad campaign 732. As another example, a line graph showing the total quantity of click assisted conversions or impression assisted conversions for unique time periods (e.g., days or hours) over the course of the specified date range can be included on the assisted conversion report 722. As another example, the assisted conversion report 722 can include a table listing assisted conversion measures.

The assisted conversion report 722 includes a display type selection control 748 to allow the user to select one or more formats for presenting assisted conversion measures on the assisted conversion report 722. In the example shown, a selection control 749 is selected. The selection control 749 is used to select a bar graph format for presentation of some or all of the assisted conversion measures presented in or with the assisted conversion report 722. In the example shown, the display type selection control 748 additionally includes options for table, pie chart, and relative comparison chart formats.

The assisted conversion report 722 includes an export control 752 that enables the user to export some or all of the assisted conversion measures that are computed and/or displayed in the assisted conversion report 722. In some implementations, the export control 752 enables the user to specify an export format. For example, the user can export the measures as a spread sheet file. As another example, the user can export the measures in a word processing document.

Cross-Drill Measures

Figure 8A:
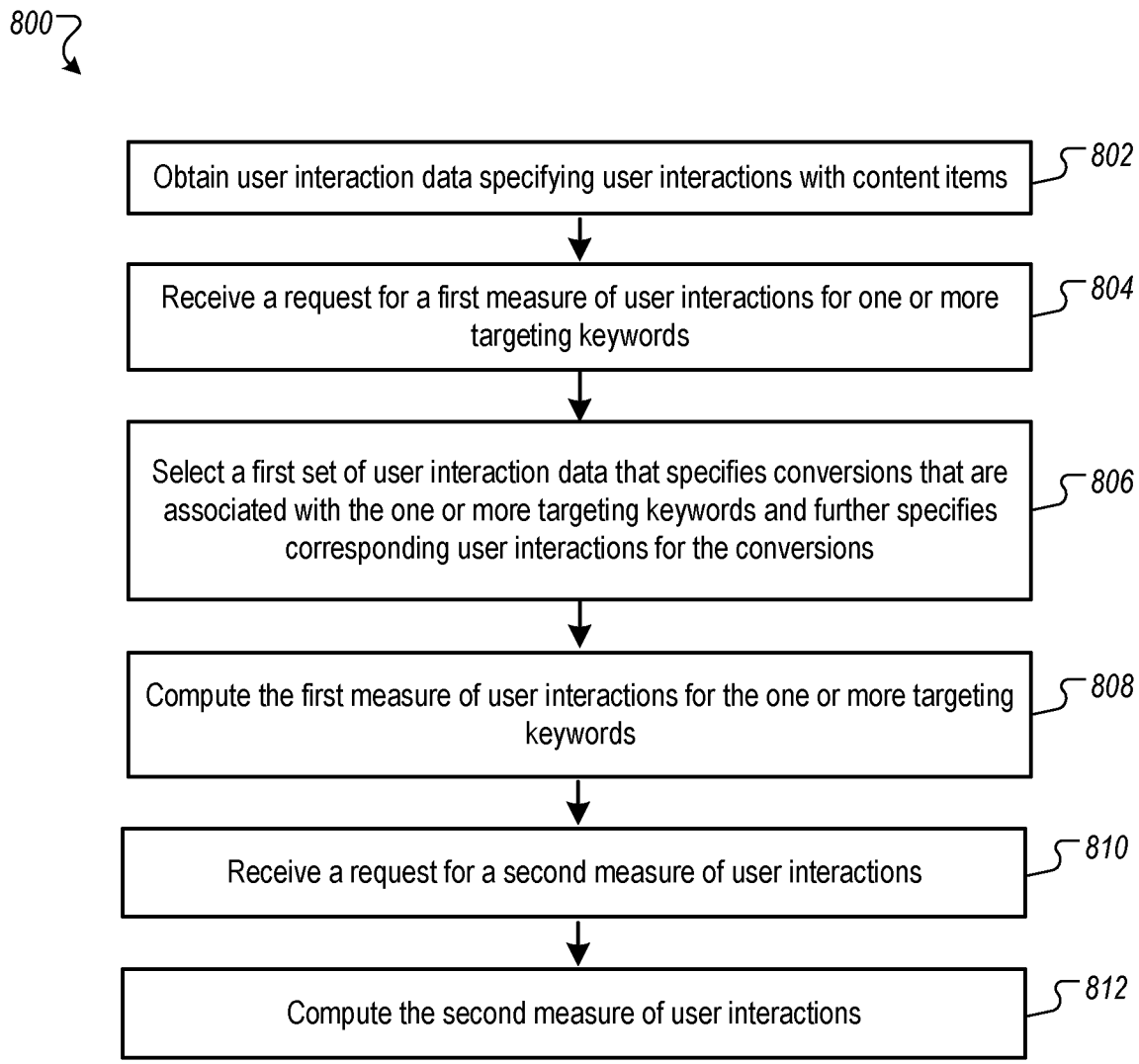
FIG. 8A is a flow chart of an example process for drilling into conversion path performance measures.

FIG. 8A is an example process 800 for computing user interaction measures for one or more targeting keywords. The one or more targeting keywords (referred to as candidate keywords) can be, for example, targeting keywords that are associated with a particular user interaction with a candidate content item (i.e., a content item associated with the conversion and with which the particular user interaction occurred). As described in more detail below, the particular user action can be a first click of a first clicked content item, a last click of a last clicked content item, or another user interaction with a specified content item. Multiple user interaction measures can be sequentially computed for a set of conversions, and each subsequent computation can be performed using the user interaction data for the conversions that were included in the previous user interaction measure. Thus, each sequential computation "drills down" into the data that was used for the previous computation.

Performing sequential computations with user interaction data for conversions that were included in the previous user interaction measure enable an advertiser to filter data using criteria of a first report and then viewing other reports that are generated using the filtered data. For example, conversion path performance measures relating to assist clicks for various keywords for an advertiser can be displayed as shown in FIG. 6A. A user can select one of the keywords 632 and select a secondary analysis type. If the user selects a secondary analysis type of last clicks, keywords that caused content items associated with last clicks to be presented for all of the conversion paths for which the selected keyword was associated with an assist click can be displayed. As another example, a list of last clicked keywords (i.e., keywords that caused presentation of the last clicked content item for a conversion path) for conversions associated with an advertiser to be presented can be displayed.

A user can select a keyword of "flights" from the list of keywords and select a secondary analysis type of "assisted conversions." A list of keywords that caused content items associated with assisted conversions to be presented for conversion paths for which the selected keyword "flights" caused the last clicked content item to be presented can be displayed to the user. In other words, each of the displayed last clicked keywords in this example is associated with an assisted conversion where the last click for each assisted conversion is associated with the selected keyword "flights." As yet another example, a user can select a beach vacation ad campaign from a list of ad campaigns associated with last clicks and select a drill down measure of "top paths" to cause a list of conversion paths where the last click of the conversion path is associated with the selected beach vacation ad campaign to be displayed.

The process 800 is a process by which user interaction data for user interactions with content items is obtained, a request for a first measure of user interactions for one or more targeting keywords is received, and a first set of user interactions data are selected in response to the received request. In some implementations, the selected user interaction data specifies conversions that are associated with the one or more targeting keywords and further specifies corresponding user interactions for the conversions. In turn, a first measure of user interactions for the one or more targeting keywords is computed. Subsequently, a request for a second measure of user interactions is received and a second measure of user interactions is computed.

The process 800 is described below with reference to advertising campaigns that control distribution of advertisements in an online environment. However, the process 800 can also be used with other content distribution campaigns that control distribution of other content (e.g., video, audio, game, or other content).

The process 800 can be performed, for example, by the performance analysis apparatus 120 shown in FIG. 1. In some implementations, the performance analysis apparatus 120 is a data processing apparatus that includes one or more processors that are configured to perform actions of the process 800. In other implementations, a computer readable medium can include instructions that, when executed by a computer, cause the computer to perform actions of the process 800. The stages shown in FIG. 8A are illustrative of a set of stages that can be used to perform the process 800. Additional or fewer stages may be used, or stages may not be used at all.

User interaction data specifying user interactions with content items are obtained (802). As described above, the user interaction data can represent user interactions that can include presentation of a content item (i.e., an impression) to a user, selection (i.e., a click) of a content item by a user, and presentation of all or a portion of an audio and/or video content item to the user. In some implementations, the user interaction data are collected over a specified time period. For example, user interaction data can be collected for all user interactions that have occurred over the last two months.

In some implementations, the obtained user interaction data specify user interactions that are associated with a particular advertiser, a particular conversion, a particular targeting keyword, and/or content items with which the interaction occurred, as described above. For example, impressions and/or selections of content items that occurred with respect to a user prior to a conversion by the user can be identified as assist impressions, assist clicks, and last clicks as described above with reference to FIG. 6A.

A conversions and/or user interactions with a content item that is presented during a conversion cycle for the conversion can also be associated with one or more keywords that caused presentation of the content item. User interactions and/or conversions can also be associated with one or more ad groups and/or ad campaigns based on the associations of the user interactions and/or conversions with targeting keywords that belong to the respective ad groups and/or ad campaigns, as described above.

A request for a first measure of user interactions ("first measure") for one or more targeting keywords is received (804). The request for the first measure can specify that the first measure be computed for a first set of user interface data. In some implementations, the first set of user interactions can include user interactions that are associated with conversions for which one or more targeting keywords caused presentation of content items with which a particular user interaction occurred. As described above, the particular user interaction can be a first click of a first clicked advertisement, a last click of a last clicked advertisement, or another specified user interaction. In some implementations, the particular user action can be required to have occurred prior to a last click for a conversion. The content items with which the particular user interaction occurred are referred to generally as "candidate content items."

A user can access a user interface to specify parameters for which one or more measures of user interactions are to be computed. For example, the user can specify a group of targeting keywords (e.g., keywords in one or more ad groups and/or one or more ad campaigns) for which the measures of user interactions are to be computed. Additionally, the user can access the user interface to specify that the first measure to be computed is an analysis of "first click" (or "last click" analysis) user interactions. Other parameters that the user can specify can include, for example, a date or time range of user interaction data, a conversion type for the user interaction data, an assist user interaction type for the user interaction data (e.g., click, impression, or all), an analysis type for the first measure, a targeting keyword grouping indication, and a display format for the first measure.

A first click conversion analysis can provide, for each keyword, a quantity of conversions for which the keyword caused presentation of a content item that was the first content item selected by a user during a conversion cycle for a conversion. A last click conversion analysis can provide, for each keyword, a quantity of conversions for which the keyword is a last clicked keyword (i.e., caused presentation of a content item that was the last content item selected by a user prior to the conversion).

The last click conversion analysis can additionally provide a ratio of last clicks to first clicks for a keyword, a ratio of last clicks for the keyword to last clicks for all keywords, a ratio of last clicks to assist clicks for a keyword, a ratio of last clicks to assisted conversions for a keyword, or other statistics related to last clicks of content items presented as part of conversion cycles in response a match for the keyword. Additionally, the last click conversion analysis can include other statistical measures (e.g., standard deviation, mode, median) and distributions of last clicks.

In some implementations, the request for a first measure includes a request for a first impression conversion analysis or a last impression conversion analysis that respectively specifies a quantity of conversions for which each targeting keyword causes presentation of a first or last presented content item. Other types of first or last impression conversion analyses can include similar calculations as described above for first and last click conversion analyses. For example, a separate first or last impression conversion analysis can be separately performed for each of one or more different conversion types, in a manner similar to that described with reference to FIG. 7B.

In other implementations, the request for a first measure can be a request for a measure of assist user interactions for a targeting keyword, a measure of time lag for a targeting keyword, a measure of assisted conversions for a targeting keyword, or a measure of path length for a targeting keyword.

In some implementations, requests for measures of user interactions are automatically submitted when the user submits or edits a parameter. In some implementations, the user submits requests for measures of user interactions by selecting a submit (i.e., enter) control. A submitted request for a measure of user interactions can be received by a system capable of computing or identifying conversion path performance measures. For example, referring to FIG. 1, the performance analysis apparatus 120 can receive the first measure.

The one or more targeting keywords can be keywords associated with an advertiser, an ad campaign, an ad group, a content item, or one or more specified products. For example, the request can specify user interactions for targeting keywords associated with a weekend getaway ad campaign. As another example, the one or more targeting keywords can be associated with a single content item.

A first set of user interaction data are selected (806). In some implementations, the first set of user interaction data specifies conversions that are associated with the particular user interaction with the candidate content item and further specifies corresponding user interactions for these conversions. For example, the selected user interaction data can be data associated with conversions for which the one or more targeting keywords caused content items associated with assist clicks or assist impressions for the conversions to be presented. As another example, the selected user interaction data can specify conversion paths of conversions for which the one or more targeting keywords caused content items for the conversion paths to be presented (e.g., the keywords are associated with assist clicks, assist impressions, and last clicks for the conversion paths).

For example, the first set of user interaction data may include data representing a conversion for which a particular targeting keyword caused presentation of a first clicked content item. In this example, the user interaction data associated with this conversion can include data that represents the particular targeting keyword as the first keyword (K1) in the conversion path for the conversion. The user interaction data can also include data specifying the remaining keywords (K2-Kn) that respectively caused sequential presentation of content items over the conversion cycle for the conversion. Thus, the first set of user interaction data can specify that the conversion path of for the conversion includes K1-Kn in sequential order.

In some implementations, the first set of user interaction data also indicates, for the conversions that are associated with the particular user interaction with the candidate content item, assist clicks for the conversions, assist impressions for the conversions, last clicks for the conversions, and targeting keywords, content items, ad campaigns, or ad groups associated with the conversions, assist clicks, assist impressions, and/or last clicks. For example, if the request received at stage 804 includes an indication of a keyword "running shoes," the first set of user interaction data can include information for all conversion paths that include content items presented in response to a match for the keyword "running shoes."

As another example, when the request specifies that the first measure is to be computed for an ad campaign named "Generic products" using user interaction data for conversions for which keywords in the ad campaign "Generic" caused presentation of the last clicked advertisement, the first set of user interaction data can include information for all conversion paths where keywords from the ad campaign "Generic" caused presentation of last clicked content items. In this example, the first set of user interaction data can include data specifying each content item included in the conversion paths, keywords that, at least in part, caused the content items to be presented, and ad groups that include the keywords. The first set of user interaction data can additionally specify whether each content item is associated with an assist click, an assist impression, or a last click for a particular conversion path.

The first measure for the one or more targeting keywords is computed (808). The first measure can be computed on a per-advertiser, per-content item, per-advertising campaign, per-ad group, or per-keyword basis. In some implementations, the computed first measure can specify a quantity of conversions for which the targeting keywords caused presentation of the candidate content item.

For example, if the request received at stage 804 indicates that last click related measures for the targeting keywords are requested, the first measure can be a total quantity of conversions for which each targeting keyword caused a last clicked content item to be presented.

In other implementations, the first measure can specify a quantity of assist clicks, assist impressions, total assist user interactions, click assisted conversions, impression assisted conversions, total assisted conversions, last clicks, last impressions, first clicks, first impressions, a time lag measure, a path length measure, user interaction paths, any combination of these measures, or any previously described conversion path performance measures associated with the one or more targeting keywords (or ad campaigns, ad groups, etc.).

For example, if the request received at stage 804 indicates that click assisted conversions measures for the targeting keywords are requested, the first measure can be a total quantity of conversions for which each targeting keyword (or ad campaign) caused a content item to be presented in the conversion paths of the conversions prior to the last click for the conversions where the presented content item was selected by a user. As yet another example, average path lengths for the indicated keywords can be computed. As yet another example, paths that include the indicated keywords can be computed and a total quantity of times that each path lead to a conversion can be computed.

Additional conversion path performance measures that can be included in the computed first measure can include ratios of assist clicks to last clicks, assist impressions to last clicks, assist user interactions to last clicks, assisted conversions to last clicks, click assisted conversion to last clicks, impression assisted conversions to last clicks, assist interactions for a keyword to total assist interactions, or assisted conversions for a keyword to total assisted conversions. For example a ratio of assist clicks associated with each targeting keyword (or ad campaign) indicated in the request received at stage 804 to a total quantity of assist clicks for all targeting keywords can be computed. As another example, a ratio of assisted conversions associated with an ad campaign to last clicks associated with the ad campaign can be computed.

A request for a second measure of user interactions ("second measure") is received (810). In some implementations, the request for the second measure is a request that temporally and/or sequentially follows the request for the first measure. For example, the request for the second measure can be a request for a quantity of assist clicks, assist impressions, total assist user interactions, click assisted conversions, impression assisted conversions, total assisted conversions, last clicks, last impressions, first clicks, last clicks, first impressions, a time lag measure, a path length measure, user interaction paths, any combination of these measures, or any previously described conversion path performance measures associated with the one or more targeting keywords (or ad campaigns, ad groups, etc.). This request can sequentially follow, for example, a previously received first request for a first click analysis or a last click analysis.

The request for a second measures of user interactions can be a request for more specific measures (relative to those provided by the first measure) of user interactions for the conversions, targeting keywords, and/or content items that are included in the first set of user interaction data. As described in more detail below, the parameters that were specified for the first measure can be used as conditions that must be satisfied for a conversion to be analyzed. In some implementations, the conversions that were included in the first measures (or a subset of the conversions that were included in the first measures) can be the only conversions that are eligible to be analyzed for the second measure. For example, following computation of first measures of user interactions, a particular keyword might be identified as the first click keyword for 10 conversions. When the request for the second measures is received, the second measure can be computed using those 10 conversions.

In some implementations the request for the second measure of user interactions is received in response to presentation of the first measure. For example, the first measure of user interaction computed at stage 808 can be a last click analysis for one or more ad campaigns that each include a group of targeting keywords. The last click analysis can include a determination of a quantity of conversions for which targeting keywords were last clicked keywords. The results of the last click analysis can be presented to a user (e.g., as part of a webpage, or in a spread sheet).

Following presentation of the results, the user can initiate a request for a second measure by selecting an ad campaign from the list of ad campaigns and/or selecting a second analysis type. For example, the user can select an analysis type of path length in order to initiate a request for a path length analysis (i.e., a request for a path length report) of conversions for which a targeting keyword in the selected ad campaign was a last clicked keyword. The path length analysis can include, for example, data specifying path lengths for the conversion paths for which a targeting keyword in the ad campaign was a last clicked keyword.

As another example, a list of ad groups that each include multiple keywords that are associated with first clicks for conversions associated with an indicated advertiser is presented to a user along with a first click analysis for the keywords including a quantity of conversions for which the keywords in each ad group caused presentation of a first clicked advertisement. The user can select one of the ad groups to request more specific (e.g., more detailed or granular) analysis of the keywords that are included in the ad group. In response to the selection of the ad group, the first measures for each of the targeting keywords in the ad group can be presented. The user can then request a top path report for the conversions that were used to perform the first click analysis. That is, the user request is a request for a top path analysis for conversion paths for which a targeting keyword in the ad group caused presentation of the first clicked ad in the conversion path.

The second measure of user interactions is computed (812). The request for the second measure can include a request for further analysis of interactions for conversions that are associated with the particular user interaction with the candidate content item. Therefore, the second measure can be computed using user interaction data for conversions that are associated with the particular user interaction with the candidate content item. For example, the request for the second measure can request analysis of the conversions that were included in the first measure. As described above the second measure can be any of the previously described measures of user interactions or another measure of user interactions.

For example, assume that an advertiser first requested a last click analysis of its ad campaign "basketball." In response to the request, user interaction data that specified targeting keywords for the "basketball" campaign as last click keywords are selected, and the selected user interaction data are used to compute measures of user interactions for the "basketball" campaign.

In response to presentation of the measures of user interactions, the user selects a second type of analysis to perform, which as described above, initiates a request for measure of user interactions for the second type of analysis. For example, the request can be for a path length analysis. In this example, rather than performing the path length analysis on all available user interaction data, the second analysis is performed using the user interaction data that indicate that targeting keywords for the "basketball" campaign are last click keywords. Thus, the computation of path length measures are performed using user interaction data that indicate that a targeting keyword in the "basketball" campaign is associated with a particular user interaction (i.e., a last click) with a candidate content item (i.e., a last clicked advertisement). By performing the analysis using data that was selected to compute the first measure, the second measure can provide more detailed measures of user interactions for the conversions that were included in the first measures of user interactions.

The second measure can be computed on a per-advertiser, per-content item, per-advertising campaign, per-ad group, or per-keyword basis. The measures of assisted conversions can also be computed for other attributes of an advertising campaign (e.g., a per-product basis).

In some implementations, data that cause presentation of the first measure and/or the second measure are provided to a user. For example, data that cause presentation of a last click analysis for an advertising campaign and/or a path length analysis for conversion paths of conversions that were included in the last click analysis can be provided. The data can be provided, for example, to a user device that processes the data and, in turn, displays measures of user interactions to the user. The measures of user interactions can be presented to the user, for example, in the form of a graph, chart, table, or spread sheet. The data can be presented as part of a webpage, or exported as a file (e.g., a text file, word processing file, spread sheet, or database file).

Figure 8B:
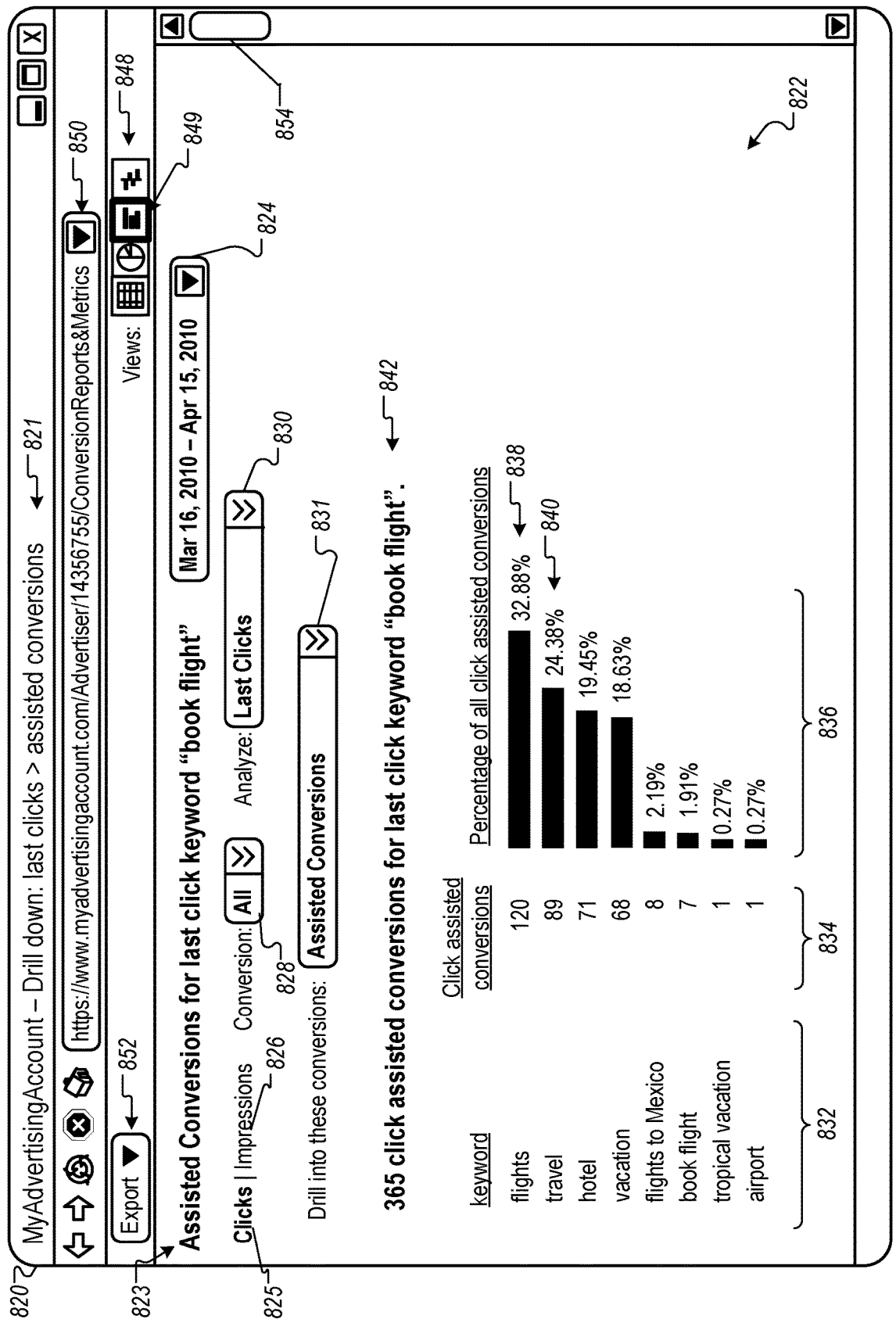
FIG. 8B is a screen shot of an example user interface for providing drilled down conversion path performance measures.

FIG. 8B shows a screen shot of an example user interface 820 for providing measures of user interactions. The user interface 820 can be presented in a browser that displays web pages and other resources from various websites, (such as the websites 104 of FIG. 1). The user interface 820 includes a header 821 for indicating information that is displayed in the user interface 820. In this example, the header 821 indicates that information associated with a web page titled "MyAdvertisingAccount" is being presented and that the presented information more specifically relates to a drill down analysis starting with a last clicks analysis that is drilled down to an assisted conversions analysis. This can indicate that the information displayed in the user interface 820 includes an analysis of one or more assisted conversions measures for conversion paths having last clicks associated with an indicated keyword, ad campaign, ad group, or content item.

The user interface 820 includes a report area 822 for presenting information relating to conversion path performance measures and several selection controls to allow a user to specify parameters for the conversion path performance measures. The report area 822 can be, for example, a webpage received from a web server through the Internet.

The user interface 820 includes an address bar 850 that displays a URL for the report area 822. In some implementations, the user can access the report area 822 by entering the URL into the address bar 850. The browser further includes a scroll bar 854 to allow the user to scroll through content presented on the report area 822.

The report area 822 includes a page title 823 indicating that the information included on the report area 822 relates to assisted conversions for conversion paths having a last click keyword "book flight." In other words, the assisted conversion information presented on the report area 822 relates only to conversion paths where the keyword "book flight" caused a last clicked content item to be presented. The information can be presented in the report area 822, for example, in response to a user request for conversion paths having a last keyword "book flight."

The report area 822 further includes a date range selection control 824 to allow the user to specify a date range for conversion path performance measures to be presented on the report area 822. The date range specified in the date range selection control 824 can limit information presented on the report area 822 to information relating to conversions that occurred within the specified date range, information relating to conversion cycles where the entire conversion cycle occurred during the specified date range, or information relating to conversion cycles where any portion of the conversion cycle occurred during the specified date range. For example, information relating to a conversion cycle where a first assist impression occurred during the specified date range can be included in the information presented on the report area 822.

The report area 822 includes links 825 and 826 that enable the user to select a type of assisted conversion information to present. In the example shown, selecting the link 825 causes information relating to click assisted conversions to be presented. Selecting the link 826 causes information relating to impression assisted conversions to be presented. In the example shown, the link 825 is bold to indicate that the link 825 is currently selected and that information presented on the report area 822 is related to click assisted conversions. In some implementations, the report area 822 includes a link that allows the user to view information relating to both click assisted conversions and impression assisted conversions (i.e., all assisted conversions).

The report area 822 includes a conversion type selection control 828 that enables the user to indicate one or more types of conversions to for which to present related information. In the example shown, the conversion type selection control 828 indicates that information relating to all types of conversions is presented on the report area 822. In some implementations, conversions can be divided into different types. As described above, user actions that can be identified as different conversion types can include, signing up for a mailing list, making a purchase, creating a user profile, making a reservation, watching a video, listening to an audio file, downloading one or more files, installing one or more programs, or providing information. In some implementations, the conversion type selection control 828 can be a drop down menu having user selectable options.

The report area 822 includes an analysis type selection control 830 that enables the user to select from among multiple types of initial conversion path performance measure analyses. In the example shown, the analysis type selection control 830 indicates an initial analysis type of "last clicks" is selected. Other types of conversion path performance measures can include time lag measures, path length measures, user interaction path measures, assisted conversion measures, first click measures, and assist user interaction measures. In some implementations, the analysis type selection control 830 can be a drop down menu having user selectable options.

The page includes a drill down analysis type control 831. The drill down analysis type control 831 allows the user to select a secondary or "drill down" analysis type for information displayed on the report area 822. The analysis type selection control 830 indication of "last clicks" indicates that an initial last click analysis is performed for a set of keywords (or ad campaigns, advertisers, ad groups, content items, etc.). A keyword from the set of keywords is then indicated (e.g., by being selected by the user or entered into a text field in a previous view of the user interface 820 or a previously presented user interface). The user then indicates a secondary analysis type of "assisted conversions" using the drill down analysis type control 831. This indicates that the user is requesting an analysis of assisted conversions for conversion paths for which the last clicked content item was presented in response to a match for the indicated keyword (the indicated keyword in this example being "book flight."). Allowing the user to specify a secondary analysis can allow the user to readily view information relating to keywords (or ad campaigns, ad groups, etc.) that have assisted conversions where the last click in the conversion is associated with the keyword "book flight." This can assist the user in identifying one or more keywords that work well in conjunction with other keywords.

As mentioned above, the report area 822 includes conversion path performance measures as specified by the user using the selection controls and links of the report area 822. In the example shown, the report area 822 includes information relating to click assisted conversions associated with all conversion types for a date range of Mar. 16, 2010 to Apr. 15, 2010 for conversion paths for which the last clicked content item was presented in response to a match for the keyword "book flight." The information presented on the report area 822 includes a list of keywords 832. The list of keywords 832 can be, for example, keywords that caused advertisements to be presented as part of conversion paths for which the last clicked content items for the conversion paths were presented in response to a keyword of "book flight" and the presented advertisements were subsequently selected by a user.

In the example shown, the report area 822 presents click assisted conversion statistics relating to each of the keywords 832. In some implementations, in place of or in addition to the list of keywords 832, the report area 822 can include a list ad campaigns (e.g., the list of ad campaigns 732 shown in FIG. 6B) or ad groups associated with an advertiser and show click assisted conversion statistics for each listed ad campaign or ad group. In some implementations, the report area 822 can include a list of advertisements associated with an advertiser or ad campaign and show click assisted conversion statistics for each listed advertisement. In some implementations, the report area 822 can include a selection control that enables the user to select a category of information for which to present statistics (e.g., keywords, advertisements, ad campaigns, ad groups, or products).

The report area 822 further includes a list of click assisted conversion totals 834 indicating a total quantity of click assisted conversions associated with each keyword 832 for the date range specified in the date range selection control 824 for conversion paths having the keyword of "book flight" associated with the last clicks for the conversion paths. The displayed information can allow the user to readily identify keywords that assist the last click keyword of "book flight." For example, the click assisted conversion totals indicate that a keyword "flights" is associated with 120 click assisted conversions for conversion paths having the last click keyword of "book flight." Similarly, a keyword "vacation" is associated with 68 click assisted conversions for conversion paths having the last click keyword of "book flight."

These values may be different from general assisted conversion measures for all conversion paths. For example, the keyword "vacation" may assist more conversions than the keyword "flights" for all conversion paths, while the information displayed in the example indicates that the keyword "flights" assists more conversions than the keyword "vacation" for the subset of conversion paths having the last click keyword "book flight." In some implementations, selecting the link 826 causes the list of click assisted conversion totals 834 to be replaced by a list of impression assisted conversion totals for conversion paths having the last click keyword "book flight."

The report area 822 includes a bar graph 836 that indicates click assisted conversion percentages for each of the keywords 832 in relation to the total quantity of click assisted conversions for the subset of conversion paths having the last click keyword "book flight." The bar graph 836 visually indicates the percentage of click assisted conversions attributed to each keyword 832 in relation to the total quantity of click assisted conversions for the subset of conversion paths that enables the user to readily visually inspect the totals and identify the relative contributions of each keyword 832 from a click assisted conversion perspective for the subset of conversion paths. For example, the user can readily identify that the keywords "flights," "travel," "hotel" and "vacation" are associated with significantly more click assisted conversions for the subset of conversion paths than the remaining keywords 832 since the bars associated with the keywords "flights," "travel," "hotel" and "vacation" are significantly longer than the bars associated with the remaining keywords 832. This information can assist the user identifying the most successful keywords 832 for use in on-going and future advertising strategies. In some implementations, selecting the link 826 causes the bar graph 836 to present impression assisted conversion percentage information. In some implementations, selecting a link for all assisted conversions causes bar graph 836 to present percentage information for all assisted conversions for the subset of conversion paths.

In some implementations, additional conversion path performance measures can be presented on the report area 822. For example, the report area 822 includes text 842 indicating that the total quantity of click assisted conversions for conversion paths having a last click keyword of "book flight" over the specified date range is 365 click assisted conversions. As another example, the user can use the drill down analysis type control 831 to select a different secondary analysis type, such as, assist user interactions, time lag, top paths, first clicks or path length analyses. As another example, the user can indicate a different initial analysis type using the analysis type selection control 830 and drill down into the newly indicated analysis type using the drill down analysis type control 831.

In some implementations, the assisted conversion measures can be presented in additional or alternative formats. For example, a pie graph similar to that shown in FIG. 3C can be presented showing the percentage of total click assisted conversions for each keyword 832. As another example, a line graph showing the total quantity of click assisted conversions or impression assisted conversions for unique time periods (e.g., days or hours) over the course of the specified date range can be included on the report area 822. As another example, the report area 822 can include a table listing conversion path performance measures.

The report area 822 includes a display type selection control 848 that enables the user to select one or more formats for presenting conversion path performance measures on the report area 822. In the example shown, a selection control 849 is selected. The selection control 849 is used to select a bar graph format for presentation of some or all of the conversion path performance measures presented on the report area 822. In the example shown, the display type selection control 848 additionally includes options for table, pie chart, and relative comparison chart formats.

Figure 9A:
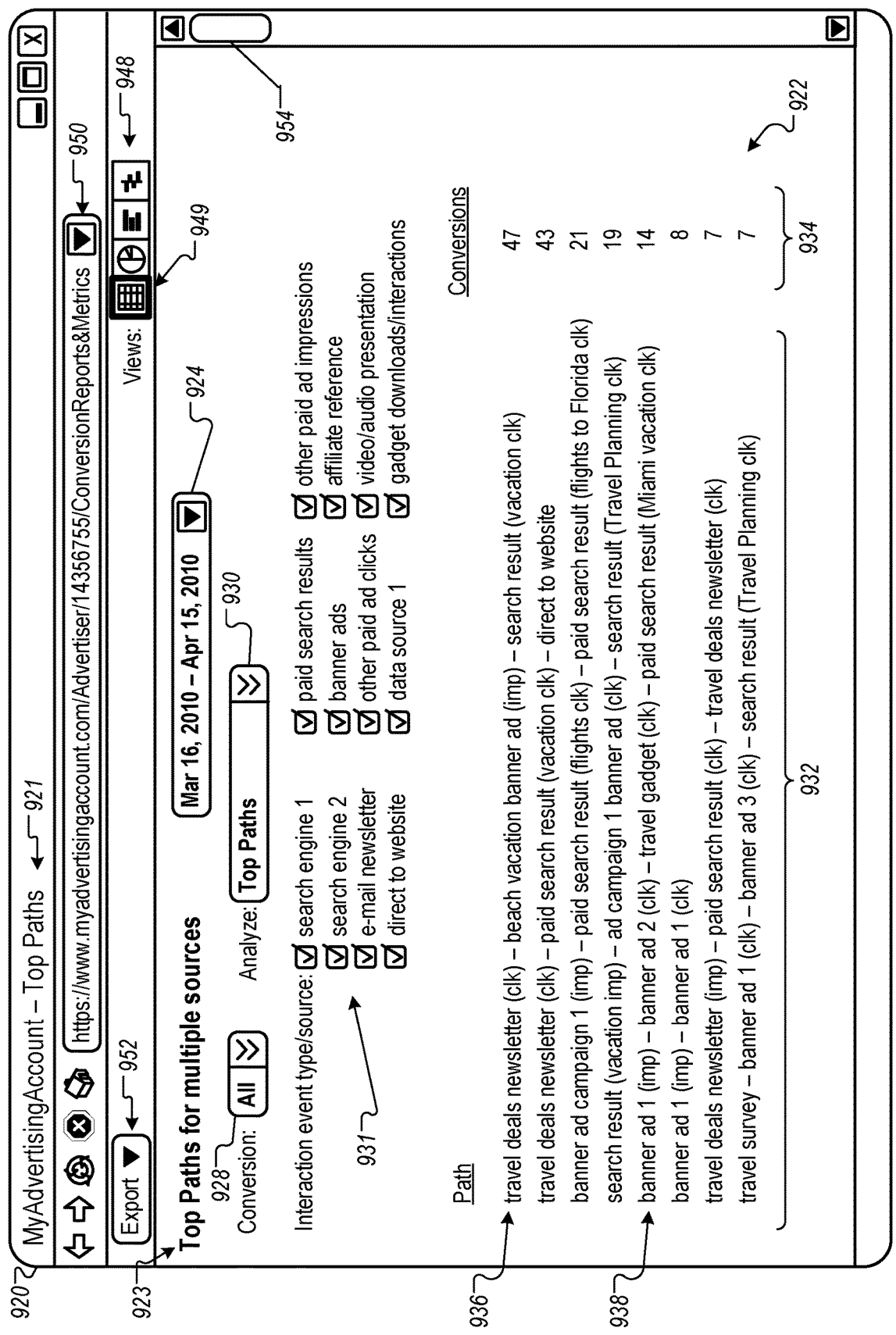
FIG. 9A is a screen shot of an example user interface for providing conversion path performance measures derived from multiple sources of user interactions.

The report area 822 includes an export control 852 that allows the user to export some or all of the assisted conversion measures displayed on the report area 822. In some implementations, the export control 852 allows the user to specify an export format. For example, the user can export the measures as a spread sheet file. As another example, the user can export the measures in a word processing document Multi-Channel Measures FIG. 9A is an example of a user interface 920 for providing conversion path performance measures that are computed from multiple sources of user interaction data. The user interface 920 can be, for example, presented by a user device executing a browser that is used to display web pages and other resources (such as the websites 104 of FIG. 1). Conversion path performance measures that can be provided by the user interface 920 include time lag measures, path length measures, top path analysis, assist user interaction measures, assisted conversion measures, last click measures, first click measures, and any other previously described measure or analysis as well as additional performance measures.

The user interaction data used to create the conversion path performance measures displayed by the user interface 920 can be drawn from multiple sources of user interaction data. Each of the multiple sources of user interaction data can provide, for example, user interaction data that describes user interactions with different types of content. For example, one of the sources of user interaction data can be an advertisement management system (or a data store associated therewith) that obtains data representing user interactions with advertisements that are presented with search results, where the advertisements are presented with the search results in response to targeting keywords for the advertisements being matched. Similarly, one of the sources of user interaction data can be a same or different advertisement management system that obtains data representing user interactions with advertisements that are presented on web pages that are provided by content publishers. Still another source of user interaction data can be an analytics apparatus that tracks user interactions with web pages that are provided, for example, by an advertiser. The sources of user interaction data can include one or more search engines, advertisement distribution systems, e-mail distribution systems, other content distribution systems (e.g., streaming video distribution systems), content performance tracking systems, advertisers, and advertiser affiliates.

The user interaction data can include, for example, information relating to interactions (e.g., impressions, clicks, and other information submission) associated with search results for one or more search engines, paid search results associated with one or more search engines, e-mails (e.g., e-mail newsletters), banner ads, other paid advertisements, advertiser affiliates (e.g., special offers for related products/services), video content, audio content, or web pages associated with an advertiser (e.g., pages of the advertiser's website).

The user interaction data can also include resource performance data that specify one or more user interactions with a resource, such as interactions with a web page, a widget (i.e., an interactive application that is provided with a web page), or another online resource. The resource for which the resource performance data are specified is referred to below as a measured resource. The resource performance data can be, for example, web page (or web site) performance analytic information that can provide information specifying referring pages (i.e., web page from which visitors navigated to the measured resource), destination pages (i.e., web pages to which visitors navigated following presentation of the measured resource). The resource performance data can also include data specifying user interactions with a resource over a specified period (e.g., a specified time, or a specified quantity of interactions, as well as types of interactions that occurred (i.e., selections of content, downloads, data that was input).

The user interaction data can be analyzed to identify conversion paths involving user interactions with some or all of the above mentioned forms of content. For example, a user can receive an e-mail newsletter and click on a link in the e-mail newsletter to be taken to an advertiser's website. A banner ad for the advertiser is later presented to the user, followed by a portion of a streaming video associated with the advertiser being presented to the user. The user can then enter a search query and be presented with a paid search result for the advertiser. The user selects the paid search result and subsequently performs an action that constitutes a conversion (e.g., makes a purchase). The conversion path for the conversion in this example includes an assist click associated with the e-mail newsletter, an assist impression associated with the banner ad, an assist impression associated with the streaming video, and a last click associated with the paid search result.

As another example, an identified conversion path can include an assist impression associated with a special offer presented by an advertiser affiliate, an assist click associated with a banner ad, an assist impression associated with a streaming audio file, an assist click associated with an organic search result (i.e., a non-paid search result) for a first search engine, and a last click associated with a paid search result for a second search engine. In some implementations, conversion path performance measures are calculated using the identified conversion paths involving user interactions with content items from each of the multiple sources. For example, keywords associated with each user interaction can be identified and a quantity of assist clicks and assist impressions (collectively "assist user interactions") associated with each keyword can be computed. In other implementations, the conversion path performance measures can be computed using conversions paths for a set of user interactions with content items from a subset of the multiple sources that are available (i.e., using at least one source fewer than the total quantity of available sources).

As described above, information associated with user interactions with a web page can be identified using collected analytics data. When a user accesses a web page, or another resource, from a referring web page (or other resource), the referring web page (or other resource) for that interaction can be identified, for example, by a snippet of code that is associated with the web page that is being accessed and/or based on a URL that is associated with the link that was selected. For example, a user can access an advertiser's website by selecting a link presented on a web page, for example, as part of a promotional offer by an affiliate of the advertiser. This link can be associated with a URL that includes data (i.e., text) that uniquely identifies the resource from which the use is navigating. For example, the link http://www.example.com/homepage/%affiliate_identifier%promotion_1 can specify that the user navigated to the example.com web page from a web page of the affiliate that is associated with the affiliate identifier quantity that is specified in the URL, and that the user was directed to the example.com web page based on a selection of the link that is included in the promotional offer that is associated with promotion_1. The user interaction data for this interaction (i.e., the selection of the link) can be stored in a database and used, as described below, to compute conversion path performance measures.

As another example, a search results page can be identified as a referring resource that referred a user to the measured web page, for example, by selection of an organic or paid search result. In addition to identifying the search engine (or search provider) that referred the user to the measured web page, information, such as one or more search terms that were used to generate the search results page that referred the user to the measured web page can be specified, as well as information regarding whether the referral was from an organic search result, a paid search result, or a paid advertisement that was presented with the search results page. As described above, the URL that is used to refer the user to the measured web page can include the information described above, as well as additional information.

In some implementations, pages of an advertiser's website can include tracking code for collecting analytics data. For example, tracking code can be added to pages of the advertiser's website to track resources that referred users to the website. The tracking code can also be used to track user interactions among multiple web pages within a measured website. For example, the tracking code can log each user interaction with the web pages and timestamp each user interaction. The tracking data collected by the tracking code can be logged (i.e., saved to a data store) and used to identify assist impressions and other user interactions (assist clicks, last clicks, interaction paths, etc.) associated with the measured website.

In some implementations, cookies can be used to track user interactions. For example, a cookie can be used to identify and track when content items are requested by a user and user interactions with the content items (e.g., presentations and/or selections of a content item, content downloads, or information submissions). In some implementations, multiple cookies can be used to track user interactions with content items provided by different content distributors and/or to track different types of user interactions.

For example, a first cookie is used to track user interactions with search results provided by a first search engine while a second cookie is used to track user interactions with search results provided by a second search engine. As another example, a first cookie is used to track user interactions with streaming video files while a second cookie is used to track user interactions with banner ads displayed on web pages and a third cookie is used to track user interactions with e-mails. The information collected using the cookies can be combined to identify conversion paths and compute conversion path performance measures. In some implementations, the information collected using cookies is combined with other user interaction data and used to identify conversion paths and compute conversion path performance measures.

In some implementations, collected user interaction data are associated with one or more user identifiers and/or one or more conversion identifiers. For example, user interaction data relating to a first conversion is associated with a first user identifier and/or a first conversion identifier, and data relating to a second conversion is associated with a second user identifier and/or a second conversion identifier. Each user identifier uniquely represents a converting user for a conversion, while each conversion identifier uniquely identifies each conversion. For example, when a conversion is an online purchase of a baseball glove, a user identifier for the user device and/or browser that were used to purchase the baseball glove is identified, for example, from a cookie that is stored on the user device. As another example, a user identifier for a user device that was used to sign up for a mailing list on a concert website can be identified. As described above, the user identifier can be a cookie obtained from the user device that was used to complete the conversion a hash of a user name, a randomly assigned user ID code, or another anonymized user identifier.

In some implementations, user interaction data are associated with a user by being stored with a user identifier that represents the converting user and/or by being indexed according to the user identifier. In some implementations, user interaction data are indexed according to conversion identifiers for conversions with which the user interaction data are associated. For example, each conversion can be associated with a unique conversion identifier, and user interaction data associated with the conversion path for a conversion is indexed according to the conversion identifier for the conversion.

Still referring to FIG. 9, the user interface 920 includes a header 921 for indicating information that is displayed in the user interface 920. In this example, the header 921 indicates that information associated with a website titled "MyAdvertisingAccount" is being presented and that the presented information more specifically relates to a top path analysis for an advertiser. The user interface 920 includes a report area 922 for presenting information relating to conversion path performance measures and several selection controls that enable a user to specify parameters for the conversion path performance measures. The report area 922 can be, for example, a webpage received from a web server through the Internet.

The user interface 920 includes an address bar 950 that displays a URL for the report area 922. In some implementations, the user can request presentation of a performance report in the report area 922 by entering the URL for a requested report into the address bar 950. The user interface 920 further includes a scroll bar 954 that enables the user to scroll through content presented on the report area 922.

The report area 922 includes a page title 923 indicating that the information included on the report area 922 relates to a top path analysis of user interaction data obtained from multiple sources. For example, top conversion paths identified using user interaction data associated with multiple content item distribution sources can be displayed parting a portion of the report area 922. The user interaction data can include user interactions with search results (both paid and unpaid), advertisements, e-mails, streaming video or audio content, or special offers presented by affiliates. The user interactions can involve content items provided by multiple content item providers.

The report area 922 includes a conversion type selection control 928 that enables the user to indicate one or more types of conversions to for which to present related information. In the example shown, the conversion type selection control 928 indicates that information relating to all types of conversions is presented on the report area 922. In some implementations, conversions can be divided into different types. As described above, user actions that can be identified as different conversion types can include, signing up for a mailing list, making a purchase, creating a user profile, making a reservation, being presented with a video, being presented with an audio file, downloading one or more files, installing one or more programs, or providing information. In some implementations, the conversion type selection control 928 can be a drop down menu having user selectable options.

The report area 922 includes an analysis type selection control 930 that enables the user to select from among multiple types of conversion path performance analyses. In the example shown, the analysis type selection control 930 indicates an analysis type of "top paths" is selected. Other types of conversion path performance measures can include time lag measures, path length measures, user interaction path measures, assisted conversion measures, first click measures, last click measures, and assist user interaction measures as well as other performance measures. In some implementations, the analysis type selection control 930 can be a drop down menu having user selectable options.

The report area 922 includes interaction event type selection controls 931 that enable the user to select one or more types of user interaction event types (and/or sources of user interaction data with which to generate conversion paths and/or compute conversion path performance measures. The interaction event type selection controls 931 include options for selecting multiple search engines as sources of user interaction data (search engine 1 and search engine 2). In some implementations, the user interaction data collected for the search engines includes organic search results (i.e., non-paid search results). In some implementations, the user interaction data collected for the search engines includes both paid and non-paid search results, which can be tracked as described above. In some implementations, user interaction data collected for the search engines includes data for user interactions with advertisements displayed with search results and are tracked, for example, by the advertisement management system. The interaction event type selection controls 931 further include an option for selecting e-mail newsletter interactions as a source of user interaction data. E-mail user interactions can include providing of e-mails to users (i.e., impressions) and selection of hyperlinked content provided in an e-mail.

The interaction event type selection controls 931 further include an option for selecting direct to website user interaction data. Direct to website user interactions can include a user entering a URL for an advertiser website into an address bar of a web browser in order to be directed to the website, or a user selecting a bookmark using a web browser in order to be directed to the web site.

The interaction event type selection controls 931 further include an option for selecting user interactions with paid search results as a source of user interaction data. Paid search result user interactions can include, for example, presentation of paid search results to a user or selection of paid search results by a user. In some implementations, the user of the user interface 920 is allowed to select from among several search engines for which paid search results user interaction data are to be used for computing conversion path performance measures.

The interaction event type selection controls 931 further include an option for selecting user interactions with banner ads to be included as a source of user interaction data. Banner ads can include, for example, ads that are presented on non-search related websites. User interaction data for banner ads can be collected, as described above, using tracking code embedded in the banner ads (e.g., a single pixel tracking identifier).

The interaction event type selection controls 931 further includes options for selecting other paid ad clicks and other paid ad impressions as sources of user interaction data. These forms of user interactions can include all user interactions with ads not included in other categories displayed as part of the user interface 920.

The interaction event type selection controls 931 further include an option for selecting affiliate reference user interactions as a source of user interaction data. For example, a user can reserve a hotel room using a hotel room reservation web site. The hotel room reservation website can be an affiliate of a car rental website and present a special promotional offer for a discount on car rentals with the car rental web site to the user after the user has made the hotel room reservation. The user selects the promotional offer, but does not immediately sign up for a car rental. However, the user later returns to the car rental website and reserves a car (i.e., a conversion occurs). The selection of the promotional offer on the affiliated hotel room reservation website can be identified as an assist click for the conversion (i.e., the car rental).

The interaction event type selection controls 931 further include an option for selecting video and audio presentation as a source of user interaction data. Video presentation can include, for example, presentation of a video relating to a product sold by an advertiser that is presented by a streaming video website. Audio presentation can include, for example, a presentation to a user of an audio clip about one or more products offered by an advertiser. The audio clip can be presented, for example, as part of an Internet radio broadcast. The interaction event type selection controls 931 further include options for selecting gadget downloads and interactions as a source of user interaction data. A gadget can be a user interface that is presented, for example, as part of a webpage, as a stand-alone application, or in a pop-up window. The gadget can provide information and receive user information.

In some implementations, the interaction event type selection controls 931 can include additional controls for selecting other types of content distributors (e.g., data source 1 as shown in FIG. 9) that distribute content associated with one or more advertisers as sources of user interaction data. The interaction event/source options that have been discussed are provided for purposes of example, and other options can be provided.

As mentioned above, the report area 922 includes conversion path performance measures as specified by the user using the selection controls and links of the report area 922. In the example shown, the report area 922 includes information relating to top paths associated with all conversion types for a date range of Mar. 16, 2010 to Apr. 15, 2010. The information presented on the report area 922 includes a list of conversion paths 932. The conversion paths 932 include user interactions for all user interaction types indicated by the interaction event type selection controls 931. The report area 922 further includes a list of conversion totals 934 indicating a total quantity of conversions associated with each conversion path for the indicated date range. For example, the list of conversion totals 934 indicates that a conversion path 936 is associated with 47 conversions for the indicated date range.

In the example shown, the conversion path 936 includes user interactions with a travel deals newsletter, a beach vacation banner ad, and a search result. The report area 922 indicates that the user interaction with the travel deals newsletter is a click (i.e., an assist click) and that the user interaction with the beach vacation banner ad is an impression (i.e., an assist impression). The report area 922 further indicates that the search result is a search result for a search term of "vacation" and that the user interaction with the search result is a click (i.e., a last click).

A conversion path 938 displayed as part of the list of conversion paths 932 includes user interactions with first and second banner ads, a travel gadget, and a paid search result. The report area 922 indicates that the user interaction with the first banner ad is an impression (i.e., an assist impression) and that the user interaction with the second banner ad is a selection (i.e., an assist click). The report area 922 further indicates that the user interaction with the travel gadget is a selection (i.e., an assist click). The travel gadget can be a user interface that is presented, for example, as part of a webpage, as a stand-alone application, or in a pop-up window. The travel gadget can provide information and receive user information. For example, the travel gadget can provide real time or near real time information on current travel specials. As another example, the travel gadget can allow a user to input information (such as a destination city, originating city, or preferred time range for a trip) in order to provide customized offers or other information for the user. In some implementations, entering of data into the travel gadget can be identified as a selection of the travel gadget (e.g., an assist click or last click).

Still referring to the conversion path 938, the paid search result is indicated as being associated with a targeting keyword of "Miami vacation." For example, a match for the keyword "Miami vacation" caused the paid search result to be presented. The paid search result is additionally indicated as being associated with a last click prior to a conversion.

In some implementations, other conversion path performance measures can be presented by the user interface 920. Other conversion path performance measures can include time lag measures, path length measures, assist user interaction measures, assisted conversion measures, last click measures, first click measures, and other previously described measures or analyses among others.

The report area 922 includes a display type selection control 948 that enables the user to select one or more formats for presenting conversion path performance measures on the report area 922. In the example shown, a selection control 949 is selected. The selection control 949 is used to select a table format for presentation of some or all of the conversion path performance measures presented on the report area 922. In the example shown, the display type selection control 948 additionally includes options for pie chart, bar graph, and relative comparison chart formats.

The report area 922 includes an export control 952 that enables the user to export some or all of the assisted conversion measures displayed on the report area 922 as well as other data that are not presented (e.g., user interaction data and/or other computed performance measures). In some implementations, the export control 952 allows the user to specify an export format. For example, the user can export the measures as a spreadsheet file. As another example, the user can export the measures in a word processing document format, a chart, a portable document format, an image, or other document formats.

Figure 9B:
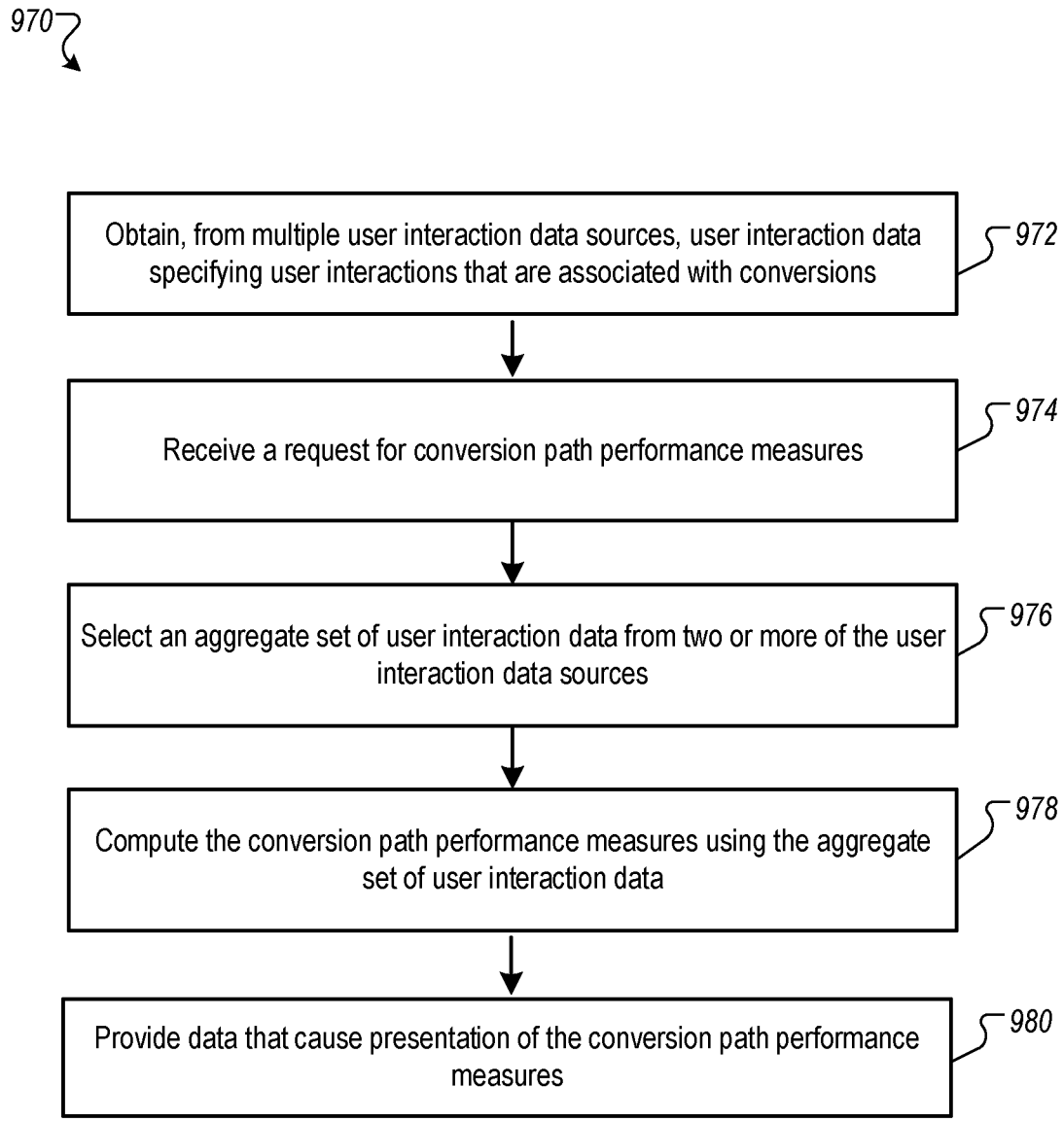
FIG. 9B is a flow chart of an example process for computing conversion path performance measures using user interaction data from multiple different sources.

FIG. 9B is a flow chart of an example process 970 for computing conversion path performance measures using user interaction data from multiple different sources. The process 970 is a process by which user interaction data are obtained from at least two different user interaction data sources, where the user interaction data specify user interactions that are associated with conversions. Using the user interaction data from at least two of the different sources, conversion path performance measures are computed and data that cause presentation of the conversion path performance measures are provided to a user device.

User interaction data are obtained from multiple data sources (972). The user interaction data that are obtained from each of the data sources represent user interactions that are associated with a conversion. As described above, user interactions that are performed by a converting user for a conversion and during a conversion cycle for the conversion can be associated with a conversion, for example, by being stored with a reference to the conversion (e.g., a conversion identifier) and/or being indexed according to the conversion (e.g., indexed to the conversion identifier).

The user interaction data from each of the data sources can specify different types of use interactions. For example, one of the data sources can be a search system that tracks user interactions with search results that are provided in response to a search query. Another data source can be an advertisement management system that tracks user interactions with advertisements that are provided with search results, as described above. Other data sources can include an analytics apparatus that tracks user interactions with web pages (and components thereof) that are provided, for example, by (or for) an advertiser and/or an advertisement management system that tracks user interactions with image advertisements (or other advertisements) for an advertiser, where the image advertisements are presented, for example, with web pages provided by a third party content provider.

The user interaction data from at least one of the user interaction data sources can specify, for a conversion, a set of user interactions with content items that are associated with one or more targeting keywords. As described in detail above, the targeting keywords are keywords that control distribution of the content items, for example, with search result pages that are provided in response to search queries that are received from user devices. For example, an advertisement management system can track user interactions with advertisements that are presented with search results pages and store user interaction data representing the user interactions in a data store.

In some implementations, the user interaction data from at least one other user interaction data source specifies, for a conversion, a set of user interactions with a web page that is provided by a content provider for which distribution of content items is controlled using the targeting keywords described above. For example, as described above, an analytics apparatus can track user interactions (e.g., page views, widget interactions, and other interactions) that occur with a web page that is provided by an advertiser. For example, following presentation of an advertisement on a search results page a user may navigate directly to the advertiser's web page of first visit another web page prior to entering a URL for the advertiser's web page into the user's browser. An analytics apparatus can identify, as a referring resource (i.e., a referring web page) the web page from which the user navigated, or that the user directly entered the URL, and also track subsequent user interactions with the advertiser's web page. When a user converts (i.e., performs an interaction that constitutes a conversion, the analytics apparatus can associate a conversion identifier with the user interaction data for the converting user.

Other user interactions can be tracked by other apparatus, such that user interaction data representing these user interactions is available. For example, a content item that is provided directly on or with a web page (or another network resource) of a third party can include a script that upon presentation and/or selection of the content item cause data to be sent to an apparatus that tracks user interactions with that content item.

A request for conversion path performance measures is received (974). In some implementations, the request for conversion path performance measures can include data specifying two or more types of user interaction event types for which conversion path performance measures are to be computed. For example, as described above, a user can select, from a user interface, multiple types of user interactions for which the conversion path performance measures are to be computed. In some implementations, at least two of the different types of user interactions are represented by user interaction data from two or more different sources of user interaction data. For example, if the request for conversion path performance measures specifies that the measures are to be computed using user interactions with search results and user interactions with advertisements provided with search results pages, user interaction data from a search system and user interaction data from an advertisement management system may be used to compute the conversion path performance measures.

The user interface from which the types of user interactions are selected can be presented by a user device, for example, using data that causes presentation of the user interface. In some implementations, the data cause presentation of event type selection controls in the user interface, where the event type selection controls enable a user to select one or more types of user interaction event types for which conversion path performance measures are to be computed.

An aggregate set of user interaction data are selected from two or more of the user interaction data sources (976). In some implementations, the two or more sources are sources that provide user interaction data for the selected user interaction event types that were selected from the user interface.

The conversion path performance measures are computed using the aggregate set of user interaction data (978). The conversion path performance measures that are computed can include, for example, at least one a top paths measure, a path length measure, an assisted conversion measure, an assist interaction measure, and other measures that are described above. The conversion path performance measures can be computed, for example, using the user interaction data from each of the different sources. For example, a top paths measure can include each user interaction represented by user interaction data and specify a temporal order in which each of the user interactions occurred, irrespective of the sources from which the user interaction data was obtained.

Data that cause presentation of the conversion path performance measures are provided (980). In some implementations, the data cause presentation of a user interface in which the conversion path performance measures are presented. In other implementations, the data can be in a word processing format, a spreadsheet format, or another format that can be processed by an application on the user device to cause presentation of the conversion path performance measures. Presentation of conversion path performance measures is described in more detail above.

Processing Pipeline
Overview of the Backend System and Underlying Data Storage Model As described above, the performance analysis apparatus 120 can include a front end component and a backend data processing pipeline ("backend pipeline") that facilitate computation and presentation of conversion path performance measures. The backend pipeline is responsible for gathering raw user interaction data, also referred to as event data, from various information sources (e.g., event logs for impressions, clicks, and conversions, and corresponding spam logs) and processing and converting raw user interaction data (i.e., initial user interaction data) into performance measures that are relevant and meaningful to an advertiser user.

Due to the constant growth and the immensity of the user interaction data for prior user interactions (also referred to as user interaction events), the backend pipeline can prepare (i.e., process and/or format) the data in a format and store the data in a suitable data storage model that avoids unnecessary duplication of the data, allows easy update with new data, and facilitates fast and efficient generation of the desired measures based on the data.

Figure 10A:
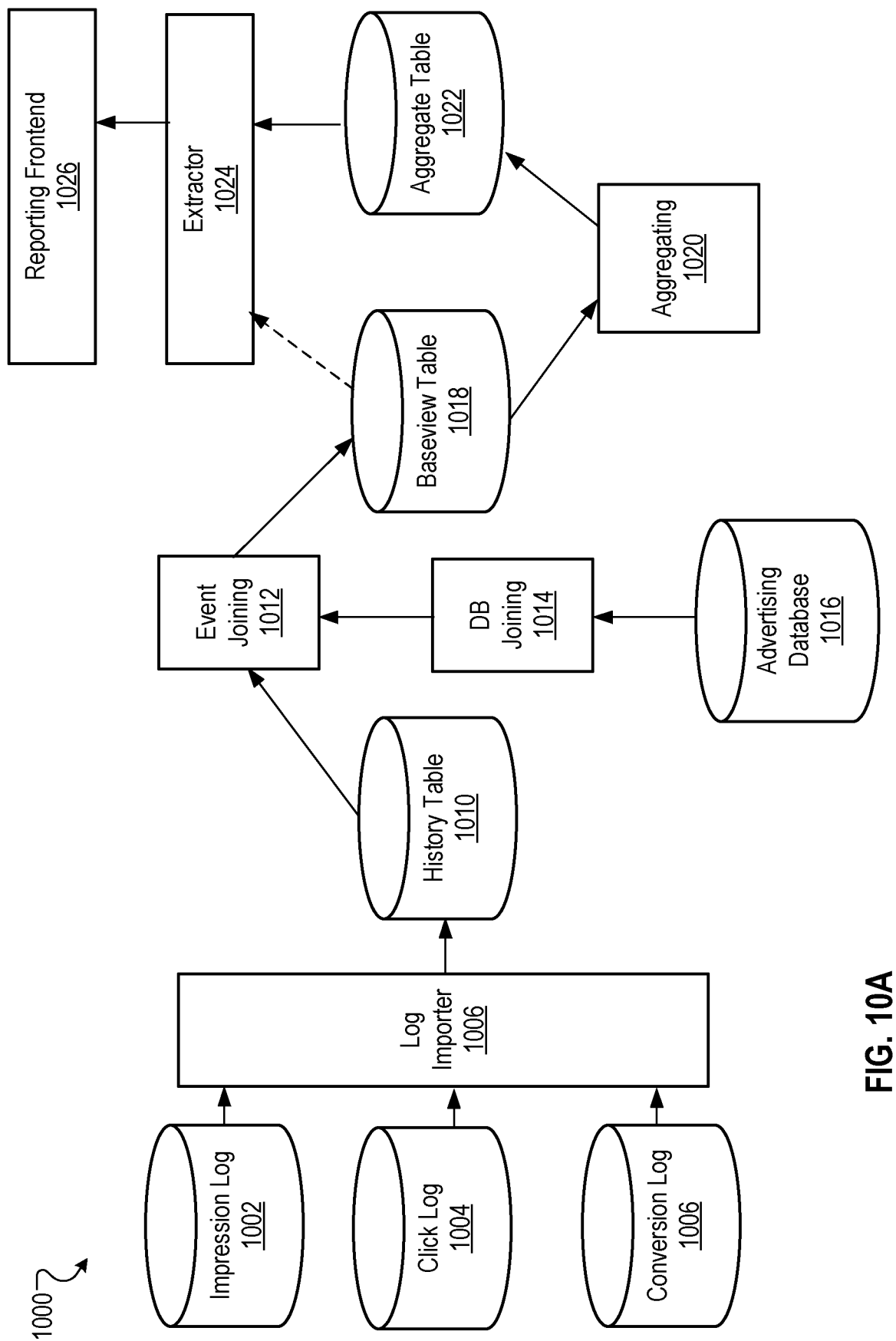
FIG. 10A is a block chart of an example data processing pipeline for providing conversion performance reports.

FIG. 10A is a diagram of an example data processing pipeline 1000 for providing the conversion performance reports. In some implementations, the backend pipeline of the performance analysis apparatus can be implemented using the data processing pipeline 1000. The example data processing pipeline 1000 can be used, for example, to obtain data from various sources, process the data, and analyze the data to generate search conversion performance reports, as described above.

The data processing pipeline 1000 extracts or obtains the raw user interaction data for individual user interaction events from data logs (e.g., impression log 1002, click log 1004, conversion log 1006, etc.) and first organizes the raw user interaction data according to an advertiser-user centered data storage model (e.g., in a history table 1010). Then, the data processing pipeline 1000 extracts the user interaction data that are stored according to the advertiser-user centered data model (e.g., in the history table 1010), and reorganizes the user interaction data according to a conversion centered data storage model (e.g., in a baseview table 1018). By reorganizing the user interaction data into a conversion centered data model (e.g., in the baseview table 1018), all information related to a conversion, such as the user interaction data of all related user interactions (e.g., prior clicks and impressions), can be easily and efficiently extracted and processed for generating various measures in the conversion performance reports.

As an optimization, the raw user interaction data related to each conversion (also referred to as a conversion event) can be enriched with additional information from the advertising database (e.g., an advertising database 1016). For example, values of additional advertising parameters can be added to the baseview table 1018. These advertising parameters can be subsequently used as additional filters to separate out useful subsets of the user interaction data for generating the performance reports of interest to advertisers.

As an additional layer of optimization, data tables (e.g., an aggregate table 1022) including aggregated statistics for specific advertising parameters can be created and update periodically. These aggregated tables can be generated based on an estimate of the kinds of measures and performance reports for which the reports are likely to be requested most frequently and are most time-consuming to generate on the fly. The considerations for usage and latency can be balanced against considerations for storage and additional data processing resources to determine what kinds of pre-aggregation should be performed and stored in the aggregate table.

When the front end reporting system (e.g., a reporting front end 1026 in the performance analysis apparatus 120 of FIG. 1) receives a request for a conversion performance report, the front end system communicates with an extractor interface (e.g., an extractor 1024) which determines whether pre-aggregated data suitable for generating and/or providing the report are available in aggregate tables. If suitable pre-aggregated data are available, the report is generated using the pre-aggregated data. If suitable aggregated data are not already available in the aggregate tables (e.g., the aggregate table 1022), the report can be generated from the user interaction data stored in the conversion centered data model (e.g., the baseview table 1018).

In a system where an immense amount of data are stored and only a much smaller subsection of the data are needed at a time to satisfy a particular information need, storing the data in a manner that facilitates efficient retrieval and processing of selected subsets of the stored data can improve the efficiency of the system. In addition, as the large amount of data are likely distributed among a large number of data servers, a data storage model that enable efficient parallel processing of the distributed data on different data servers can increase quality and speediness of the information service. A distributed data storage model can be implemented to store the user interaction data at different stages of the data processing pipeline 1000. The distributed data storage model allows parallel processing of the data stored on different data servers and efficient joining of the results provided by a distributed collection of data processing apparatus.

An example distributed data storage model can be implemented as a sparse, loosely distributed, persistent multi-dimensional sorted map. The map can be indexed by a row key, a column key, and a timestamp. The values for the row key and the column key can be arbitrary un-interpreted strings. However, a user of the distributed data storage model can create schemas for the row key and/or column keys such that desired data locality can emerge in the distributed data storage model when key values are generated according to the schemas. In some implementations, the distributed data storage model need not be sorted in all dimensions for some applications.

In the example distributed data storage model, as a feature to avoid concurrent updates to the same row, every read or write of data under a single row key is atomic (i.e., the smallest selectable row unit) irrespective of the number of different columns being read or written in the row. This feature also allows dynamic partitioning of the data set at different row key values, and allows parallel processing of the different partitions.

The distributed data storage model also allows storage of multiple versions of the same data in each cell of a data table and these different versions are indexed by timestamp. Although the timestamp values can be actual time values associated with the data, in certain applications, other properties associated with the data can also be used as timestamps to distinguish the different data entities stored in each cell.

In some implementations, the above example distributed data storage model can be used to implement one or more of the history table 1010, the baseview table 1018, and the aggregate table 1022. Other similar distributed data storage model may also be used.

Data Processing Through the Backend System

As illustrated in FIG. 10A, the data processing pipeline 1000 begins at one or more data sources, such as the impression log 1002, the click log 1004, and the conversion log 1006. The impression log 1002 includes raw user interaction data for ad impressions that have been served on publisher properties to consumers. The click log 1004 includes raw user interaction data for user selections that have been performed with respect to advertisements served on publisher properties (e.g., search result pages, web pages, or other content items containing ad slots). The conversion log 1006 includes raw user interaction data for user actions that constitute conversions (e.g., a purchase, a sign-up for service, etc.) as defined by an advertiser following user selection of an advertisements of the advertiser that has been served on a publisher property. Other data logs that are utilized in the data processing pipeline can also include spam versions of the impression, click, and conversion logs (e.g., spam impression log, spam click log, spam conversion log), and logs of other user interactions that may be of interest to the advertiser.

In some instances, the raw user interaction data for user interactions can be added to their corresponding data logs in real-time as the user interactions occur at various consumer, ad server, advertiser, or publisher sites. In other instances, the raw user interaction data for multiple user interactions can be received from intermediate servers and added to the data logs at scheduled intervals. For example, the raw user interaction data for an ad impressions can be recorded in real-time in the impression log 1002 as a download request for an advertisement is received from a client device at which the advertisement will be presented. For another example, reports of ad impressions served can also be received periodically from intermediate ad servers and added to the impression log 1002. As a result, the data logs can continuously grow in size as new raw user interaction data are received and recorded.

In some implementations, as the raw user interaction data for new user interactions are continuously recorded in the data logs, a log importer component 1008 periodically, or at scheduled intervals, scans the data logs to obtain the newly added raw user interaction data. In some implementations, a separate log importer instance can be implemented for each log type (e.g., impression, click, conversion, spam impression, spam click, spam conversion, etc.) to perform the extraction of raw user interaction data from the data log and writing the new data into the history table 1010.

The history table 1010 stores the raw user interaction data grouped by advertiser and user pairs. The history table 1010 can also include columns or column families each corresponding to a respective event type (e.g., click, impression, conversion, spam click, spam impression, spam conversion, etc.). Each cell of the history table 1010 can store the raw user interaction data of multiple user interactions that are associated with the corresponding row key value (e.g., advertiser-user pair) and column key value (e.g., event type) of the cell.

In some implementations, each advertiser can be associated with a unique advertiser identifier, such as an advertising account ID, or other strings or signatures that uniquely identify the advertiser or advertising account. Each user can be associated with a unique user identifier, such as a device identifier, an anonymized IP address, a user account ID, or other strings that uniquely identify each user client device or consumer. In some implementations, user interaction data of user actions that are performed on the client device would be associated with the cookie ID for a cookie issued to the client device, and the cookie ID can be used as the unique user identifier for the user interaction data.

In some implementations, for the raw user interaction data of each user interaction, the log importer 1006 extracts the advertiser identifier and the user identifier associated with the user interaction from, for example, one or more fields of the raw user interaction data. The log importer 1006 then generates a unique string pattern corresponding to the advertiser identifier and user identifier pair. For example, a schema for the row key of the history table 1010 can include a leading string segment corresponding to an advertiser_id followed by a user_id.

In some implementations, if the advertiser identifier and user identifier pair already has a corresponding row in the distributed history table 1010, the raw user interaction data of the user interaction is written to a cell in the row that corresponds to the event type associated with the user interaction (e.g., a click, an impression, a conversion, a spam click, a spam impression, or a spam conversion). If the advertiser identifier and user identifier pair does not already have a corresponding row in the distributed history table 1010, a new row corresponding to this advertiser identifier user identifier pair is created and inserted into the distributed history table 1010. The raw user interaction data of the user interaction is written to a cell in the row that corresponds to the event type associated with the user interaction. Since the distributed history table 1010 are sorted according to its row key values (i.e., advertiser identifier and user identifier pair), raw user interaction data associated with the same advertiser (but different users) can be stored in consecutive rows.

In each cell of the history table 1010, the raw user interaction data for each user interaction is stored with a corresponding timestamp indicating the time at which the user interaction occurred. Therefore, the cell corresponding to an impression event type would include all recorded impressions that have occurred for the advertiser-user pair. Similarly, the cell corresponding to a click event type would include all recorded clicks that have occurred for the advertiser-user pair. Similarly, the cell corresponding to a conversion type (or a subtype of the conversion type) would include all recorded conversions (or the subtype of conversions) that have occurred for the advertiser-user pair.

In some implementations, the raw user interaction data already includes the timing information in one of its fields, and the value in the raw user interaction data can be extracted and converted to a corresponding timestamp value. In some implementations, the timing information for a user interaction needs to be obtained from other sources (e.g., from an ad server or other third party sources) based on an event identifier included the raw user interaction data. The timestamps associated with the user interaction data stored in each cell allow filtering of data within a specified time range (e.g., 30 days from last update, between date x and date y, etc.).

In some implementations, in addition to advertiser identifier, user identifier, and timestamp, the raw user interaction data for each user interaction can include information fields identifying the content item (e.g., the advertisement or creative) presented to and/or selected by the user, the web address for the publisher's property, a last click leading to a conversion, a delivery period for the advertisement, an ad group for the advertisement served, a campaign for the advertisement served, and so on. In some implementations, these information fields are normalized as identifiers to save resources used to store and transmit the information. For example, the raw user interaction data in the data logs and history table 1010 can include only the information in their normalized form.

The history table 1010 includes the raw user interaction data of previously occurred user interactions extracted from the data logs, and grouped by advertiser and user identifier pairs. Periodically or at specified times, an event joining component 1012 queries the history table 1010 to determine whether raw user interaction data of any new conversions have been added since the last query. If a new conversion has been added, the event joining component 1012 creates a new row in the baseview table 1018 for the newly added conversion and stores user interaction data for the new conversion in the newly added row. When building the baseview table 1018 initially, all conversions in the history table can be considered new conversion. In some implementations, only the most recent conversions (e.g., last 30, 60 or 90 days) are identified (e.g., by their timestamps used in this history table 1010) and used to create rows in the baseview table 1018.

The baseview table 1018 stores the raw user interaction data grouped (i.e., indexed) by conversions. Each row of the baseview table 1018 includes the raw user interaction data of all prior user interactions that occurred within a specified time period prior to the conversion and are associated with the same advertiser user pair as the conversion. Because all user interactions associated with the same advertiser-user pair are stored in the same row in the history table 1010, extraction and processing of the data for the advertiser-user pair can be performed independently of the extraction and processing of the data for other advertiser-user pairs. Therefore, parallel processing and scalability of the data storage and processing can be accomplished.

In some implementations, a unique conversion identifier is generated for the conversion and used as the row key value for the conversion in the baseview table 1018. In some implementations, the conversion identifier includes concatenated string segments representing an advertiser identifier, a conversion type identifier, a date of the conversion, and so on. By generating the row key of the baseview table 1018 according to this particular schema, conversions pertaining to the same advertisers can be organized into consecutive rows in the baseview table 1018. Similarly, within the consecutive rows of a particular advertiser, conversions of the same type can be organized into consecutive rows as well. Furthermore, conversions of the same type under the same advertiser are also sorted according to their respective dates of occurrence.

By organizing the rows of the baseview table 1018 in this matter, subsections of the baseview table 1018 pertaining to individual advertisers, conversion types, and/or date ranges can be distributed among a relatively small number of data servers, and can be extracted and processed in parallel by a distributed system of data processing apparatus. Other schema of the conversion identifier can be implemented to suit various data extraction and processing needs.

The baseview table 1018 also includes columns or column families each corresponding to a respective parameter that is associated with the conversion and other user interactions that have occurred within a predetermined time period prior to the conversion. Examples of the parameters can include interaction types such as clicks, impressions, and conversions. In some implementations, conversion type can be subdivided into additional subtypes (e.g., a subtype for purchase, a subtype for sign-up, etc.). For each event type, user interaction data for all user interaction events of that event type and having occurred within the specified time period prior to the conversion are stored with their respective timestamps in the same cell corresponding to the particular interaction type. The user interaction data stored in the same cell can further be sorted by their timestamps.

For example, for a new conversion that is discovered in the history table 1010, a new row is created in the baseview table. The user interaction data representing the clicks stored in the same row as the conversion event and having occurred within a specified time window (e.g., 30 days) prior to the conversion event can be written into a cell corresponding to clicks in the newly created row of the baseview table 1018. The user interaction data representing the clicks are sorted according to their associated timestamps in the cell, and form a time sequence of clicks leading to the conversion event. The data representing each click can include and/or be associated with a reference to the keyword that caused presentation of the clicked content item.

Similarly, data representing impressions that occurred within a specified time window prior to the new conversion event can be written into a cell corresponding to impressions in the new row and form a time sequence of impressions leading to the conversion event. The data representing each impression can include and/or be associated with a reference to the keyword that caused presentation of the content item. Other conversions that occur within a time window of the new conversion can be also written into a cell corresponding to conversions in the new row and form a time sequence of conversions leading to the new conversion event.

By processing each row of the advertiser-user centered data in the history table 1010 and reorganizing the user interaction data in each row into one or more conversion centered rows in the baseview table 1018 (generally, referred to as "pivoting of the data"), additional processing of each row of conversion centered user interaction data can be performed independently and in parallel of other rows of the conversion centered user interaction data. Because the backend serves conversion related measures, the transformations from individual user interaction data to advertiser-user centered data, and then to conversion center data allows fine-grained parallel processing based on individual conversions.

In some implementations, columns or column families corresponding to other parameters associated with the new conversion and other associated user interaction data stored in the same row as the new conversion can be created in the baseview table 1018. Examples of such parameters include ad campaign, ad group, keyword, creative, publisher, publisher property, advertising criteria, and so on. In some implementations, because the raw user interaction data for user interaction events likely only include identifiers for values of these parameters (e.g., a campaign identifier, an ad group identifier, a creative identifier, etc.), the event joining component 1012 can further interface with a database joining component 1014 to map the identifiers to their corresponding data names (e.g., campaign name, ad group name, creative name, etc.).

In some implementations, the database joining component 1014 looks up the data names by their identifiers in the advertising database 1016 which stores the advertiser account and campaign specification information. The database joining component 1014 can supply results of the lookups to the event joining component 1012, which in turn fills the corresponding cells of these parameters with the returned values. Each of these values can also be associated with their corresponding timestamps for the corresponding user interaction event to which the values pertain.

By enriching the data in the baseview table 1018 with the additional parameters, a larger variety of performance measures can be generated based on the parameter values stored in the baseview table 1018. For example, additional filters (e.g., campaign filter, keyword filter, ad group filter, etc.) can be created based on values for one or more of these parameters, and desired subsets of data can be isolated out by their filters for additional processing.

The conversion centered data in the baseview table 1018 can be used to generate conversion performance reports such as those described above. For example, suppose an advertiser is requesting an assist click report for all conversions that occurred during a particular time window. First, all rows associated with the particular advertiser's identifier can be identified from the baseview table 1018 by their respective row key values, provided that the row key schema includes a leading segment corresponding to the advertiser identifier. These rows can be distributed to a number of data processing apparatus for processing. For each row, clicks stored within the row and having timestamps within the specified time window are counted by a corresponding data processing apparatus that has been assigned to process that row. One count for the last click before the conversion can be removed from the total count of clicks to arrive at the assist click count for the conversion. The data processing apparatus processing each row can return the results and the results are aggregated to show the quantity of conversions having various assist click counts associated therewith. For example, the assist clicks report can show that 80,000 conversions have one assist click, 50,000 conversions have two assist clicks, 30,000 conversions have three assist clicks, and so on. Other reports are possible.

Other examples of performance measures include assist interaction measures, path length measures, time lag measures, assisted conversion measures, last click measures, first click measures, top path measures, and other conversion path performance measures. Conversion performance reports for individual advertiser accounts can be delivered to according to schedules or upon advertiser requests. Reports can be generated for a specific time period, a specific keywords, creatives, publisher sites, product line, ad groups, ad campaigns, accounts, and so on.

In some implementations, when the reporting front end component 1026 receives an advertiser's request for a report, the reporting front end 1026 can pass the advertiser's identifier and the requested parameters for the report to an extractor component 1024. In some implementations, the extractor component 1022 can interface with the baseview table 1018 directly to perform the extraction and processing of the desired report.

In some implementations, aggregated tables can be created prior to a request, such that the extractor can query the existing aggregate table to obtain the desired reports quickly. The aggregate table 1022 can be generated by an aggregating component 1020. The aggregating component 1020 can run periodically to update the aggregate table 1022 with new data that have been added to the baseview table 1018 and to discard old data to save storage space. The types of tables prepared and stored in the aggregate table 1020 can be determined based on estimates of what reports may be requested most frequently and the latency for generating the reports on the fly.

In some implementations, the aggregate table 1020 can also be stored in a distributed data model such as the example distributed data model described above. The aggregate table 1020 can be indexed by concatenated string segments representing an advertiser identifier and a table type. Other appropriate row key naming schemas for the aggregate table 1020 are possible.

Example Processes for the Backend Data Processing

The distributed data storage models described herein are suitable for parallel processing of the data stored therein. For example, the history table 1010, the baseview table 1018, and the aggregate table 1022, can be serve as both input and output to a distributed data processing system. An example of a distributed data processing system can be implemented according to a MapReduce framework. However, other suitable distributed data processing systems may be used as well.

Figure 10B:
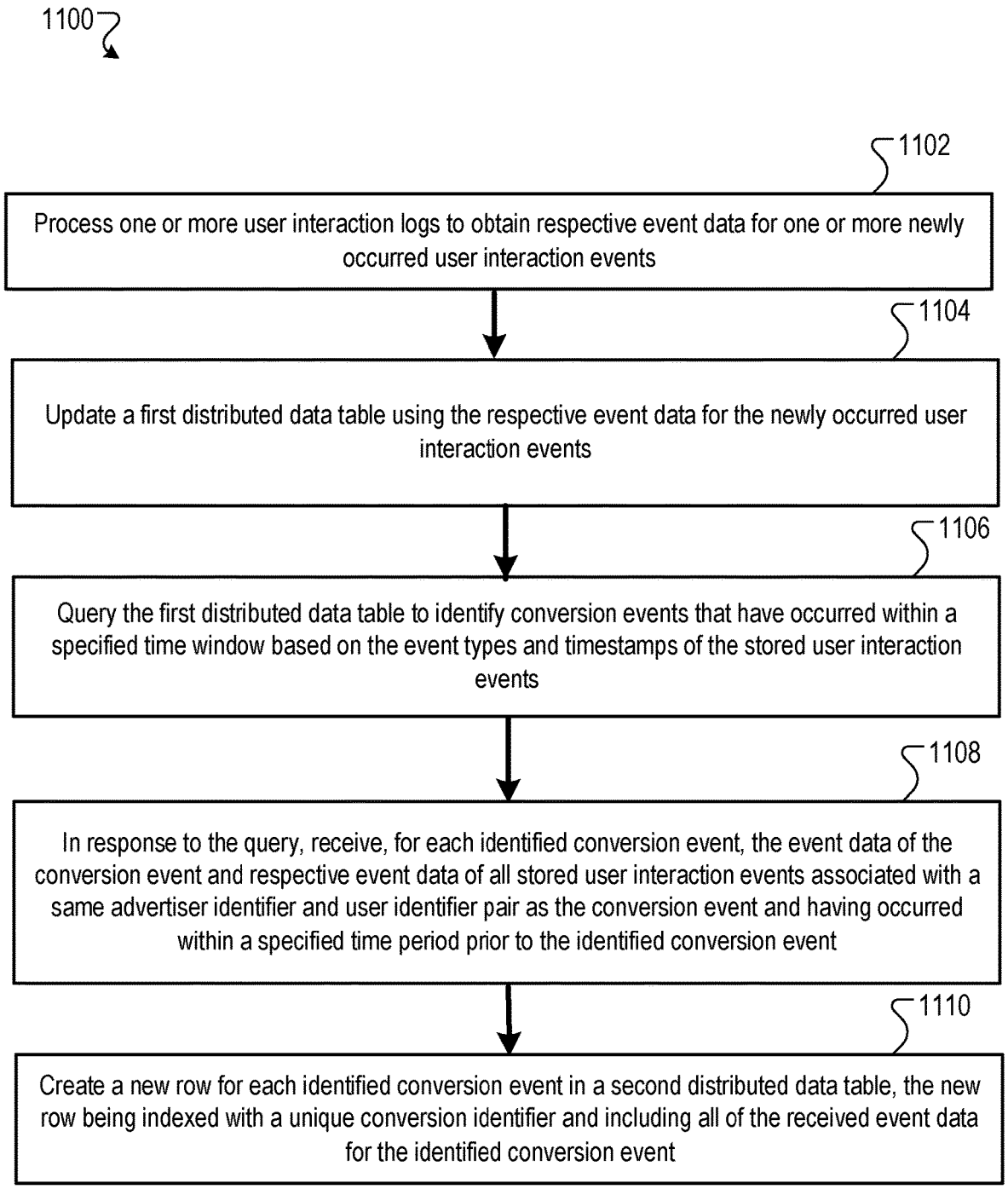
FIG. 10B is a flow chart of an example process for organizing individual user interaction data first into an advertiser-user centered data storage model and then into a conversion centered data storage model.

FIG. 10B is a flow chart of an example process 1100 for organizing individual user interaction data first into an advertiser-user centered data storage model and then into a conversion centered data storage model. The process 1100 can be performed by a distributed network of data processing apparatus.

The process 1100 with one or more user interaction logs being processed to obtain respective user interaction data for one or more newly performed user interaction events (1102). Then, a first distributed data table can be updated using the respective user interaction data for the newly occurred user interaction events (1104). In some implementations, the first distributed data table includes rows indexed and sorted by strings representing unique pairs of advertiser identifier and user identifier that are associated with stored user interaction events in the first distributed data table. Furthermore, each row includes a plurality of ordered cells, and each cell corresponds to a respective event type and containing the user interaction data for stored user interaction events of said event type. In some implementations, the user interaction data for each user interaction event is stored with a respective timestamp associated with the user interaction event. An example of the first distributed data table is the history table 1010 as shown in FIG. 10A. The processing and updating can be performed by the log importer component 1006. The processing and updating can be performed periodically.

After the first distributed data table has been created and updated, a component (e.g., by the event joining component 1012 shown in FIG. 10A) can query the first distributed data table to identify conversion events that have occurred within a specified time window (1106). The query can specify a filter for conversion events and for the time window, and each row of the first distributed data table (e.g., the history table 1010 of FIG. 10A) can be scanned based on event types and timestamps of the stored user interaction events. One or more conversion events can be identified as a result of the query.

In response to the query, for each identified conversion event, the component receives the user interaction data of the conversion event and respective user interaction data of all stored user interaction events associated with a same advertiser identifier and user identifier pair (i.e., associated with the same advertiser-user pair) as the conversion event and having occurred within a specified time period prior to the identified conversion event (1108). Because user interaction data that are related to the same advertiser-user pair are stored in the same row in the first distributed data table (e.g., the history table 1010), only that one row needs to be processed to obtain all click events and impression events having occurred within a specified time period prior to an identified conversion event.

After the user interaction data are received for one or more identified conversion event, a new row can be created for each identified conversion event in a second distributed data table (1110). The new row in the second distributed data table can be indexed with a unique conversion identifier. The new row can include all of the received user interaction data for the identified conversion. An example of the second distributed data table is the baseview table 1018 shown in FIG. 10A. The querying, receiving, and creating can be performed by a distributed system of data processing apparatus, such as the event joining component 1014 shown in FIG. 10A.

Figure 10C:
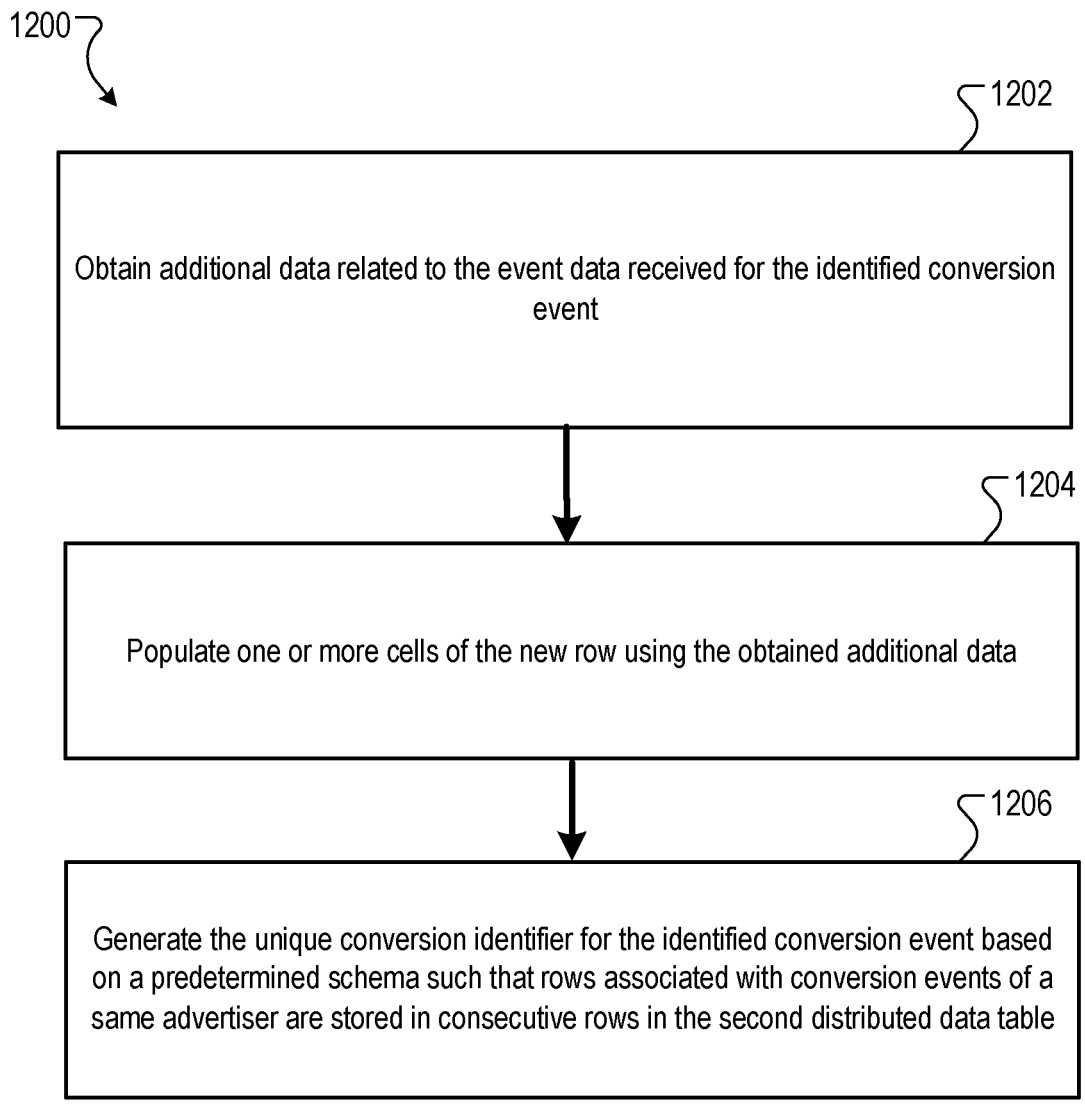
FIG. 10C is a flow chart of an example process for adding new user interaction data in a conversion centered data storage model.

FIG. 10C is a flow chart of an example process 1200 for adding new data in a conversion centered data storage model. For example, when creating a new row for each identified conversion in the second distributed data table, additional data related to the user interaction data received for the identified conversion event can be obtained (1202). In some implementations, the additional data can be obtained by the database joining component 1014 from the advertising database 1016 shown in FIG. 10A. The additional data can include, for example, campaign names, ad group names, keywords, creative names, advertising criteria, and so on. After the additional information is obtained by the database joining component, for example, one or more cells of the new row can be populated using the obtained additional data (1204). This is a "data widening" process which allows additional filter parameters to be created to allow generation of desired measures (e.g., ad campaign specific, ad group specific, creative specific, keyword specific, and/or criteria specific analysis of the data).

In some implementations, rows of the second distributed data table (e.g., the baseview table 1018) are indexed and sorted by conversion identifiers. When creating the new row for each identified conversion event in the second distributed data table, the unique conversion identifier can be generated for the identified conversion event based on a predetermined schema such that rows associated with conversion events of a same advertiser are stored in consecutive rows in the second distributed data table (1206). In one example, the unique identifier can include a leading segment corresponding to the advertiser identifier, followed by segments corresponding to conversion type and a date.

In some implementations, each row of the second distributed data table includes a plurality of ordered cells each corresponding to a respective parameter that is relevant to an advertiser's query regarding the user interaction events stored in the row. Examples of the parameters include, click event type, impression event type, conversion event type, ad campaign, ad group, creative, keyword, and so on. The cells are ordered because the columns of the second distributed table are fixed in order.

In some implementations, each cell of the second distributed data table is operable for storing one or more values for the cell's corresponding parameter, each value being stored with a respective timestamp associated with the value. For example, user interaction data representing the clicks that are associated with a conversion event, such as all the clicks that occurred within a specified time window prior to the conversion event, can be stored in a single cell corresponding to the impression event type in the row corresponding to the conversion event. The user interaction data of each of the clicks can be stored with an associated timestamp indicating the time that the impression has occurred. The user interaction data of the clicks can be sorted according to their associated timestamps, such that a time sequence of clicks can be formed in the cell. In some implementations, clicks that appear to be duplicates (e.g., consecutive clicks on the same ad during the same user session) can be collapsed into a single click event in the cell.

Figure 10D:
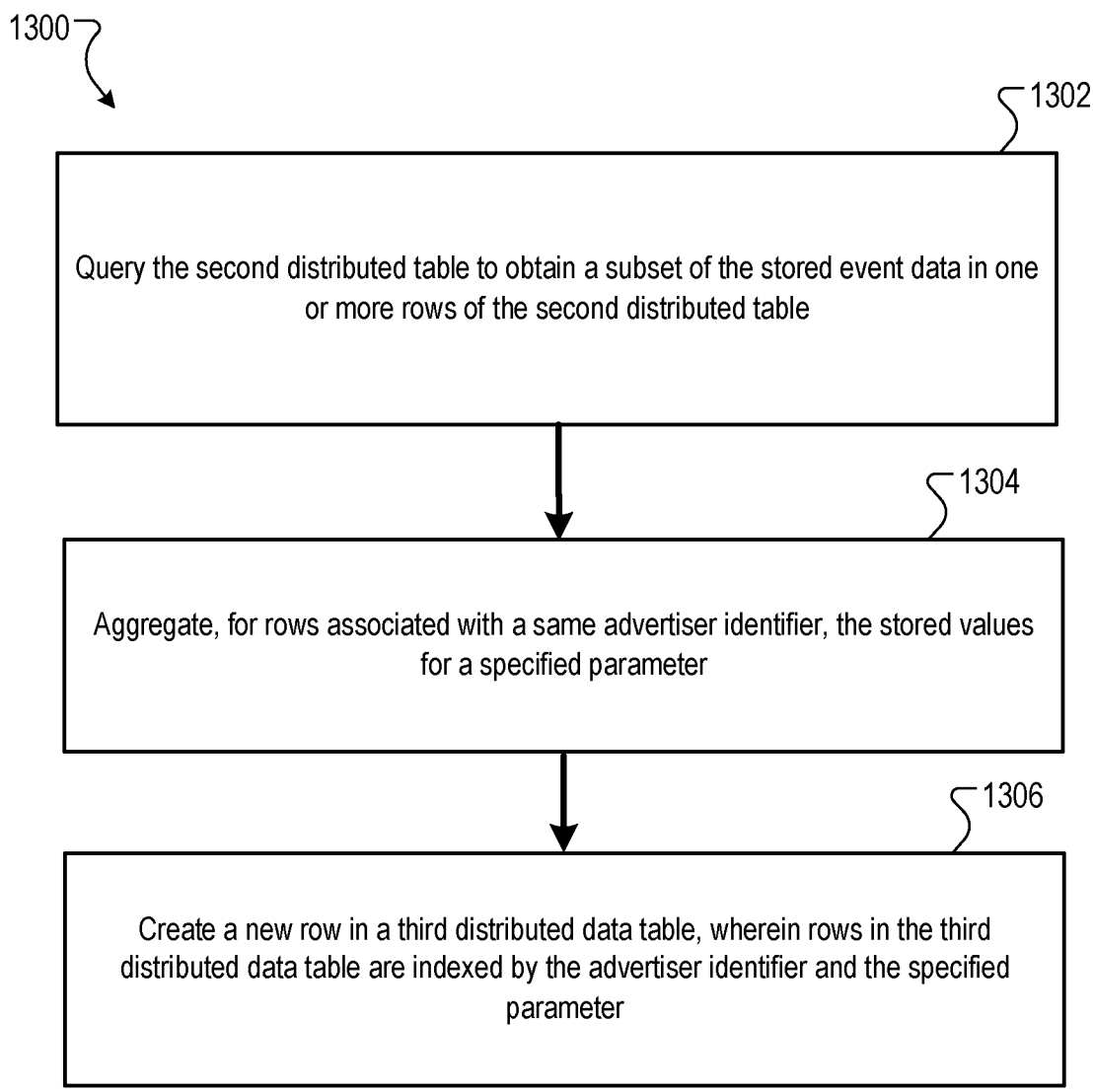
FIG. 10D is a flow chart of an example process for generating aggregated data tables utilizing the user interaction data that are stored in accordance with the conversion centered data storage model.

FIG. 10D is a flow chart of an example process 1300 for generating aggregated data utilizing the conversion centered data storage model.

In some implementations, an aggregating component (e.g., the aggregating component 1020) can query the second distributed table (e.g., the baseview table 1018) to obtain a subset of the stored user interaction data in one or more rows of the second distributed data table (1302). Then, for rows associated with a same advertiser identifier, the stored values for a specified parameter can be aggregated (1304). A new row can be created in a third distributed data table (e.g., the aggregate table 1022), wherein rows in the third distributed data table are indexed by the advertiser identifier and the specified parameter. For example, the aggregate table can include a row for an advertiser and a keyword pair. The keyword can be one of the keywords that the advertiser uses to targeting search ads. The row can have a row key that includes a leading segment corresponding to the advertiser identifier, followed by the keyword name (e.g., "shoe"). Within that row, aggregated user interaction data that are associated with advertiser-keyword pair can be stored. For example, a cell corresponding to the click event type can store all the clicks that have occurred for an ad presented due to the keyword. Other types of aggregate tables can be generated depending on the information needs of the advertisers.

Figure 10E:
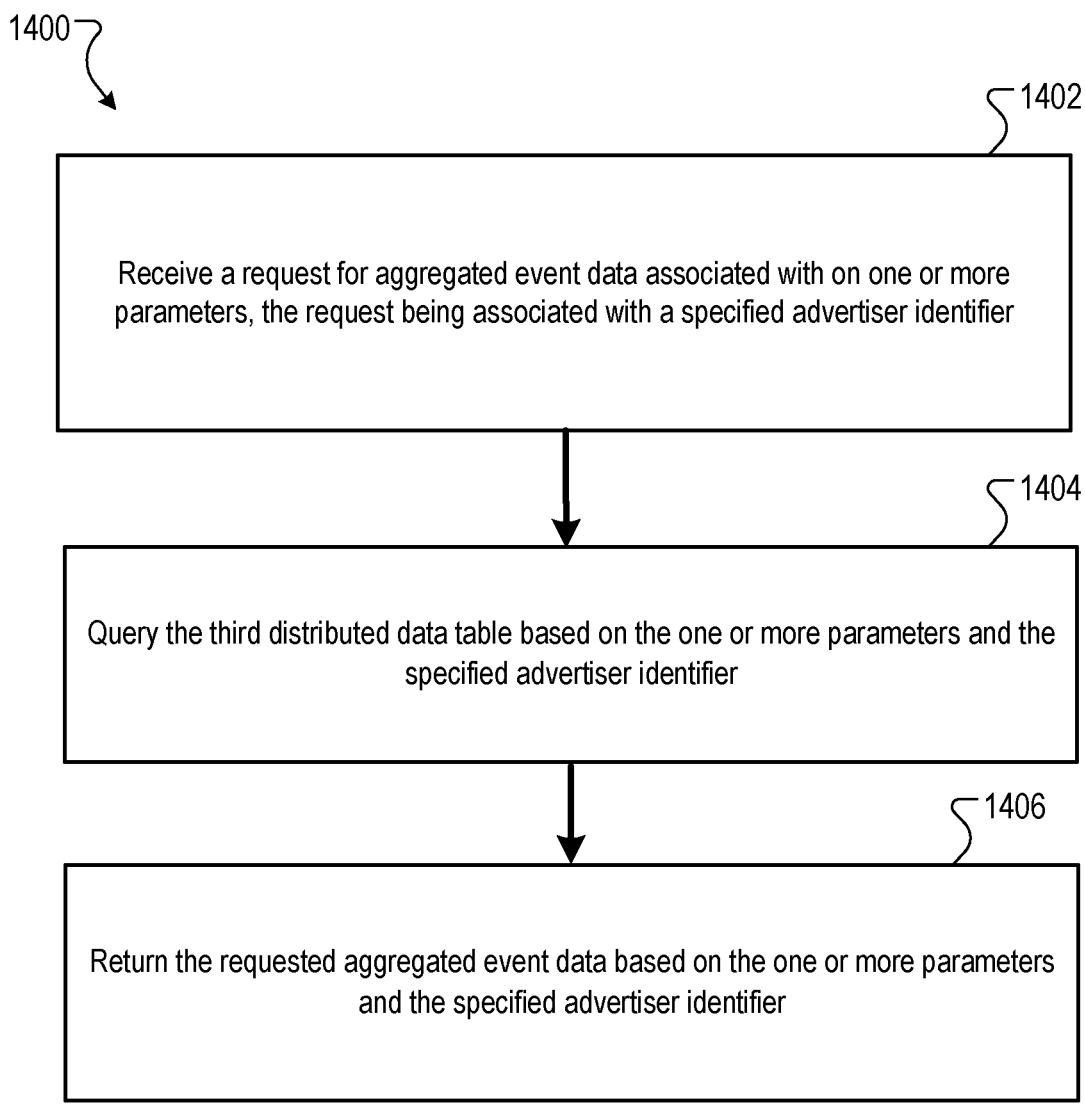
FIG. 10E is a flow chart of an example process for providing conversion performance reports based on pre-stored aggregated data.
Figure 11:
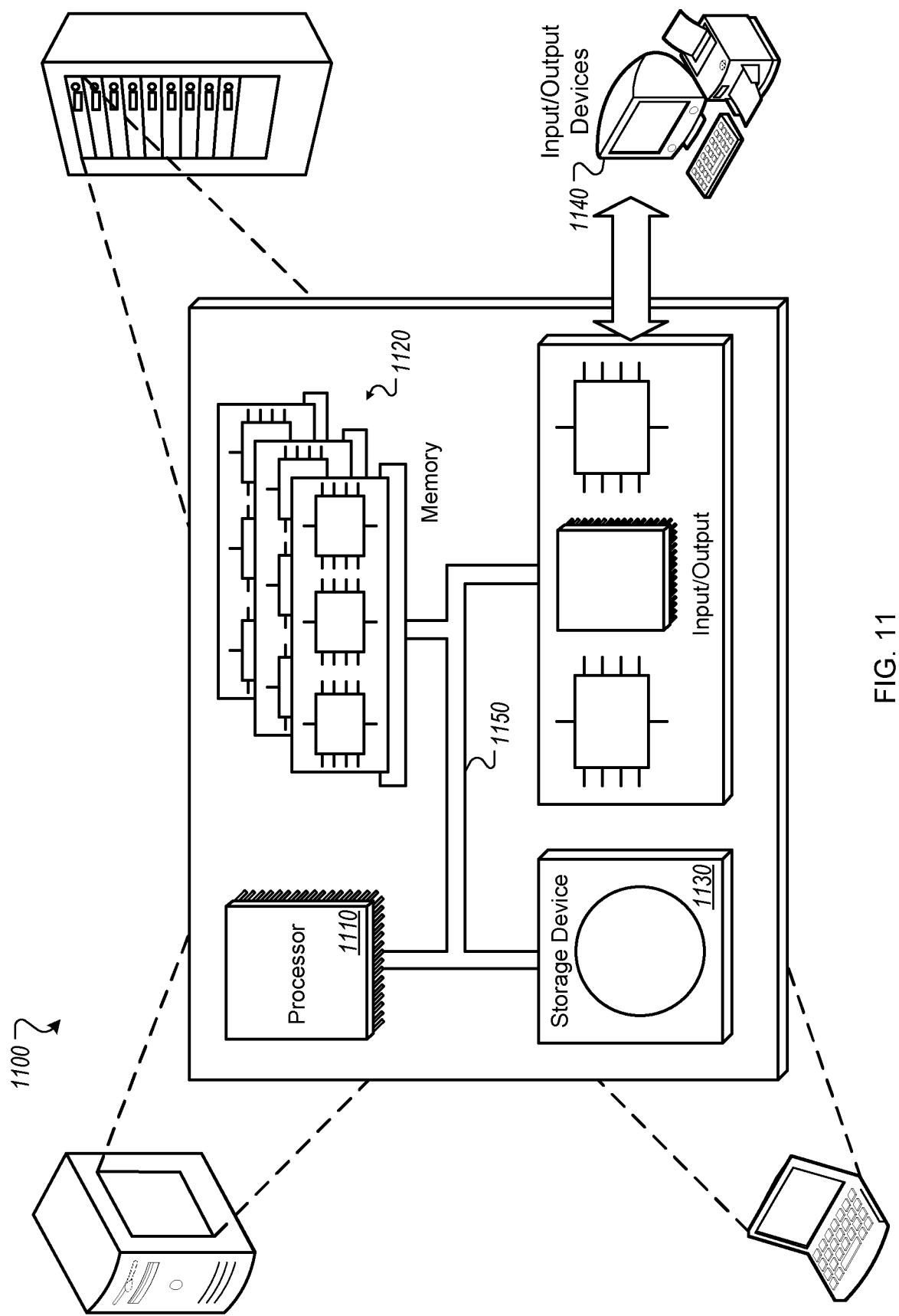
FIG. 11 is a block diagram of an example computer system.

FIG. 10E is an example flow chart of an example process 1400 for providing conversion performance reports based on pre-stored aggregate data. In some implementations, a request for aggregated user interaction data associated with on one or more parameters are received (1402). The request can be associated with a specified advertiser identifier. A component queries the third distributed data table (e.g., the aggregate table 1022) based on the one or more parameters and the specified advertiser identifier (1404). In cases where suitable pre-stored data are available in the third distributed data table, the requested aggregated user interaction data can be returned based on the one or more parameters and the specified advertiser identifier Example Computer FIG. 11 is a block diagram of an example computer system 500 that can be used to compute conversion path performance measures and provide a conversion performance report. The system 1100 includes a processor 1110, a memory 1120, a storage device 1130, and an input/output device 1140. Each of the components 1110, 1120, 1130, and 1140 can be interconnected, for example, using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130.

The memory 1120 stores information within the system 1100. In one implementation, the memory 1120 is a computer-readable medium. In one implementation, the memory 1120 is a volatile memory unit. In another implementation, the memory 1120 is a non-volatile memory unit.

The storage device 1130 is capable of providing mass storage for the system 1100. In one implementation, the storage device 1130 is a computer-readable medium. In various different implementations, the storage device 1130 can include, for example, a hard disk device, an optical disk device, or some other large capacity storage device.

The input/output device 1140 provides input/output operations for the system 1100. In one implementation, the input/output device 1140 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 1160. Other implementations, however, can also be used, such as mobile computing devices, mobile communication devices, set-top box television client devices, etc.

The performance analysis apparatus 120 can be realized by instructions that upon execution cause one or more processing devices to carry out the processes and functions described above. The performance analysis apparatus 120 and/or advertisement management system 110 can be implemented in a distributed manner over a network, such as a server farm, or can be implemented in a single computer device.

Although an example processing system has been described in FIG. 11, implementations of the subject matter and the functional operations described in this specification can be implemented in other types of digital electronic circuitry, or in computer software, firmware, or hardware, including the structures disclosed in this specification and their structural equivalents, or in combinations of one or more of them. Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method performed by a data processing apparatus, the method comprising:
   identifying, from stored user interaction data, conversions that were performed by users;
   for each particular conversion among at least some of the conversions:
      determining, using the user interaction data, a set of user interactions that were performed by a user within a pre-specified period prior to the particular conversion by the user, wherein the interaction data specifies different content with which each of the user interactions occurred prior to the particular conversion; and
      creating, for the particular conversion, a conversion path specifying a temporal order in which the user interactions with the different content occurred prior to the conversion;
      generating, for the conversion, a graphical representation depicting the temporal order in which the user interactions with the different content occurred;
   determining, based on the user interaction data, a total number of conversions that have the conversion path of the particular conversion;
   generating and providing a top paths report that visually presents (i) the graphical representation depicting the order in which the user interactions with the different content occurred and (ii) the total number of conversions that have the conversion path of the particular conversion.

2. The method of claim 1, wherein determining a conversion path specifying a temporal order in which the user interactions with the different content occurred comprises determining different keywords that triggered presentation of the different content when the interaction with the different content occurred.

3. The method of claim 2, wherein generating a graphical representation depicting the temporal order in which the user interactions with the different content occurred comprises generating a graphical representation of the temporal order of the keywords that triggered presentation of the different content when the interaction with the different content occurred.

4. The method of claim 3, wherein generating a graphical representation depicting the temporal order in which the user interactions with the different content occurred, comprises:
   generating a first graphical representation depicting the temporal order in which keywords triggered presentation of the different content irrespective of whether the presentation resulted in a click by a user; and
   generating a second graphical representation depicting the temporal order in which keywords triggered presentation of the different content and the presentation resulted in a click by a user.

5. The method of claim 4, further comprising providing, within a user interface, a control that enables a user to toggle between presentation of the first graphical representation within the user interface and presentation of the second graphical representation within the user interface.

6. The method of claim 5, further comprising, including within the user interface, a date range selection control that enables modification of a time period within which the conversions must have occurred.

7. A non-transitory computer readable medium storing instructions that, when executed by one or more processors, cause the one or more processors to perform operations comprising:
   identifying, from stored user interaction data, conversions that were performed by users;
   for each particular conversion among at least some of the conversions:
      determining, using the user interaction data, a set of user interactions that were performed by a user within a pre-specified period prior to the particular conversion by the user, wherein the interaction data specifies different content with which each of the user interactions occurred prior to the particular conversion; and creating, for the particular conversion, a conversion path specifying a temporal order in which the user interactions with the different content occurred prior to the conversion;

generating, for the conversion, a graphical representation depicting the temporal order in which the user interactions with the different content occurred;

determining, based on the user interaction data, a total number of conversions that have the path of the particular conversion;

generating and providing a top paths report that visually presents (i) the graphical representation depicting the order in which the user interactions with the different content occurred and (ii) the total number of conversions that have the conversion path of the particular conversion.

8. The non-transitory computer readable medium of claim 7, wherein determining a conversion path specifying a temporal order in which the user interactions with the different content occurred comprises determining different keywords that triggered presentation of the different content when the interaction with the different content occurred.

9. The non-transitory computer readable medium of claim 8, wherein generating a graphical representation depicting the temporal order in which the user interactions with the different content occurred comprises generating a graphical representation of the temporal order of the keywords that triggered presentation of the different content when the interaction with the different content occurred.

10. The non-transitory computer readable medium of claim 9, wherein generating a graphical representation depicting the temporal order in which the user interactions with the different content occurred, comprises:

generating a first graphical representation depicting the temporal order in which keywords triggered presentation of the different content irrespective of whether the presentation resulted in a click by a user; and generating a second graphical representation depicting the temporal order in which keywords triggered presentation of the different content and the presentation resulted in a click by a user.

11. The non-transitory computer readable medium of claim 10, wherein the instructions cause the one or more processors to perform operations further comprising providing, within a user interface, a control that enables a user to toggle between presentation of the first graphical representation within the user interface and presentation of the second graphical representation within the user interface.

12. The non-transitory computer readable medium of claim 11, wherein the instructions cause the one or more processors to perform operations further comprising, including within the user interface, a date range selection control that enables modification of a time period within which the conversions must have occurred.

13. A system comprising:

one or more data storage devices storing instructions;

one or more processors configured to interact with the one or more data storage devices and execute instructions that cause the one or more processors to perform operations comprising:

identifying, from stored user interaction data, conversions that were performed by users;

for each particular conversion among at least some of the conversions:

determining, using the user interaction data, a set of user interactions that were performed by a user within a pre-specified period prior to the particular conversion by the user, wherein the interaction data specifies different content with which each of the user interactions occurred prior to the particular conversion; and creating, for the particular conversion, a conversion path specifying a temporal order in which the user interactions with the different content occurred prior to the conversion;

generating, for the conversion, a graphical representation depicting the temporal order in which the user interactions with the different content occurred;

determining, based on the user interaction data, a total number of conversions that have the path of the particular conversion;

generating and providing a top paths report that visually presents (i) the graphical representation depicting the order in which the user interactions with the different content occurred and (ii) the total number of conversions that have the conversion path of the particular conversion.

14. The system of claim 13, wherein determining a conversion path specifying a temporal order in which the user interactions with the different content occurred comprises determining different keywords that triggered presentation of the different content when the interaction with the different content occurred.

15. The system of claim 14, wherein generating a graphical representation depicting the temporal order in which the user interactions with the different content occurred comprises generating a graphical representation of the temporal order of the keywords that triggered presentation of the different content when the interaction with the different content occurred.

16. The system of claim 15, wherein generating a graphical representation depicting the temporal order in which the user interactions with the different content occurred, comprises:

generating a first graphical representation depicting the temporal order in which keywords triggered presentation of the different content irrespective of whether the presentation resulted in a click by a user; and generating a second graphical representation depicting the temporal order in which keywords triggered presentation of the different content and the presentation resulted in a click by a user.

17. The system of claim 16, wherein the instructions cause the one or more processors to perform operations further comprising providing, within a user interface, a control that enables a user to toggle between presentation of the first graphical representation within the user interface and presentation of the second graphical representation within the user interface.

18. The system of claim 17, wherein the instructions cause the one or more processors to perform operations further comprising, including within the user interface, a date range selection control that enables modification of a time period within which the conversions must have occurred.

\* \* \* \* \*